(12) United States Patent
Maruyama et al.

(10) Patent No.: US 11,667,234 B2
(45) Date of Patent: Jun. 6, 2023

(54) VEHICLE LAMP SYSTEM, LIGHT DISTRIBUTION CONTROL DEVICE, LIGHT DISTRIBUTION CONTROL METHOD, VEHICLE DETERMINATION DEVICE, AND VEHICLE DETERMINATION METHOD

(71) Applicant: KOITO MANUFACTURING CO., LTD., Tokyo (JP)

(72) Inventors: Yuta Maruyama, Shizuoka (JP); Takehito Iriba, Shizuoka (JP); Yoshihiro Katsurada, Shizuoka (JP); Yuichi Watano, Shizuoka (JP); Takuya Kataoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/952,783

(22) Filed: Sep. 26, 2022

(65) Prior Publication Data
US 2023/0019153 A1 Jan. 19, 2023

Related U.S. Application Data

(63) Continuation of application No. PCT/JP2021/012173, filed on Mar. 24, 2021.

(30) Foreign Application Priority Data

Mar. 27, 2020 (JP) .............................. JP2020-057438
Mar. 27, 2020 (JP) .............................. JP2020-057439
(Continued)

(51) Int. Cl.
*B60Q 1/08* (2006.01)
*B60Q 1/14* (2006.01)
(Continued)

(52) U.S. Cl.
CPC ............ *B60Q 1/143* (2013.01); *B60Q 1/0005* (2013.01); *F21S 41/148* (2018.01); *B60Q 2300/45* (2013.01); *F21W 2102/135* (2018.01)

(58) Field of Classification Search
CPC ............................. B60Q 1/143; B60Q 1/0005
(Continued)

(56) References Cited

U.S. PATENT DOCUMENTS

| 8,866,387 B2 * | 10/2014 | Futamura ............... B60Q 1/143 315/80 |
| 2021/0291722 A1 * | 9/2021 | Kulkarni ................. G01S 13/88 |
| 2022/0009407 A1 * | 1/2022 | Boecker .................. F21S 43/15 |

FOREIGN PATENT DOCUMENTS

| JP | 2012134091 A | 7/2012 |
| JP | 2012183875 A | 9/2012 |

(Continued)

OTHER PUBLICATIONS

International Preliminary Report on Patentability Chapter I (PCT/IB/373) dated Sep. 22, 2022, and Written Opinion (PCT/ISA/237) with translation dated May 18, 2021, by the International Bureau of WIPO in corresponding International Patent Application No. PCT/JP2021/012173. (13 pages).

(Continued)

*Primary Examiner* — Christopher M Raabe
(74) *Attorney, Agent, or Firm* — Buchanan Ingersoll & Rooney PC

(57) ABSTRACT

A vehicle lamp system includes a vehicle lamp, a first imaging device structured to be disposed outside a lamp room, and generate a first image, a second imaging device structured to be housed in the lamp room, and generate a second image, and a light distribution control device. The light distribution control device includes an information processor structured to acquire from an outside or generate information of a first light shielding part, and decide a
(Continued)

second light shielding part, a control executer structured to execute light distribution control for forming a light distribution pattern including the second light shielding part, and a control regulator structured to control the vehicle lamp to form a light distribution pattern including the first light shielding part when at least one condition of a condition (i) to a condition (iv).

11 Claims, 29 Drawing Sheets

(30) Foreign Application Priority Data

| Apr. 1, 2020 | (JP) | JP2020-065922 |
|---|---|---|
| Apr. 1, 2020 | (JP) | JP2020-065923 |
| Apr. 28, 2020 | (JP) | 2020-079048 |
| Apr. 28, 2020 | (JP) | JP2020-079047 |

(51) Int. Cl.
  *F21S 41/148* (2018.01)
  *B60Q 1/00* (2006.01)
  *F21W 102/135* (2018.01)

(58) Field of Classification Search
  USPC .................................................... 362/555
  See application file for complete search history.

(56) References Cited

FOREIGN PATENT DOCUMENTS

| JP | 2013060140 A | 4/2013 |
|---|---|---|
| JP | 2015064964 A | 4/2015 |
| JP | 2017081500 A | 5/2017 |

OTHER PUBLICATIONS

International Search Report (PCT/ISA/210) with translation dated May 18, 2021, by the Japan Patent Office as the International Searching Authority for International Application No. PCT/JP2021/012173. (10 pages).

\* cited by examiner

VEHICLE LAMP SYSTEM, LIGHT DISTRIBUTION CONTROL DEVICE, LIGHT DISTRIBUTION CONTROL METHOD, VEHICLE DETERMINATION DEVICE, AND VEHICLE DETERMINATION METHOD

CROSS-REFERENCE TO RELATED APPLICATIONS

This application is based upon and claims the benefit of priority from the prior Japanese Patent Application No. 2020-057438, filed on Mar. 27, 2020, the prior Japanese Patent Application No. 2020-057439, filed on Mar. 27, 2020, the prior Japanese Patent Application No. 2020-065922, filed on Apr. 1, 2020, the prior Japanese Patent Application No. 2020-065923, filed on Apr. 1, 2020, the prior Japanese Patent Application No. 2020-079047, filed on Apr. 28, 2020, the prior Japanese Patent Application No. 2020-079048, filed on Apr. 28, 2020, and International Patent Application No. PCT/JP2021/012173, filed on Mar. 24, 2021, the entire content of each of which is incorporated herein by reference.

BACKGROUND

Field of the Invention

The present invention relates to a vehicle lamp system, a light distribution control device, a light distribution control method, a vehicle determination device, and a vehicle determination method.

Description of the Related Art

Vehicle lamps play an important role in safe traveling at night or within tunnels. When a priority is given to visibility by a driver and a front of a vehicle is irradiated with light in a wide range, there is a problem that glare is given to the driver of a preceding vehicle or an oncoming vehicle (hereinafter, referred to as a front vehicle), or a pedestrian present in front of a host vehicle. By contrast, a vehicle lamp of the related art prevents glare from being given to the driver or the like of the front vehicle by forming a low beam light distribution pattern including a cutoff line (see, for example, JP 2012-134091 A).

In recent years, adaptive driving beam (ADB) control for dynamically and adaptively controlling a light distribution pattern based on a state around a vehicle has been proposed. In the ADB control, an imaging device such as a camera detects whether or not a light reduction target which is positioned in front of the host vehicle and is to be avoided from being irradiated with light having high luminance, and a region corresponding to the light reduction target is dimmed or turned off (see, for example, JP 2015-064964 A). Examples of the light reduction target include a preceding vehicle and an oncoming vehicle (hereinafter, referred to as a front vehicle) present in front of the host vehicle.
Patent document 1: JP2012-134091
Patent document 2: JP2015-064964

1. According to the ADB control, since the visibility of the driver of the host vehicle is improved, the safety of vehicle driving can be improved. On the other hand, when the improvement of the visibility of the driver of the host vehicle is biased, the erroneous irradiation of light to the front vehicle increases, and the safety of vehicle driving may be impaired.

According to the ADB control, it is possible to improve the visibility of the host vehicle while glare to the front vehicle is avoided. As a result, the safety of vehicle driving is improved for both the host vehicle and the other vehicle. On the other hand, there is constantly a demand for further improving the accuracy of ADB control and further improving the safety of vehicle driving.

2. In light distribution control such as ADB control in which a shape of the light distribution pattern is changed in accordance with a situation in front of the host vehicle, it is desirable to grasp the arrangement of the front vehicle. As a result of intensive studies, the present inventor has found a new method of grasping the arrangement of the front vehicle.

3. In order to further improve safety of vehicle driving, it is desirable to further improve visibility of the driver of the host vehicle while glare of the driver or the like of the front vehicle is considered.

4. According to the ADB control, it is possible to improve the visibility of the host vehicle while glare to the front vehicle is avoided. As a result, the safety of vehicle driving is improved for both the host vehicle and the other vehicle. On the other hand, when the ADB control fails, an effect of the ADB control is lost, and the safety of vehicle driving deteriorates.

SUMMARY OF THE INVENTION

1. One aspect of the present invention has been made in view of such a situation, and an object of the present invention is to provide a technique for further improving safety of vehicle driving.

2. One aspect of the present invention has been made in view of such a situation, and an object of the present invention is to provide a new technique for grasping arrangement of a front vehicle.

3. One aspect of the present invention has been made in view of such a situation, and an object of the present invention is to provide a technique for further improving visibility of a driver.

4. One aspect of the present invention has been made in view of such a situation, and an object of the present invention is to provide a technique for reducing deterioration in safety of vehicle driving when ADB control fails.

1. One aspect of the present invention is a vehicle lamp system. The system includes a vehicle lamp structured to be able to form a light distribution pattern including a light shielding part in a front region of a vehicle, a first imaging device structured to be disposed outside a lamp room in which the vehicle lamp is housed, and capture the front region to generate a first image, a second imaging device structured to be housed in the lamp room, and capture the front region to generate a second image, and a light distribution control device structured to control formation of the light distribution pattern by the vehicle lamp. The light distribution control device includes an information processor structured to acquire from an outside or generate information of a first light shielding part obtained by adding a first margin to a presence range of a front vehicle in the first image, and decide a second light shielding part obtained by adding a second margin narrower than the first margin to the presence range of the front vehicle decided based on a light spot in an overlapping region overlapping the first light shielding part in the second image or a second light shielding part obtained by not adding the second margin to the presence range, a control executer structured to execute light distribution control for forming a light distribution pattern including the second light shielding part, and a control regulator structured to control the vehicle lamp to form a light distribution pattern including the first light shielding part by regulating the light distribution control when at least one condition of a condition (i) in which a width X of the first light shielding part is less than a width Y of the second light shielding part, a condition (ii) in which a difference between the width X and the width Y is equal to or greater than a predetermined value, a condition (iii) in which a center of the width X and a center of the width Y are deviated in a width direction by a predetermined amount or more, and a condition (iv) in which a light spot is not detected in the overlapping region is satisfied in the light distribution control.

Another aspect of the present invention is a light distribution control device that controls formation of a light distribution pattern by a vehicle lamp structured to be able to form a light distribution pattern including a light shielding part in a front region of a vehicle. The device includes an information processor structured to acquire from an outside or generate information of a first light shielding part obtained by adding a first margin to a presence range of a front vehicle in a first image captured by a first imaging device disposed outside a lamp room in which the vehicle lamp is housed, acquire a second image captured by a second imaging device housed in the lamp room, and decide a second light shielding part obtained by adding a second margin narrower than the first margin to the presence range of the front vehicle decided based on a light spot of an overlapping region overlapping the first light shielding part in the second image or a second light shielding part obtained by not adding the second margin to the presence range, a control executer structured to execute light distribution control for forming a light distribution pattern including the second light shielding part, and a control regulator structured to control the vehicle lamp to form a light distribution pattern including the first light shielding part by regulating the light distribution control when at least one condition of a condition (i) in which a width X of the first light shielding part is less than a width Y of the second light shielding part, a condition (ii) in which a difference between the width X and the width Y is equal to or greater than a predetermined value, a condition (iii) in which a center of the width X and a center of the width Y are deviated in a width direction by a predetermined amount or more, and a condition (iv) in which a light distribution is not detected in the overlapping region is satisfied in the light distribution control.

Another aspect of the present invention is a light distribution control method for controlling formation of a light distribution pattern by a vehicle lamp structured to be able to form a light distribution pattern including a light shielding part in a front region of a vehicle. The method includes acquiring from an outside or generating information of a first light shielding part obtained by adding a first margin to a presence range of a front vehicle in a first image captured by a first imaging device disposed outside a lamp room in which the vehicle lamp is housed, acquiring a second image captured by a second imaging device housed in the lamp room, and deciding a second light shielding part obtained by adding a second margin narrower than the first margin to the presence range of the front vehicle decided based on a light spot of an overlapping region overlapping the first light shielding part in the second image or a second light shielding part obtained by not adding the second margin to the presence range, executing light distribution control for forming a light distribution pattern including the second light shielding part, and controlling the vehicle lamp to form a light distribution pattern including the first light shielding part by regulating the light distribution control when at least one condition of a condition (i) in which a width X of the first light shielding part is less than a width Y of the second light shielding part, a condition (ii) in which a difference between the width X and the width Y is equal to or greater than a predetermined value, a condition (iii) in which a center of the width X and a center of the width Y are deviated in a width direction by a predetermined amount or more, and a condition (iv) in which the a light spot is not detected in the overlapping region is satisfied in the light distribution control.

2. An aspect of the present invention is a vehicle determination device. The device determines that there is a line of front vehicles when there are three or more light spots arranged in a vehicle width direction in an image captured by a first imaging device structured to be housed in a lamp room in which a vehicle lamp is housed and capture a front region of a vehicle.

Another aspect of the present invention is a vehicle lamp system. The system includes a vehicle lamp that includes a shade member structured to partially block emission of light to a front of a lamp to form a cutoff line, and that is structured to form a light distribution pattern including the cutoff line in a front region of a vehicle, a first imaging device structured to be housed in a lamp room in which the vehicle lamp is housed and capture the front region, a light distribution control device structured to execute following control for causing a position of the cutoff line to follow a displacement of a light spot at a lowermost end among light points derived from a lamp of a front vehicle included in an image captured by the first imaging device, and the vehicle determination device. The light distribution control device includes a control regulator structured to regulate the following when the vehicle determination device determines that there is the line.

Another aspect of the present invention is a vehicle determination method. The method includes determining that there is a line of front vehicles when there are three or more light spots arranged in a vehicle width direction in an image captured by a first imaging device structured to be housed in a lamp room in which a vehicle lamp is housed and capture a front region of a vehicle.

3. One aspect of the present invention is a vehicle lamp system. The system includes a vehicle lamp that includes a shade member structured to partially block emission of light to a front of a lamp to form a cutoff line, and that is structured to form a light distribution pattern including the cutoff line in a front region of a vehicle, an imaging device structured to capture the front region, and a light distribution control device structured to execute following control for causing a position of the cutoff line to follow a displacement of a light spot at a lowermost end among light spots derived from a lamp of a front vehicle included in an image captured by the imaging device.

Another aspect of the present invention is a light distribution control device. The device is a light distribution control device structured to control formation of a light distribution pattern including a cutoff line by a vehicle lamp that includes a shade member structured to partially block emission of light to a front of a lamp to form the cutoff line based on an image captured by an imaging device, a position of the cutoff line being caused to follow a displacement of a light spot at a lowermost end among light spots derived from a lamp of a front vehicle included in the image.

Another aspect of the present invention is a light distribution control method. The method is a light distribution control method for controlling formation of a light distribution pattern including a cutoff line by a vehicle lamp that includes a shade member structured to partially block emission of light to a front of a lamp to form the cutoff line based on an image captured by an imaging device. The light distribution control method includes causing a position of the cutoff line to follow a displacement of a light spot at a lowermost end among light spots derived from a lamp of a front vehicle included in the image.

4. One aspect of the present invention is a vehicle lamp system. The system includes a vehicle lamp structured to form a light distribution pattern including a cutoff line in a front region of a vehicle, an imaging device structured to capture the front region, and a light distribution control device structured to adjust a position of the cutoff line based on an image captured by the imaging device. The light distribution control device includes a control executer structured to execute following control for causing the position of the cutoff line to follow a displacement of a light spot at a lowermost end among light spots derived from a lamp of a front vehicle included in the image, and a control regulator structured to regulate the following when the light spot is displaced at a predetermined speed or more in the following control.

Another aspect of the present invention is a light distribution control device. The device is a light distribution control device structured to adjust a position of a cutoff line of a light distribution pattern including cutoff lines formed in a front region of a vehicle based on an image captured by an imaging device structured to capture the front region. The light distribution control device includes a control executer structured to execute following control for causing the position of the cutoff line to follow a displacement of a light spot at a lowermost end among light spots derived from a lamp of a front vehicle included in the image, and a control regulator structured to regulate the following when the light spot is displaced at a predetermined speed or more in the following control.

Another aspect of the present invention is a light distribution control method. The method is a light distribution control method for adjusting a position of a cutoff line of a light distribution pattern including cutoff lines formed in a front region of a vehicle based on an image captured by an imaging device structured to capture the front region. The light distribution control method includes executing following control for causing the position of the cutoff line to follow a displacement of a light spot at a lowermost end among light spots derived from a lamp of a front vehicle included in the image, and regulating the following when the light spot is displaced at a predetermined speed or more in the following control.

5. One aspect of the present invention is a vehicle lamp system. The system includes a vehicle lamp structured to be able to form a light distribution pattern including a light shielding part in a front region of a vehicle, a first imaging device structured to be disposed outside a lamp room in which the vehicle lamp is housed, and capture the front region to generate a first image, a second imaging device structured to be housed in the lamp room, and capture the front region to generate a second image, and a light distribution control device structured to control formation of the light distribution pattern by the vehicle lamp. The light distribution control device includes an information processor structured to acquire from an outside or generate information of a first light shielding part obtained by adding a first margin to a presence range of a front vehicle in the first image, and decide a second light shielding part obtained by adding a second margin narrower than the first margin to the presence range of the front vehicle decided based on a light spot in an overlapping region overlapping the first light shielding part in the second image or a second light shielding part obtained by not adding the second margin to the presence range, a corrector structured to correct a position of the second light shielding part based on correction information decided based on a deviation amount between a center of a width of the first light shielding part and a center of a width of the second light shielding part with respect to a reference light spot, and a control executer structured to execute light distribution control for forming a light distribution pattern including the second light shielding part.

Another aspect of the present invention is a light distribution control device that controls formation of a light distribution pattern by a vehicle lamp structured to be able to form a light distribution pattern including a light shielding part in a front region of a vehicle. The device includes an information processor structured to acquire from an outside or generate information of a first light shielding part obtained by adding a first margin to a presence range of a front vehicle in a first image captured by a first imaging device disposed outside a lamp room in which the vehicle lamp is housed, acquire a second image captured by a second imaging device housed in the lamp room, and decide a second light shielding part obtained by adding a second margin narrower than the first margin to the presence range of the front vehicle decided based on a light spot of an overlapping region overlapping the first light shielding part in the second image or a second light shielding part obtained by not adding the second margin to the presence range, a corrector structured to correct a position of the second light shielding part based on correction information decided based on a deviation amount between a center of a width of the first light shielding part and a center of a width of the second light shielding part with respect to a reference light spot, and a control executer structured to execute light distribution control for forming a light distribution pattern including the second light shielding part.

Another aspect of the present invention is a light distribution control method for controlling formation of a light distribution pattern by a vehicle lamp structured to be able to form a light distribution pattern including a light shielding part in a front region of a vehicle. The method includes acquiring from an outside or generating information of a first light shielding part obtained by adding a first margin to a presence range of a front vehicle in a first image captured by a first imaging device disposed outside a lamp room in which the vehicle lamp is housed, acquiring a second image captured by a second imaging device housed in the lamp room, and deciding a second light shielding part obtained by adding a second margin narrower than the first margin to the presence range of the front vehicle decided based on a light spot of an overlapping region overlapping the first light shielding part in the second image or a second light shielding part obtained by not adding the second margin to the presence range, correcting a position of the second light shielding part based on correction information decided based on a deviation amount between a center of a width of the first light shielding part and a center of a width of the second light shielding part with respect to a reference light spot, and executing light distribution control for forming a light distribution pattern including the second light shielding part.

6. One aspect of the present invention is a vehicle lamp system. The system includes a vehicle lamp structured to be able to form a variable light distribution pattern including a light shielding part corresponding to a presence range of a front vehicle and a fixed-shaped low beam light distribution pattern and high beam light distribution pattern in a front region of a vehicle, a first imaging device and a second imaging device structured to capture the front region, and a light distribution control device structured to control formation of a light distribution pattern by the vehicle lamp. The light distribution control device includes an information processor structured to acquire from an outside or generate information on a presence range of a front vehicle detected by image analysis of a first image captured by the first imaging device, and decide the light shielding part by using a light spot included in an overlapping region overlapping a region including the presence range in a second image captured by the second imaging device, a control executer structured to execute first light distribution control for forming a variable light distribution pattern including the light shielding part, and a control regulator structured to receive an error signal indicating that the information on the presence range is not able to be acquired, regulate the first light distribution control, and execute second light distribution control for forming the low beam light distribution pattern when the light spot is included in the second image and forming the high beam light distribution pattern when the light spot is not included in the second image.

Another aspect of the present invention is a light distribution control device that controls formation of a light distribution pattern by a vehicle lamp. The vehicle lamp is structured to be able to form a variable light distribution pattern including a light shielding part corresponding to a presence range of a front vehicle and a fixed-shaped low beam light distribution pattern and high beam light distribution pattern in a front region of a vehicle, and the light distribution control device includes an information processor structured to acquire from an outside or generate information on a presence range of a front vehicle detected by image analysis of a first image captured by a first imaging device structured to capture the front region, and decide the light shielding part by using a light spot included in an overlapping region overlapping a region including the presence range in a second image captured by a second imaging device structured to capture the front region, a control executer structured to execute first light distribution control for forming a variable light distribution pattern including the light shielding part, and a control regulator structured to receive an error signal indicating that the information on the presence range is not able to be acquired, regulate the first light distribution control, and execute second light distribution control for forming the low beam light distribution pattern when the light spot is included in the second image and forming the high beam light distribution pattern when the light spot is not included in the second image.

Another aspect of the present invention is a light distribution control method for controlling formation of a light distribution pattern by a vehicle lamp. The vehicle lamp is structured to be able to form a variable light distribution pattern including a light shielding part corresponding to a presence range of a front vehicle and a fixed-shaped low beam light distribution pattern and high beam light distribution pattern in a front region of a vehicle, and the light distribution control method includes acquiring from an outside or generating information on a presence range of a front vehicle detected by image analysis of a first image captured by a first imaging device structured to capture the front region, deciding the light shielding part by using a light spot included in an overlapping region overlapping a region including the presence range in a second image captured by a second imaging device structured to capture the front region, executing first light distribution control for forming a variable light distribution pattern including the light shielding part, and receiving an error signal indicating that the information on the presence range is not able to be acquired, regulating the first light distribution control, and executing second light distribution control for forming the low beam light distribution pattern when the light spot is included in the second image and forming the high beam light distribution pattern when the light spot is not included in the second image.

Any combinations of the above components and replacements of the expressions of the present invention among methods, devices, systems, and the like are also effective as aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
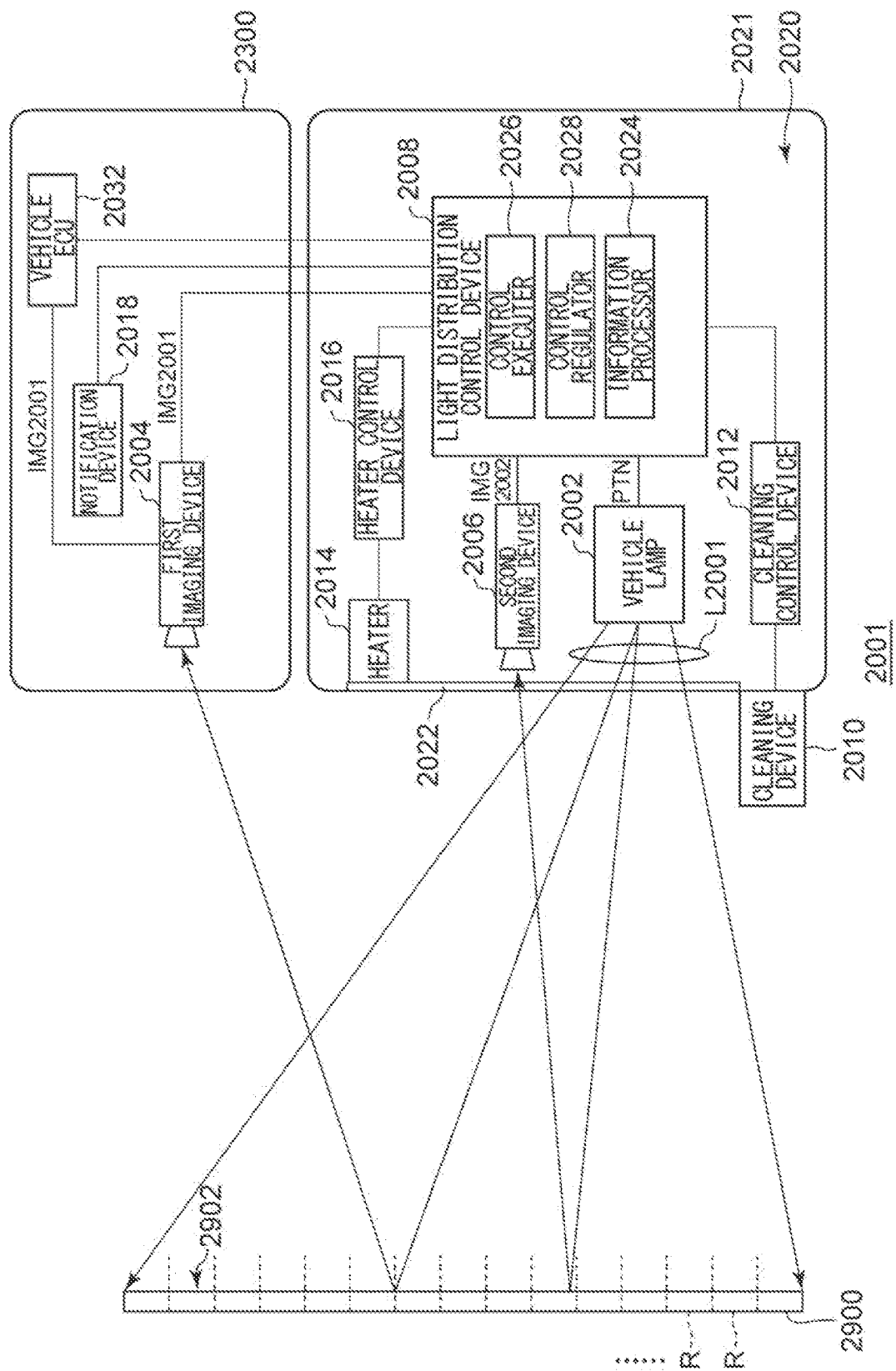
FIG. 1 is a block diagram of a vehicle lamp system according to a first embodiment.

Hereinafter, preferred embodiments of the present invention will be described with reference to the drawings. The embodiments are not intended to limit the invention but are examples, and all features described in the embodiments and combinations thereof are not necessarily essential to the invention. The same or equivalent components, members, and processing illustrated in the drawings are denoted by the same reference signs, and the redundant description will be omitted as appropriate.

Scales and shapes of parts illustrated in the drawings are set for the sake of convenience in order to facilitate the description, and are not limitedly interpreted unless otherwise specified. When the terms "first", "second", and the like are used in the present specification or claims, unless otherwise specified, these terms do not represent any order or importance, and are intended to distinguish one configuration from another configuration. In the drawings, some of the members that are not important for describing the embodiments are omitted.

First Embodiment

FIG. 1 is a block diagram of a vehicle lamp system according to a first embodiment. In FIG. 1, some of components of a vehicle lamp system 2001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software.

The vehicle lamp system 2001 includes a vehicle lamp 2002, a first imaging device 2004, a second imaging device 2006, a light distribution control device 2008, a cleaning device 2010, a cleaning control device 2012, a heater 2014, a heater control device 2016, and a notification device 2018.

The vehicle lamp 2002 is a light distribution variable lamp capable of independently adjusting light intensities of light rays applied to a plurality of individual regions R arranged in front of the host vehicle. That is, the vehicle lamp 2002 can irradiate the front region of the vehicle with a visible light beam L2001 having a variable intensity distribution. The plurality of individual regions R are arrayed in a matrix, for example. The vehicle lamp 2002 receives data related to the light distribution pattern PTN from the light distribution control device 2008, and emits the visible light beam L2001 having the intensity distribution corresponding to the light distribution pattern PTN. As a result, the light distribution pattern PTN is formed in front of the vehicle. The light distribution pattern PTN is grasped as a two-dimensional illuminance distribution of an irradiation pattern 2902 formed on a virtual vertical screen 2900 in front of the host vehicle by the vehicle lamp 2002.

A configuration of the vehicle lamp 2002 is not particularly limited, and includes, for example, a plurality of light sources arrayed in a matrix and a lighting circuit that independently drives and turns on the light sources. Preferable examples of the light source include semiconductor light sources such as a light emitting diode (LED), a laser diode (LD), and an organic or inorganic electroluminescence (EL). Each individual region R is associated with each light source, and each individual region R is individually irradiated with light from each light source. In order to form the illuminance distribution corresponding to the light distribution pattern PTN, the vehicle lamp 2002 may include, for example, a matrix-type pattern forming device such as a digital mirror device (DMD) or a liquid crystal device, or a scanning optical type pattern forming device that scans the front of the host vehicle with the light source light.

The first imaging device 2004 has sensitivity in a visible light region, and generates a first image IMG2001 by capturing the front region of the vehicle. The second imaging device 2006 has sensitivity in a visible light region, and generates a second image IMG2002 by capturing the front region of the vehicle. The first imaging device 2004 of the present embodiment has a frame rate lower than a frame rate of the second imaging device 2006, for example, 30 fps to 120 fps (about 8 ms to 33 ms per frame). The first imaging device 2004 has a resolution larger than a resolution of the second imaging device 2006, and is, for example, 5 million pixels or more. On the other hand, the second imaging device 2006 has a frame rate higher than a frame rate of the first imaging device 2004, for example, 200 fps to 10,000 fps (0.1 ms to 5 ms per frame). The second imaging device 2006 has a resolution lower than a resolution of the first imaging device 2004, and is, for example, 300,000 pixels to less than 5 million pixels.

Accordingly, the first image IMG2001 generated by the first imaging device 2004 has a relatively high definition, and the second image IMG2002 generated by the second imaging device 2006 has a relatively low definition. The second imaging device 2006 may be able to measure at least a luminance distribution in the front region. The frame rates and resolutions of the first imaging device 2004 and the second imaging device 2006 are not limited to the above numerical values, and can be set to any values within a range technically consistent with each other. Preferably, the first imaging device 2004 and the second imaging device 2006 are provided such that angles of view thereof coincide with each other. The first image IMG2001 generated by the first imaging device 2004 is sent to a vehicle ECU 2032. The second image IMG2002 generated by the second imaging device 2006 is sent to the light distribution control device 2008. The first image IMG2001 may also be sent to the light distribution control device 2008.

The vehicle lamp 2002 and the second imaging device 2006 are housed in a lamp room 2020. The lamp room 2020 has a light emission surface 2022 that emits light of the vehicle lamp 2002 toward the front region. For example, the lamp room 2020 is defined by a housing 2021 including a lamp body having an opening on a vehicle front side and a translucent cover attached to cover the opening of the lamp body. The housing 2021 is fixed to a vehicle body. The translucent cover constitutes the light emission surface 2022. The second imaging device 2006 housed in the lamp room 2020 captures the front region through the light emission surface 2022.

In the present embodiment, the light distribution control device 2008, the cleaning control device 2012, and the heater control device 2016 are also housed in the lamp room 2020. These devices may be provided outside the lamp room 2020, in other words, on a vehicle 2300 side. A posture of the cleaning device 2010 is decided such that a cleaning liquid can be ejected toward the light emission surface 2022, and the cleaning device 2010 is fixed to the vehicle body or the housing 2021. The heater 2014 is fixed to the vehicle body or the housing 2021 at a position where heat can be transferred to the light emission surface 2022. The first imaging device 2004 and the notification device 2018 are disposed outside the lamp room 2020, that is, on the vehicle 2300 side. For example, the first imaging device 2004 is a so-called in-vehicle camera provided in a vehicle interior. The notification device 2018 includes, for example, a warning light (indicator) or the like provided on an instrument panel of the vehicle 2300.

The light distribution control device 2008 controls the formation of the light distribution pattern PTN by the vehicle lamp 2002 based on the first image IMG2001 and the second image IMG2002. The light distribution control device 2008 of the present embodiment executes ADB control for dynamically and adaptively controlling the light distribution pattern PTN to be supplied to the vehicle lamp 2002. The light distribution control device 2008 can be a digital processor, and may be, for example, a combination of a microcomputer including a CPU and a software program, or may be configured by a field programmable gate array (FPGA), an application specified IC (ASIC), or the like. The light distribution control device 2008 includes an information processor 2024, a control executer 2026, and a control regulator 2028. An integrated circuit constituting the part itself executes a program retained in a memory, and thus, each part operates.

Figure 2A:
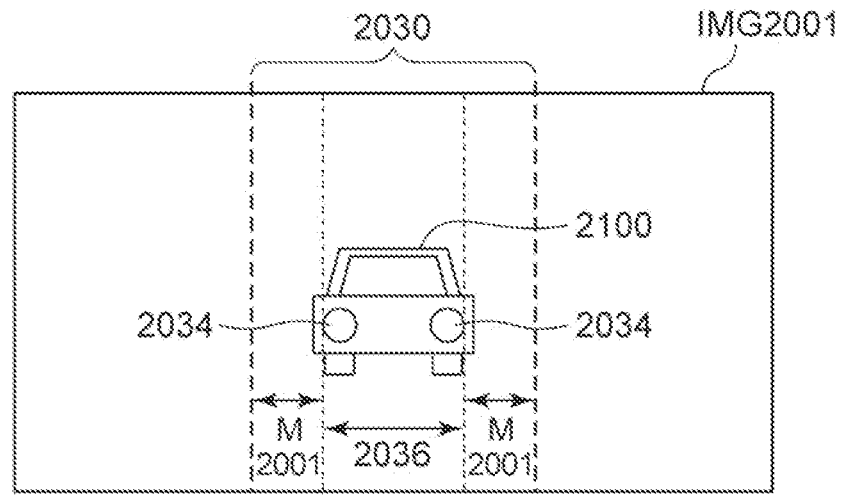
FIGS. 2A to 2C are schematic diagrams for explaining light distribution control.
Figure 2B:
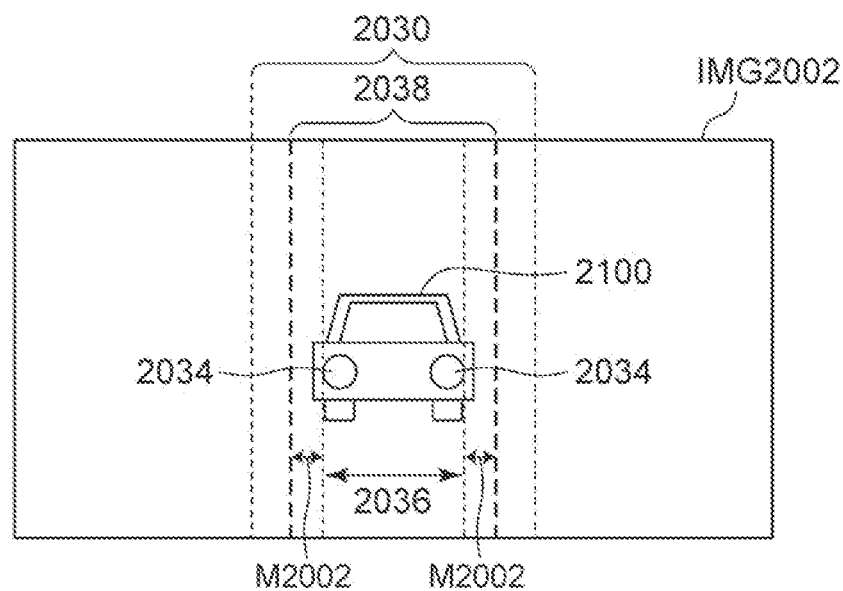
Figure 2C:
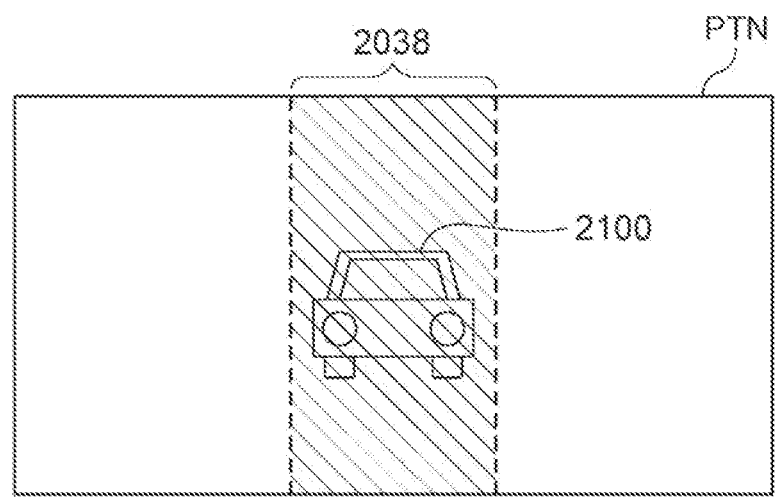

FIGS. 2A to 2C are schematic diagrams for explaining light distribution control. The information processor 2024 acquires information of a first light shielding part 2030 from the outside. The information processor 2024 of the present embodiment acquires information of the first light shielding part 2030 from the vehicle ECU 2032 mounted on the vehicle 2300. The vehicle ECU 2032 generates the information of the first light shielding part 2030 as part of control in advanced driver-assistance systems (ADAS), for example. The "light shielding part" is a part where luminance (illuminance) provided in a predetermined region of the light distribution pattern PTN is zero, or a portion where the luminance (illuminance) is lower than a luminance before light shielding. As illustrated in FIG. 2A, the first light shielding part 2030 is provided in a region obtained by adding a first margin M2001 to a presence range 2036 of the front vehicle 2100 in the first image IMG2001. The front vehicle 2100 includes the preceding vehicle and the oncoming vehicle.

The vehicle ECU 2032 executes highly accurate image analysis on the first image IMG2001 by using a known method including algorithm recognition, deep learning, and the like, and detects the presence range 2036 of the front vehicle 2100. The high-definition first image IMG2001 is used for detecting the presence range 2036, and thus, the first light shielding part 2030 can be decided with higher accuracy.

For example, the front vehicle 2100 has a pair of light spots 2034 corresponding to the lamp. The pair of light spots 2034 correspond to a headlamp when the front vehicle 2100 is the oncoming vehicle, and correspond to a rear lamp when the front vehicle 2100 is the preceding vehicle. The rear lamp includes a stop lamp and a tail lamp. Thus, the vehicle ECU 2032 decides the presence range 2036 of the front vehicle 2100 based on the pair of light spots 2034 in the first image IMG2001. The presence range 2036 as an example is a range from a left end of the left light spot 2034 to a right end of the right light spot 2034. The vehicle ECU 2032 may decide the presence range 2036 from an outline of the front vehicle 2100.

The vehicle ECU 2032 adds the first margin M2001 to both sides in a vehicle width direction in the specified presence range 2036 to generate the information of the first light shielding part 2030. The vehicle ECU 2032 retains information of the first margin M2001 in advance. A size of the first margin M2001 can be appropriately set based on an experiment or simulation by a designer. The vehicle ECU 2032 generates, as information of the first light shielding part 2030, angle information of the first light shielding part 2030 with respect to the host vehicle. The vehicle ECU 2032 sends the information of the first light shielding part 2030 to the information processor 2024. The information of the first light shielding part 2030 may be generated by the information processor 2024.

As illustrated in FIG. 2B, the information processor 2024 decides a second light shielding part 2038 on the second image IMG2002 by using the information of the first light shielding part 2030. The information processor 2024 overlaps the first light shielding part 2030 on the second image IMG2002. The light spot 2034 derived from the front vehicle 2100 is detected in an overlapping region overlapping the first light shielding part 2030 in the second image IMG2002. As an example, the information processor 2024 retains a predetermined luminance threshold value in advance. The luminance threshold value can be appropriately set based on an experiment or simulation by a designer. The information processor 2024 binarizes a luminance value of each pixel in the overlapping region of the second image IMG2002 by using the luminance threshold value. Two light spots 2034 arranged at predetermined intervals in a vehicle width direction obtained by binarization processing are determined as the light spot 2034 derived from the front vehicle 2100.

The information processor 2024 decides the presence range 2036 of the front vehicle 2100 based on the light spot 2034 detected in the overlapping region of the second image IMG2002. For example, the information processor 2024 decides, as the presence range 2036, a range from the left end of the left light spot 2034 to the right end of the right light spot 2034. A second margin M2002 narrower than the first margin M2001 is added to the presence range 2036 to decide the second light shielding part 2038. The information processor 2024 retains information of the second margin M2002 in advance. A size of the second margin M2002 can be appropriately set based on an experiment or simulation by a designer. The information processor 2024 may use the presence range 2036 itself as the second light shielding part 2038 without adding the second margin M2002 to the presence range 2036 of the front vehicle 2100. The information processor 2024 generates, as information of the second light shielding part 2038, angle information of the second light shielding part 2038 with respect to the host vehicle. The information processor 2024 sends the information of the second light shielding part 2038 to the control executer 2026.

The control executer 2026 executes light distribution control for forming the light distribution pattern PTN. In the light distribution control, the control executer 2026 decides the light distribution pattern PTN including the second light shielding part 2038 as illustrated in FIG. 2C. The control executer 2026 sends information of the light distribution pattern PTN to the vehicle lamp 2002. For example, when the vehicle lamp 2002 includes the DMD, the vehicle lamp 2002 performs control such that the light source is turned on or off and each mirror element constituting the DMD is switched between an on state and an off state based on the received information of the light distribution pattern PTN. As a result, the light distribution pattern PTN including the second light shielding part 2038 is formed in the front region of the host vehicle. The light distribution pattern PTN including the second light shielding part 2038 is formed, and thus, it is possible to improve the visibility of the driver of the host vehicle while glare given to the front vehicle 2100 is reduced.

The first light shielding part 2030 is decided based on the first image IMG2001 generated by the first imaging device 2004 disposed outside the lamp room 2020. On the other hand, the second light shielding part 2038 is decided based on the second image IMG2002 generated by the second imaging device 2006 housed in the lamp room 2020. The first imaging device 2004 is farther from the vehicle lamp 2002 than the second imaging device 2006. Accordingly, a deviation between an optical axis of the first imaging device 2004 and an optical axis of the vehicle lamp 2002 is larger than a deviation between an optical axis of the second imaging device 2006 and an optical axis of the vehicle lamp 2002. That is, parallax between the vehicle lamp 2002 and the first imaging device 2004 with respect to the front vehicle 2100 is larger than parallax between the vehicle lamp 2002 and the second imaging device 2006.

Thus, the light shielding part decided based on the first image IMG2001 is likely to be deviated from the front vehicle 2100 as compared with the light shielding part decided based on the second image IMG2002. Thus, the first margin M2001 added to the presence range 2036 of the front vehicle 2100 when the first light shielding part 2030 is decided is set to be larger than the second margin M2002 added to the presence range 2036 when the second light shielding part 2038 is decided. Conversely, since the second margin M2002 is decided based on the second image IMG2002, the second margin M2002 can be set to be smaller than the first margin M2001.

On the other hand, the first image IMG2001 is a high-definition image as compared with the second image IMG2002, and the vehicle ECU 2032 detects the front vehicle 2100 by performing high-definition image processing. Thus, the front vehicle 2100 can be detected with high accuracy. Accordingly, the light spot 2034 is detected in the overlapping region overlapping the first light shielding part 2030 in the second image IMG2002, and thus, it is possible to suppress detection omission and erroneous determination of the front vehicle 2100. By executing the detection processing of the light spot 2034 only in the overlapping region in the second image IMG2002, a processing time can be shortened, and a load applied to the information processor 2024 can be reduced, as compared with a case where the detection processing is executed on the entire second image IMG2002.

The vehicle ECU 2032 generates the information of the first light shielding part 2030 by highly accurate image analysis for the first image IMG2001. Thus, the information of the first light shielding part 2030 is updated at a low speed. For example, the vehicle ECU 2032 updates the information of the first light shielding part 2030 every 30 ms. On the other hand, the information processor 2024 generates the information of the second light shielding part 2038 by binarization processing of luminance for the second image IMG2002. Thus, the information of the second light shielding part 2038 is updated at a high speed. For example, the information processor 2024 updates the information of the second light shielding part 2038 every 0.1 ms to 5 ms.

Accordingly, the light distribution pattern PTN including the second light shielding part 2038 is formed, and thus, the light distribution pattern PTN can be updated at a higher speed as compared with a case where the light distribution pattern PTN including the first light shielding part 2030 is formed. Thus, the light distribution pattern PTN more suitable for a situation of the front region can be formed. Until the information of the first light shielding part 2030 is updated, the second light shielding part 2038 is decided based on the information of the same first light shielding part 2030. The movement of the front vehicle 2100 while the first light shielding part 2030 is updated generally falls within the first light shielding part 2030. Thus, until the information of the first light shielding part 2030 is updated, even though the second light shielding part 2038 is decided based on the same first light shielding part 2030, the second light shielding part 2038 can be caused to accurately follow the front vehicle 2100.

The control regulator 2028 determines whether or not at least one of the following regulation conditions (i) to (iv) is satisfied in the light distribution control, and executes the regulation control when any one of the regulation conditions is satisfied. In the regulation control, the control regulator 2028 transmits a regulation signal to the control executer 2026 to regulate (stop) the light distribution control by the control executer 2026. The control regulator 2028 controls the vehicle lamp 2002 to form the light distribution pattern PTN including the first light shielding part 2030.

Figure 3A:
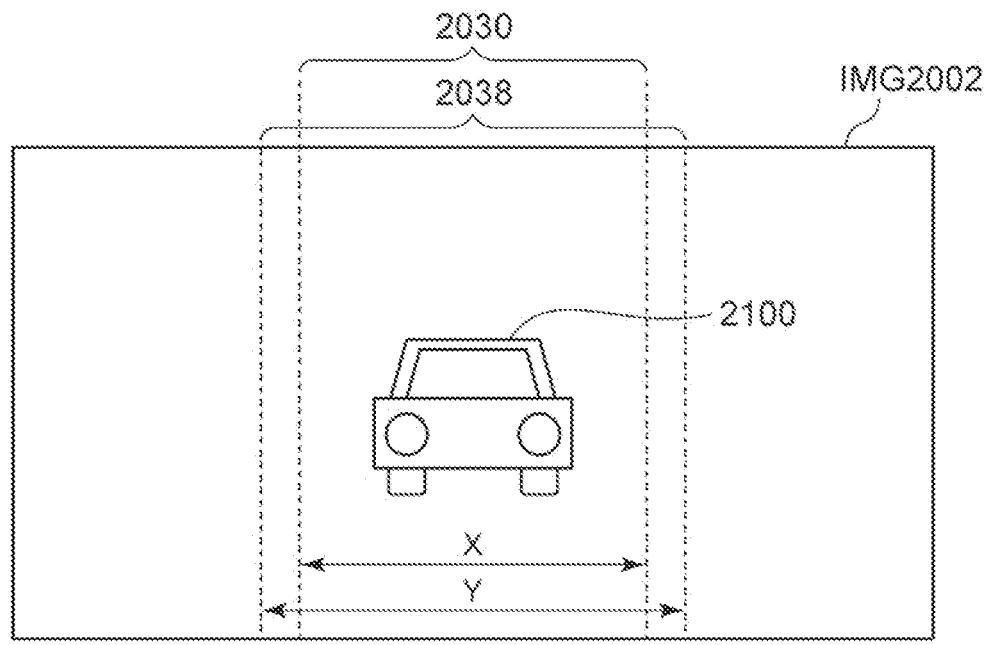
FIGS. 3A and 3B are schematic diagrams for explaining regulation conditions.

FIGS. 3A, 3B, 4A, and 4B are schematic diagrams for explaining the regulation condition. As illustrated in FIG. 3A, the regulation condition (i) is that a width X of the first light shielding part 2030 is less than a width Y of the second light shielding part 2038 (X<Y). As described above, the first margin M2001 included in the first light shielding part 2030 is wider than the second margin M2002 included in the second light shielding part 2038. Thus, normally, the width X of the first light shielding part 2030 is to be larger than the width Y of the second light shielding part 2038 (X>Y).

Accordingly, when the width X is less than the width Y, it can be determined that there is a concern that the control executer 2026 is not able to perform correct light distribution control. Thus, the control regulator 2028 executes the regulation control when the regulation condition (i) is satisfied. The regulation condition (i) may be satisfied, for example, when the second imaging device 2006 cannot normally capture the front region due to adhesion of a foreign matter to the light emission surface 2022, a failure of the second imaging device 2006 itself, or the like.

Examples of the foreign matter adhering to the light emission surface 2022 include mud and snow.

Figure 3B:
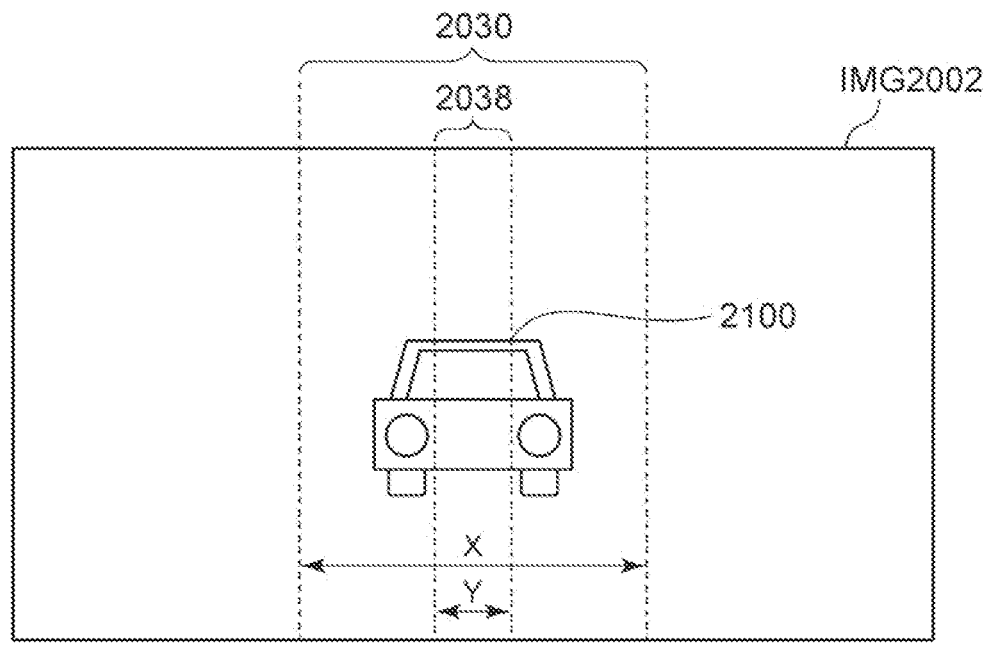

As illustrated in FIG. 3B, the regulation condition (ii) is that a difference between the width X and the width Y is a predetermined value or more (X>>Y). As described above, the first light shielding part 2030 is a range obtained by adding the first margin M2001 to the presence range 2036 of the front vehicle 2100. The second light shielding part 2038 is a range obtained by adding the second margin M2002 to the presence range 2036 of the front vehicle 2100. Thus, normally, the difference between the width X and the width Y is to fall within a predetermined range.

Accordingly, when the width X is extremely greater than the width Y, that is, when the difference between the width X and the width Y is equal to or greater than the predetermined value, it can be determined that there is a concern that the control executer 2026 is not able to perform correct light distribution control. Thus, the control regulator 2028 executes the regulation control when the regulation condition (ii) is satisfied. For example, the control regulator 2028 retains a threshold value of the difference between the width X and the width Y in advance, and executes the regulation control when the difference between the width X and the width Y is equal to or greater than the threshold value. The "predetermined value" and the "threshold value" can be appropriately set based on an experiment or simulation by a designer.

The regulation condition (ii) may be satisfied, for example, when the second imaging device 2006 cannot normally capture the front region due to adhesion of a foreign matter to the light emission surface 2022, a failure of the second imaging device 2006 itself, or the like. The regulation condition (ii) may be satisfied, for example, when one side of the lamp of the front vehicle 2100 is turned off and when the presence range 2036 of the front vehicle 2100 used for deciding the first light shielding part 2030 is decided from the outline of the front vehicle 2100.

Figure 4A:
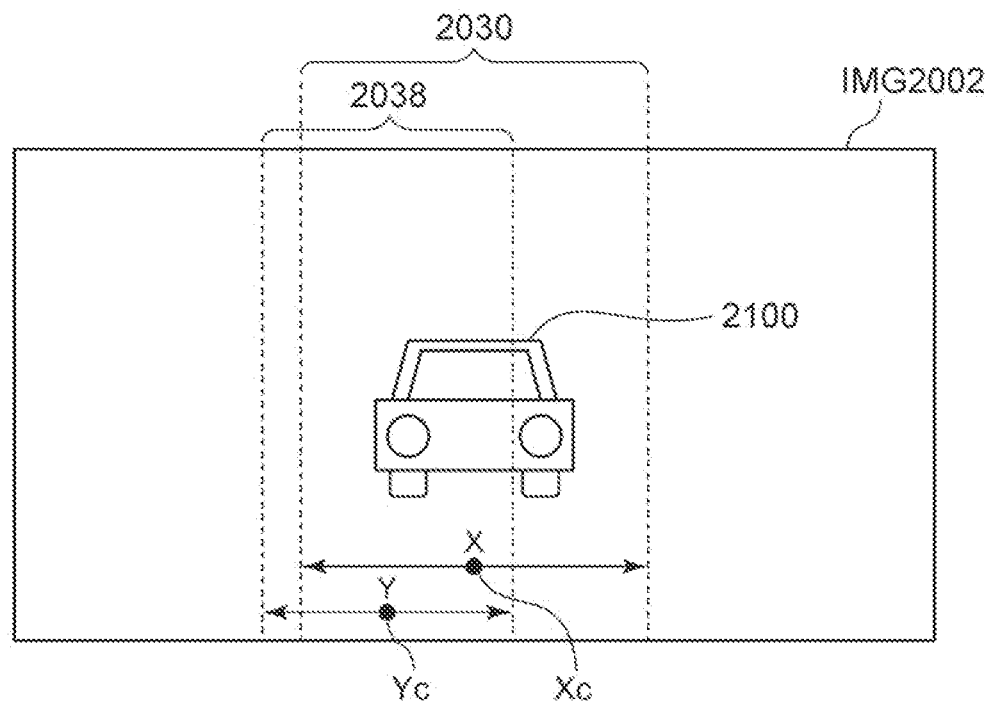
FIGS. 4A and 4B are schematic diagrams for explaining regulation conditions.

As illustrated in FIG. 4A, the regulation condition (iii) is that a center Xc of the width X and a center Yc of the width Y are deviated from each other by a predetermined amount or more in a width direction. As described above, the first light shielding part 2030 is a range obtained by adding the first margin M2001 to the presence range 2036 of the front vehicle 2100. The second light shielding part 2038 is a range obtained by adding the second margin M2002 to the presence range 2036 of the front vehicle 2100. Thus, normally, the center Xc of the width X and the center Yc of the width Y are to substantially coincide with each other.

Accordingly, when the center Xc of the width X and the center Yc of the width Y are deviated from each other by a predetermined amount or more in the width direction, it can be determined that there is a concern that the control executer 2026 is not able to perform correct light distribution control. Thus, the control regulator 2028 executes the regulation control when the regulation condition (iii) is satisfied. For example, the control regulator 2028 retains a threshold value of the deviation amount in advance, and executes the regulation control when the deviation amount in the width direction between the center Xc and the center Yc is equal to or greater than the threshold value. The "predetermined amount" and the "threshold value" can be appropriately set based on an experiment or simulation by a designer. For example, the predetermined amount and the threshold value are half the width X. The regulation condition (iii) may be satisfied, for example, when the second imaging device 2006 cannot normally capture the front region due to adhesion of a foreign matter to the light emission surface 2022, a failure of the second imaging device 2006 itself, a deviation in the optical axis of the second imaging device 2006, or the like.

Figure 4B:
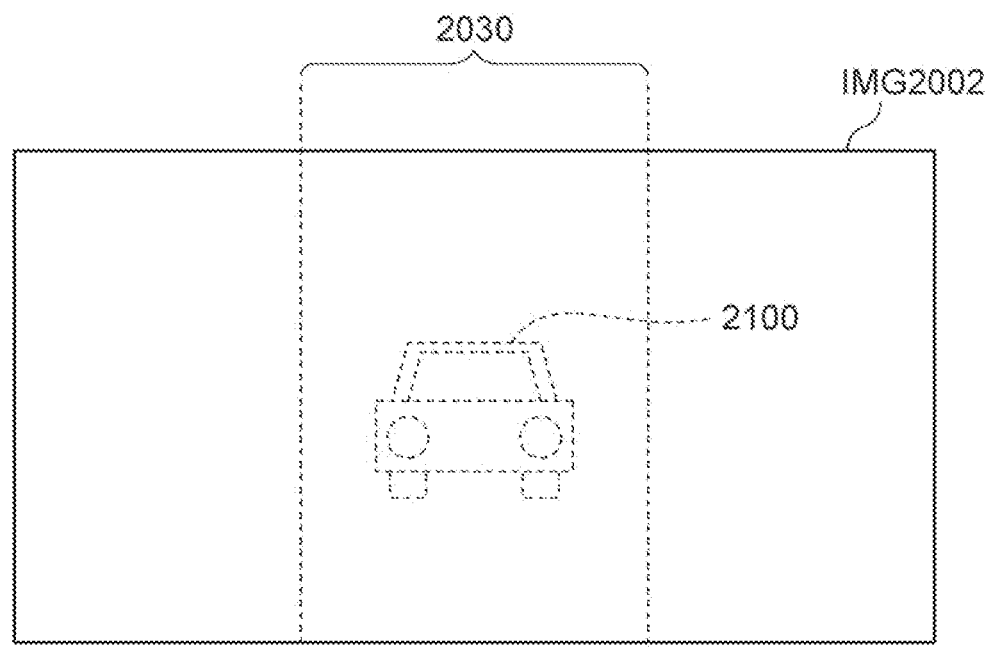

As illustrated in FIG. 4B, the regulation condition (iv) is that the light spot 2034 is not detected in the overlapping region overlapping the first light shielding part 2030 in the second image IMG2002. As described above, the first light shielding part 2030 is a range obtained by adding the first margin M2001 to the presence range 2036 of the front vehicle 2100. Accordingly, the first light shielding part 2030 naturally includes the light spot 2034 derived from the front vehicle 2100. Thus, usually, the light spot 2034 is also to be present in the overlapping region.

Accordingly, when the light spot 2034 is not detected in the overlapping region, it can be determined that there is a concern that the control executer 2026 is not able to perform correct light distribution control. Thus, the control regulator 2028 executes the regulation control when the regulation condition (iv) is satisfied. The regulation condition (iv) may be satisfied, for example, when the second imaging device 2006 cannot normally capture the front region due to adhesion of a foreign matter to the light emission surface 2022, a failure of the second imaging device 2006, or the like.

When at least one of the regulation conditions (i) to (iv) is satisfied, the light distribution pattern PTN including the first light shielding part 2030 is formed by prohibiting the formation of the light distribution pattern PTN including the second light shielding part 2038, and thus, glare can be prevented from being given to the driver or the like of the front vehicle 2100.

When at least one of the regulation conditions (i) to (iv) is satisfied, the control regulator 2028 transmits a drive signal to at least one of the cleaning control device 2012, the heater control device 2016, and the notification device 2018.

When the drive signal is received, the cleaning control device 2012 drives the cleaning device 2010. The cleaning device 2010 is, for example, a known headlamp cleaner. The cleaning device 2010 can clean the light emission surface 2022 by ejecting the cleaning liquid toward the light emission surface 2022. As a result, the cause of the regulation condition can be eliminated.

When the drive signal is received, the heater control device 2016 drives the heater 2014. The heater 2014 heats the light emission surface 2022. As a result, the cause of the regulation condition can be eliminated.

When the drive signal is received, the notification device 2018 notifies an occupant of the vehicle 2300 that at least one of the regulation conditions is satisfied. As described above, the notification device 2018 includes, for example, a warning light or the like provided on an instrument panel, and notifies the occupant of occurrence of a situation satisfying the regulation condition by turning on the warning light. As a result, it is possible to promote the elimination of the cause of the regulation condition.

The control regulator 2028 may cause driving of at least one of the cleaning device 2010 and the heater 2014 to precede driving of the notification device 2018. For example, the control regulator 2028 drives the cleaning device 2010 and/or the heater 2014, and drives the notification device 2018 when the regulation condition is not eliminated even though the subsequent number of times of determination of the regulation condition exceeds a predetermined number of times or when the regulation condition is not eliminated even though a predetermined time elapses from the start of driving of the cleaning device 2010 and the heater 2014. The "predetermined number of times" and the "predetermined time" can be appropriately set based on an experiment or simulation by a designer.

Figure 5:
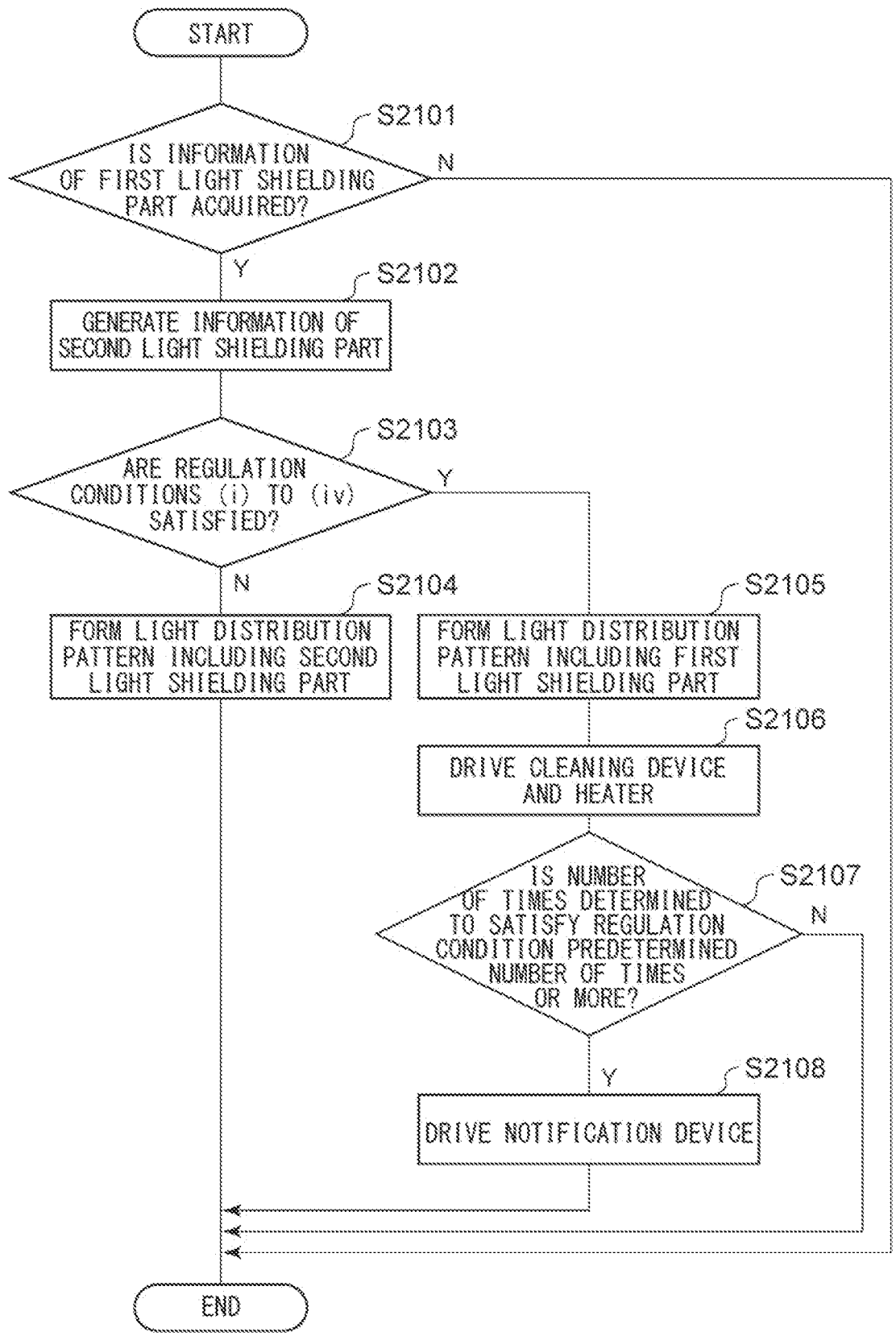
FIG. 5 is a flowchart illustrating an example of control executed by a light distribution control device according to the first embodiment.

FIG. 5 is a flowchart illustrating an example of control executed by the light distribution control device 2008 according to the first embodiment. This flow is repeatedly executed at a predetermined timing when, for example, an instruction to execute the control by a light switch (not illustrated) and an ignition is turned on.

The light distribution control device 2008 determines whether or not the information of the first light shielding part 2030 is acquired (S2101). When the information of the first light shielding part 2030 is not acquired (N in S2101), this routine is ended. When the information of the first light shielding part 2030 is acquired (Y in S2101), the light distribution control device 2008 generates the information of the second light shielding part 2038 (S2102). Subsequently, the light distribution control device 2008 determines whether or not any one of the regulation conditions (i) to (iv) is satisfied (S2103). When none of the regulation conditions is satisfied (N in S2103), the light distribution control device 2008 controls the vehicle lamp 2002 to form the light distribution pattern PTN including the second light shielding part 2038 (S2104), and ends this routine.

When any one of the regulation conditions is satisfied (Y in S2103), the light distribution control device 2008 counts up the number of times determined to satisfy the regulation condition, and controls the vehicle lamp 2002 to form the light distribution pattern PTN including the first light shielding part 2030 (S2105). The light distribution control device 2008 drives the cleaning device 2010 and the heater 2014 (S2106). The light distribution control device 2008 determines whether or not the number of times determined to satisfy the regulation condition in step S2103 is a predetermined number of times or more (S2107). When the number of times is the predetermined number of times or more (Y in S2107), the light distribution control device 2008 drives the notification device 2018 (S2108), and ends this routine. When the number of times is less than the predetermined number of times (N in S2107), the light distribution control device 2008 ends this routine.

As described above, the vehicle lamp system 2001 according to the present embodiment includes the vehicle lamp 2002 capable of forming the light distribution pattern PTN including the light shielding part in the front region of the vehicle 2300, the first imaging device 2004 that is disposed outside the lamp room 2020 and captures the front region to generate the first image IMG2001, the second imaging device 2006 that is disposed within the lamp room 2020 and captures the front region to generate the second image IMG2002, and the light distribution control device 2008 that controls the formation of the light distribution pattern PTN by the vehicle lamp 2002.

The light distribution control device 2008 includes an information processor 2024, a control executer 2026, and a control regulator 2028. The information processor 2024 acquires from the outside or generates the information of the first light shielding part 2030 obtained by adding the first margin M2001 to the presence range 2036 of the front vehicle 2100 in the first image IMG2001, and decides the second light shielding part 2038 obtained by adding the second margin M2002 narrower than the first margin M2001 to the presence range 2036 of the front vehicle 2100 decided based on the light spot 2034 in the overlapping region overlapping the first light shielding part 2030 in the second image IMG2002 or the second light shielding part 2038 obtained by not adding the second margin M2002 to the presence range 2036. The control executer 2026 executes light distribution control for forming the light distribution pattern PTN including the second light shielding part 2038.

In the light distribution control, when at least one of the conditions of the condition (i) in which the width X of the first light shielding part 2030 is less than the width Y of the second light shielding part 2038, the condition (ii) in which the difference between the width X and the width Y is equal to or greater than the predetermined value, the condition (iii) in which the center Xc of the width X and the center Yc of the width Y are deviated by a predetermined amount or more in the width direction, and the condition (iv) in which the light spot 2034 is not detected in the overlapping region is satisfied, the control regulator 2028 controls the vehicle lamp 2002 to form the light distribution pattern PTN including the first light shielding part 2030 by regulating the light distribution control.

As a result, it is possible to improve the visibility of the driver of the host vehicle by ADB control, and it is possible to more reliably prevent the front vehicle 2100 from being erroneously irradiated with light. Thus, the safety of vehicle driving can be further improved.

The vehicle lamp system 2001 of the present embodiment includes the cleaning device 2010 that cleans the light emission surface 2022 from which light of the vehicle lamp 2002 is emitted, and the cleaning control device 2012 that drives the cleaning device 2010 when at least one of the regulation conditions is satisfied. The vehicle lamp system 2001 includes the heater 2014 that heats the light emission surface 2022 and the heater control device 2016 that drives the heater 2014 when at least one of the regulation conditions is satisfied. As a result, the cause of the regulation condition can be eliminated. The vehicle lamp system 2001 includes the notification device 2018 that notifies the occupant of the vehicle 2300 that at least one of the regulation conditions is satisfied. As a result, it is possible to promote the elimination of the cause of the regulation condition.

The first embodiment of the present invention has been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

The first embodiment may be specified by items to be described below.

[Item 1]

There is provided a light distribution control device (2008) structured to control formation of a light distribution pattern (PTN) by a vehicle lamp (2002) structured to be able to form a light distribution pattern (PTN) including a light shielding part in a front region of a vehicle (2300).

The light distribution control device (2008) includes an information processor (2024) structured to acquire from an outside or generate information of a first light shielding part (2030) obtained by adding a first margin (M2001) to a presence range (2036) of a front vehicle (2100) in a first image (IMG2001) captured by a first imaging device (2004) disposed outside a lamp room (2020) in which the vehicle lamp (2002) is housed, acquire a second image (IMG2002) captured by a second imaging device (2006) housed in the lamp room (2020), and decide a second light shielding part (2038) obtained by adding a second margin (M2002) narrower than the first margin (M2001) to the presence range (2036) of the front vehicle (2100) decided based on a light spot (2034) of an overlapping region overlapping the first light shielding part (2030) in the second image (IMG2002) or a second light shielding part (2038) obtained by not adding the second margin (M2002) to the presence range (2036), a control executer (2026) structured to execute light distribution control for forming a light distribution pattern (PTN) including the second light shielding part (2038), and a control regulator (2028) structured to control the vehicle lamp (2002) to form a light distribution pattern (PTN) including the first light shielding part (2030) by regulating the light distribution control when at least one condition of a condition (i) in which a width X of the first light shielding part (2030) is less than a width Y of the second light shielding part (2038), a condition (ii) in which a difference between the width X and the width Y is equal to or greater than a predetermined value, a condition (iii) in which a center (Xc) of the width X and a center (Yc) of the width Y are deviated in a width direction by a predetermined amount or more, and a condition (iv) in which a light spot (2034) is not detected in the overlapping region is satisfied in the light distribution control.

[Item 2]

There is provided a light distribution control method for controlling formation of a light distribution pattern (PTN) by a vehicle lamp (2002) structured to be able to form a light distribution pattern (PTN) including a light shielding part in a front region of a vehicle (2300).

The light distribution control method includes acquiring from an outside or generating information of a first light shielding part (2030) obtained by adding a first margin (M2001) to a presence range (2036) of a front vehicle (2100) in a first image (IMG2001) captured by a first imaging device (2004) disposed outside a lamp room (2020) in which the vehicle lamp (2002) is housed, acquiring a second image (IMG2002) captured by a second imaging device (2006) housed in the lamp room (2020), and deciding a second light shielding part (2038) obtained by adding a second margin (M2002) narrower than the first margin (M2001) to the presence range (2036) of the front vehicle (2100) decided based on a light spot (2034) of an overlapping region overlapping the first light shielding part (2030) in the second image (IMG2002) or a second light shielding part (2038) obtained by not adding the second margin (M2002) to the presence range (2036), executing light distribution control for forming a light distribution pattern (PTN) including the second light shielding part (2038), and controlling the vehicle lamp (2002) to form a light distribution pattern (PTN) including the first light shielding part (2030) by regulating the light distribution control when at least one condition of a condition (i) in which a width X of the first light shielding part (2030) is less than a width Y of the second light shielding part (2038), a condition (ii) in which a difference between the width X and the width Y is equal to or greater than a predetermined value, a condition (iii) in which a center (Xc) of the width X and a center (Yc) of the width Y are deviated in a width direction by a predetermined amount or more, and a condition (iv) in which the a light spot (2034) is not detected in the overlapping region is satisfied in the light distribution control.

Second Embodiment

Figure 6:
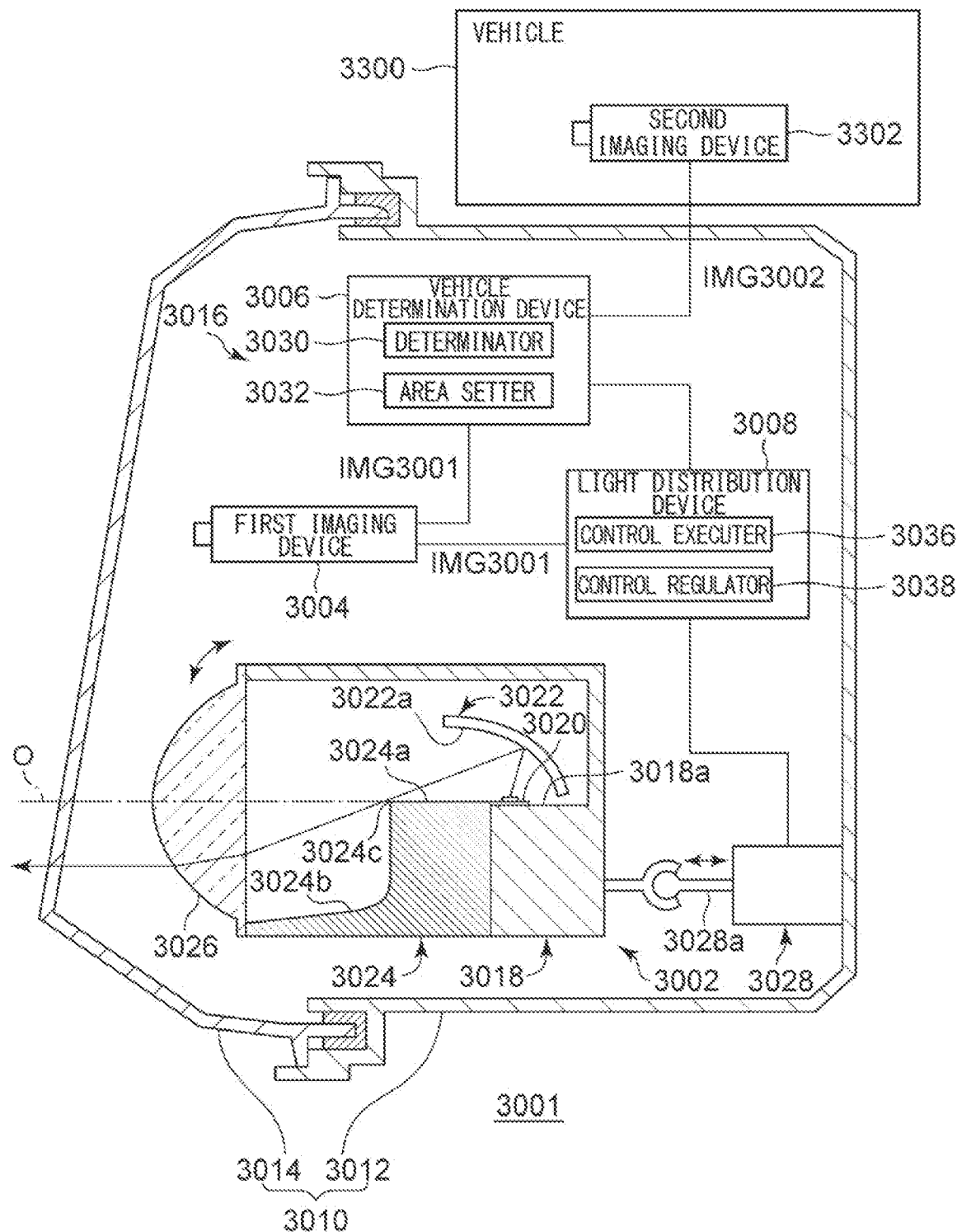
FIG. 6 is a diagram illustrating a schematic configuration of a vehicle lamp system according to a second embodiment.

FIG. 6 is a diagram illustrating a schematic configuration of a vehicle lamp system according to a Second embodiment. In FIG. 6, some of components of a vehicle lamp system 3001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software.

The vehicle lamp system 3001 includes a vehicle lamp 3002, a first imaging device 3004, a vehicle determination device 3006, and a light distribution control device 3008. The vehicle lamp 3002, the first imaging device 3004, the vehicle determination device 3006, and the light distribution control device 3008 are housed in a lamp room 3016. The lamp room 3016 of the present embodiment is defined by a housing 3010 including a lamp body 3012 having an opening on a vehicle front side and a translucent cover 3014 attached to cover the opening of the lamp body 3012. The vehicle determination device 3006 and the light distribution control device 3008 may be provided outside the lamp room 3016, in other words, on a vehicle 3300 side.

The vehicle lamp 3002 includes a light source mounting part 3018, a light source 3020, a reflector 3022, a shade member 3024, a projection lens 3026, and a leveling actuator 3028. The light source mounting part 3018 is made of, for example, a metal material such as aluminum, and is supported by the lamp body 3012 with a bracket (not illustrated) interposed therebetween. The light source mounting part 3018 has a light source mounting surface 3018a. The light source mounting surface 3018a of the present embodiment extends in a substantially horizontal direction. The light source 3020 is mounted on the light source mounting surface 3018a.

The light source 3020 is, for example, a light emitting diode (LED). The light source 3020 may be a semiconductor light source other than an LED such as a laser diode (LD) or an organic or inorganic electroluminescence (EL), an incandescent lamp, a halogen lamp, a discharge bulb, or the like. The light source 3020 emits light toward the reflector 3022.

The reflector 3022 has a substantially dome shape, is disposed so as to cover the light source 3020 from above in a vertical direction, and is fixed to the light source mounting part 3018. The reflector 3022 has a reflecting surface 3022a constituted by a part of a spheroidal surface. The reflecting surface 3022a has a first focal point and a second focal point positioned on a front side of the lamp from the first focal point. The reflector 3022 has a positional relationship with the light source 3020 decided such that the light source 3020 substantially coincides with the first focal point of the reflecting surface 3022a.

The shade member 3024 is fixed to the front side of the lamp of the light source mounting part 3018. The shade member 3024 includes a flat part 3024a disposed substantially horizontally, and a curved part 3024*b* positioned on the front side of the lamp of the flat part 3024*a*. The curved part 3024*b* is curved downward so as not to block the incidence of the light source light on the projection lens 3026. The reflector 3022 has a positional relationship with the shade member 3024 decided such that a ridge line 3024*c* formed by the flat part 3024*a* and the curved part 3024*b* is positioned in the vicinity of the second focal point of the reflecting surface 3022*a*.

The projection lens 3026 is fixed to a distal end of the curved part 3024*b*. For example, the projection lens 3026 consists of a plano-convex aspherical lens, and projects, as an inverted image, a light source image formed on a rear focal plane on a virtual vertical screen in front of the lamp. The projection lens 3026 is disposed on an optical axis O of the vehicle lamp 3002 such that the rear focal point substantially coincides with the second focal point of the reflecting surface 3022*a*.

The light emitted from the light source 3020 is reflected by the reflecting surface 3022*a*, and is incident on the projection lens 3026 through the vicinity of the ridge line 3024*c*. The light incident on the projection lens 3026 is emitted, as substantially parallel light, to the front of the lamp. At this time, the shade member 3024 partially blocks the emission of the light source 3020 to the front of the lamp. Specifically, a part of the light emitted from the light source 3020 is reflected on the flat part 3024*a*. That is, the light of the light source 3020 is selectively cut with the ridge line 3024*c* as a boundary line. As a result, a light distribution pattern including a cutoff line corresponding to a shape of the ridge line 3024*c*, that is, a low beam light distribution pattern is formed in a front region of the vehicle.

The leveling actuator 3028 is connected to the light source mounting part 3018. The leveling actuator 3028 includes, for example, a rod 3028*a*, a motor that expands and contracts the rod 3028*a* in a front-rear direction of the lamp, and the like. The vehicle lamp 3002 is in a backward tilting posture and a forward tilting posture by expanding and contracting of the rod 3028*a* in the front-rear direction of the lamp, and thus, the optical axis O can be displaced in an up-down direction. The driving of the leveling actuator 3028 is controlled by the light distribution control device 3008.

A structure of each part of the vehicle lamp 3002 is not limited to the above-described structure. For example, the shade member 3024 may be a shutter type in which a shade plate moves forward and backward with respect to the optical axis O. The vehicle lamp 3002 may not include the reflector 3022 or the projection lens 3026.

The first imaging device 3004 has sensitivity in a visible light region, and is housed in the lamp room 3016 to capture the front region of the vehicle. The first imaging device 3004 may be able to measure at least a luminance distribution in the front region. For example, the first imaging device 3004 includes a camera having a relatively small resolution of 300,000 pixels to less than 5 million pixels and a relatively high frame rate of 200 fps to 10,000 fps (0.1 ms to 5 ms per frame). Accordingly, an image IMG3001 generated by the first imaging device 3004 has a relatively low definition. The image IMG3001 acquired by the first imaging device 3004 is sent to the vehicle determination device 3006 and the light distribution control device 3008. The first imaging device 3004 sends the image IMG3001 to the vehicle determination device 3006 and the light distribution control device 3008 whenever the image IMG3001 is acquired.

The vehicle determination device 3006 determines whether or not there is a line of front vehicles based on the image IMG3001 captured by the first imaging device 3004.

The vehicle determination device 3006 can be a digital processor, and may be, for example, a combination of a microcomputer including a CPU and a software program, or may be configured by a field programmable gate array (FPGA), an application specified IC (ASIC), or the like. The vehicle determination device 3006 includes a determinator 3030 and an area setter 3032. An integrated circuit constituting the part itself executes a program retained in a memory, and thus, each part operates.

Figure 7:
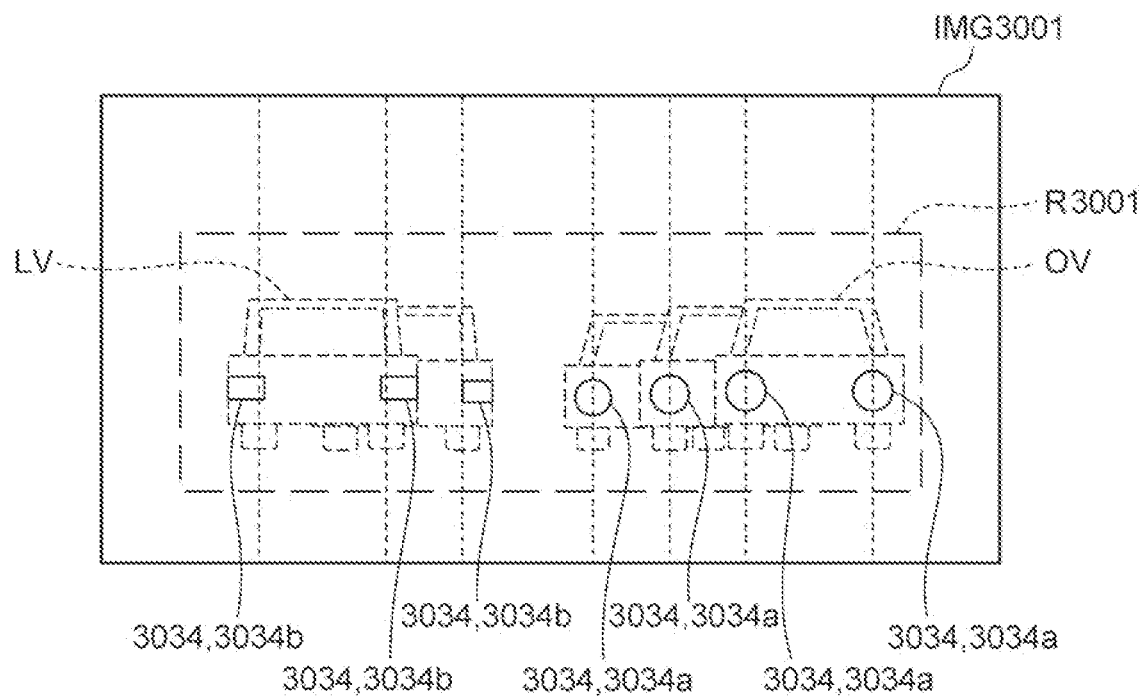
FIG. 7 is a schematic diagram for explaining a determination operation of a vehicle determination device.

FIG. 7 is a schematic diagram for explaining a determination operation of the vehicle determination device 3006. FIG. 7 illustrates the image IMG3001. When there are three or more light spots 3034 arranged in a vehicle width direction in the image IMG3001 captured by the first imaging device 3004, the determinator 3030 determines that there is a line of front vehicles. The line of front vehicles means, for example, a state in which a plurality of front vehicles are arranged in an extending direction of a road on a road on which the host vehicle travels, or a state in which a plurality of front vehicles are arranged in a width direction of the road.

The first imaging device 3004 is housed in the same housing 3010 as the vehicle lamp 3002. Thus, when a plurality of oncoming vehicles OV form a line, in the image IMG3001 captured by the first imaging device 3004, three or more light spots 3034*a* derived from headlamps of the oncoming vehicles OV are arranged approximately horizontally.

For example, when two oncoming vehicles OV which are a minimum number of components of the line are arranged in a front-rear direction, the entire head oncoming vehicle OV is captured. On the other hand, the entire following oncoming vehicle OV may be captured, or may partially overlap the head oncoming vehicle OV and only another part thereof may be captured. When only a part of the following oncoming vehicle OV is captured, two light spots 3034*a* derived from a pair of headlamps of the head oncoming vehicle OV and one light spot 3034*a* derived from one headlamp of the following oncoming vehicle OV are captured in the image IMG3001. Thus, when three or more light spots 3034*a* are arranged in the vehicle width direction, it can be determined that the oncoming vehicle OV forms the line.

Similarly in the case of the preceding vehicle LV, when a plurality of preceding vehicles LV form the line, in the image IMG3001 captured by the first imaging device 3004, three or more light spots 3034*b* derived from the rear lamp of the preceding vehicle LV are arranged approximately horizontally. The rear lamp includes a tail lamp and a stop lamp.

For example, when two preceding vehicles LV which are a minimum number of components of the line are arranged in a front-rear direction, the entire last preceding vehicle LV is captured. On the other hand, the entire leading preceding vehicle LV may be captured, or may partially overlap the last preceding vehicle LV and only another part thereof may be captured. When only a part of the leading preceding vehicle LV is captured, two light spots 3034*b* derived from a pair of rear lamps of the last preceding vehicle LV and one light spot 3034*b* derived from a rear lamp on one side of the leading preceding vehicle LV are captured in the image IMG3001. Thus, when three or more light spots 3034*b* are arranged in the vehicle width direction, it can be determined that the preceding vehicle LV forms the line.

The line of front vehicles may be a combination of the oncoming vehicle OV and the preceding vehicle LV. Even in this case, of the oncoming vehicle OV and the preceding vehicle LV, two light spots 3034 derived from the lamp of the vehicle closer to the host vehicle and one or more light spots 3034 derived from the lamp of the vehicle farther from the host vehicle are captured. Thus, when three or more light spots 3034 are arranged in the vehicle width direction, it can be determined that the oncoming vehicle OV and the preceding vehicle LV form the line.

The light spot 3034 derived from the lamp of the front vehicle can be extracted, for example, as follows. That is, the determinator 3030 retains a predetermined luminance threshold value in advance. The luminance threshold value can be appropriately set based on an experiment or simulation by a designer. The determinator 3030 binarizes a luminance value of each pixel in the image IMG3001 by using the luminance threshold value. As a result, the light spot 3034 derived from the lamp of the front vehicle is extracted in the image IMG3001.

When it is necessary to select the light spot 3034a derived from the headlamp of the oncoming vehicle OV and the light spot 3034b derived from the rear lamp of the preceding vehicle LV, for example, these light spots can be selected as follows. That is, the determinator 3030 can extract the light spot 3034a derived from the headlamp of the oncoming vehicle OV by a combination of grayscale conversion processing for the image IMG3001 and binarization of the luminance value of each pixel. The determinator 3030 can extract the light spot 3034b derived from the rear lamp of the preceding vehicle LV by a combination of HSV conversion processing on the image IMG3001, binarization of the color value of each pixel, and binarization of the luminance value of each pixel.

The area setter 3032 sets a presence possibility region R3001. The presence possibility region R3001 is a region where there is a possibility that there is the front vehicle. The area setter 3032 decides, as the presence possibility region R3001, a region excluding a predetermined range at both ends in the vehicle width direction and a predetermined range at both ends in the vertical direction in the image IMG3001. The ranges of both the ends in the vehicle width direction and both the ends in the vertical direction excluded from the presence possibility region R3001 can be appropriately set based on an experiment or simulation by a designer.

The area setter 3032 of the present embodiment receives an image IMG3002 from a second imaging device 3302 that is disposed outside the lamp room 3016 and captures the front region. The presence possibility region R3001 is set based on the image IMG3002. The area setter 3032 executes highly accurate image analysis on the image IMG3002 by using a known method including algorithm recognition, deep learning, and the like, and sets the presence possibility region R3001 on the image IMG3002.

The second imaging device 3302 is mounted, for example, in the vehicle interior of the host vehicle. The second imaging device 3302 has a resolution of, for example, 5 million pixels or more and a resolution higher than a resolution of the first imaging device 3004, and has a frame rate of, for example, 30 fps to 120 fps (about 8 ms to 33 ms per frame) and a frame rate lower than a frame rate of the first imaging device 3004. Accordingly, the image IMG3002 is a higher-definition image than the image IMG3001. Thus, the presence possibility region R3001 can be set with higher accuracy as compared with a case where the presence possibility region R3001 is set based on the image IMG3001.

The area setter 3032 corrects the range information of the presence possibility region R3001 on the image IMG3002 based on the parallax between the first imaging device 3004 and the second imaging device 3302. The obtained range information of the presence possibility region R3001 is sent to the determinator 3030. When there are three or more light spots 3034 arranged in the vehicle width direction within the presence possibility region R3001, the determinator 3030 determines that there is the line of front vehicles. As a result, even though there is a row of light spots derived from a building, a street light, or the like around the host vehicle within the image IMG3001, the light spot row can be excluded from a determination target, and the line of front vehicles can be determined with higher accuracy.

Preferably, when three or more light spots 3034 are arranged in the horizontal direction within the presence possibility region R3001 and at least a part of the light spots 3034 overlap in the vertical direction, the determinator 3030 determines that there is the line of front vehicles. As a result, it is possible to determine the line of front vehicles with higher accuracy. The determinator 3030 transmits a signal indicating the determination result to the light distribution control device 3008. The determinator 3030 may decide, as a row of light spot groups, a plurality of light spots 3034 deviated in the vertical direction and at least partially overlapping in the vehicle width direction, and may determine that there is the line of front vehicles when three or more rows of light spot groups are arranged in the vehicle width direction. As a result, it is possible to more easily determine the line of front vehicles.

The determinator 3030 of the present embodiment executes the line determination of the front vehicles whenever the image IMG3001 is acquired from the first imaging device 3004. The present invention is not particularly limited to this configuration, and the determinator 3030 may execute the line determination whenever the plurality of images IMG3001 are acquired.

As illustrated in FIG. 6, the light distribution control device 3008 controls the optical axis O of the vehicle lamp 3002 based on the image IMG3001 captured by the first imaging device 3004, and thus, a position of the cutoff line is adjusted. The light distribution control device 3008 can be a digital processor, and may be, for example, a combination of a microcomputer including a CPU and a software program, or may be configured by a field programmable gate array (FPGA), an application specified IC (ASIC), or the like. The light distribution control device 3008 includes a control executer 3036 and a control regulator 3038. An integrated circuit constituting the part itself executes a program retained in a memory, and thus, each part operates.

Figure 8:
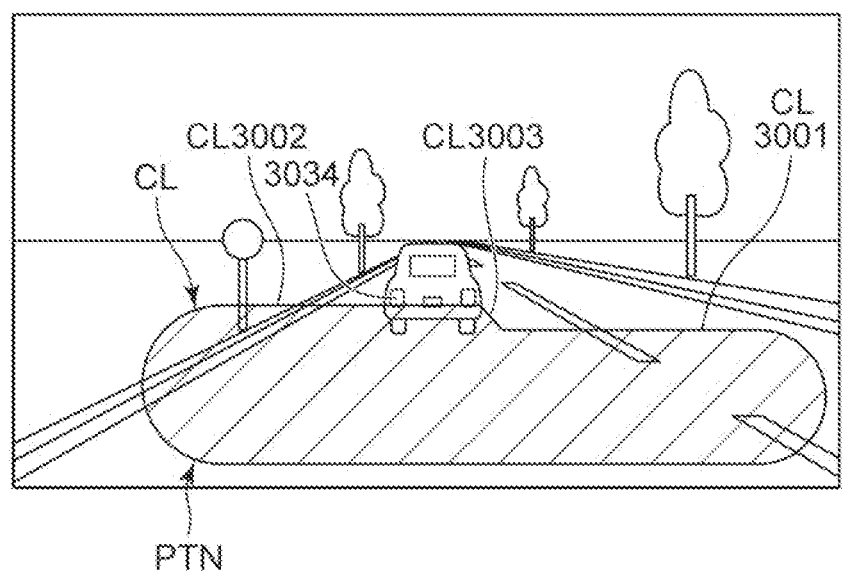
FIG. 8 is a schematic diagram of a light distribution pattern.
Figure 9A:
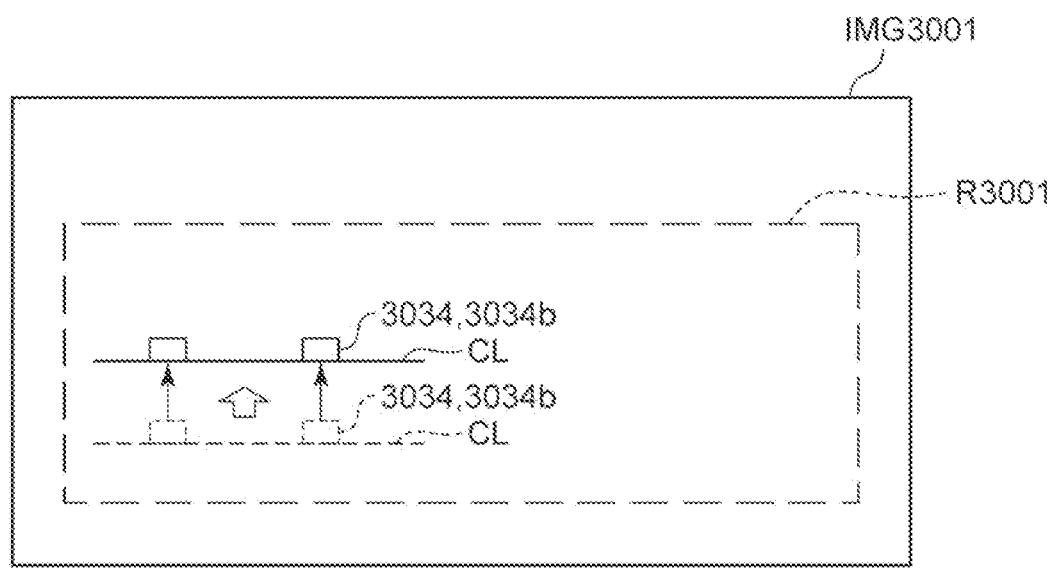
FIG. 9A is a schematic diagram for explaining following control.
Figure 9B:
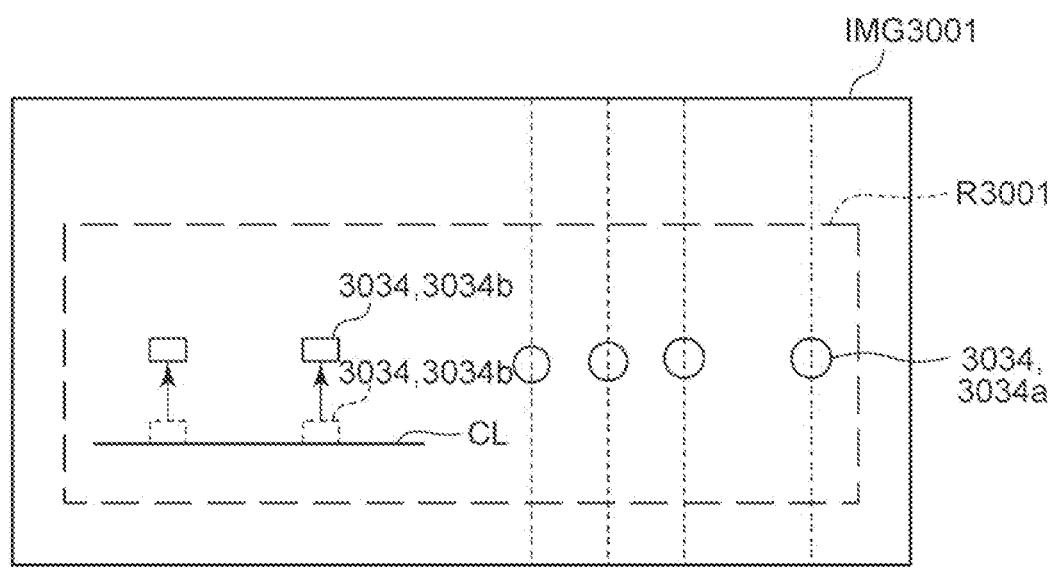
FIG. 9B is a schematic diagram for explaining regulation control.

The control executer 3036 executes the following control of the cutoff line. FIG. 8 is a schematic diagram of a light distribution pattern. FIG. 9A is a schematic diagram for explaining following control. FIG. 9B is a schematic diagram for explaining regulation control. FIG. 8 illustrates a light distribution pattern formed on a virtual vertical screen at a predetermined position in front of the host vehicle. A light distribution pattern for left-hand traffic is illustrated. FIGS. 9A and 9B illustrate only a part of the cutoff line.

As illustrated in FIG. 8, a light distribution pattern PTN formed by the vehicle lamp 3002 has a cutoff line CL at an upper end thereof. The cutoff line CL includes a first partial cutoff line CL3001, a second partial cutoff line CL3002, and a third partial cutoff line CL3003. The first partial cutoff line CL3001 extends in the horizontal direction on a lane side of an oncoming vehicle. The second partial cutoff line CL3002 extends in the horizontal direction on a lane side of the host vehicle and at a position higher than the first partial cutoff line CL3001. The third partial cutoff line CL3003 extends obliquely between the first partial cutoff line CL3001 and the second partial cutoff line CL3002 to connect both the first and second partial cutoff lines.

As illustrated in FIG. 9A, in the following control, the control executer 3036 causes a position of the cutoff line CL to follow a displacement of a light spot 3034 at a lowermost end among light spots 3034 derived from a lamp of a front vehicle included in the image IMG3001 captured by the first imaging device 3004.

As an example, the control executer 3036 extracts the light spot 3034 in the image IMG3001 by the same method as the determinator 3030. The control executer 3036 may acquire the information of the presence possibility region R3001 from the area setter 3032 and may determine that only light spots within the presence possibility region R3001 are the light spots 3034 derived from the front vehicle. When the light spot 3034 derived from the lamp of the front vehicle is detected, the control executer 3036 calculates a deviation amount in a pitch direction between a lower end of the light spot 3034 positioned at the lowermost end among the light spots and the current cutoff line CL. The position of the cutoff line CL can be acquired from, for example, the image IMG3001.

The leveling actuator 3028 is driven by the obtained deviation amount to displace the optical axis O of the vehicle lamp 3002 in the pitch direction. As a result, the cutoff line CL overlaps the lower end of the light spot 3034 at the lowermost end. The control executer 3036 of the present embodiment executes the following control of the cutoff line CL whenever the image IMG3001 is acquired from the first imaging device 3004. The present invention is not particularly limited to this configuration, and the control executer 3036 may execute the following control of the cutoff line CL whenever the plurality of images IMG3001 are acquired.

In the example illustrated in FIG. 9A, the light spot 3034*b* (light spot 3034*b* indicated by a solid line in the drawing) derived from the preceding vehicle LV detected in the image IMG3001 acquired by the light distribution control device 3008 is displaced upward from the light spot 3034*b* (light spot 3034*b* indicated by a broken line in the drawing) in the image IMG3001 acquired immediately before. By contrast, the control executer 3036 calculates a deviation amount between the light spot 3034*b* in the image IMG3001 and the cutoff line CL (cutoff line CL indicated by a broken line in the drawing) adjusted based on the image IMG3001 acquired immediately before, and drives the leveling actuator 3028. As a result, the cutoff line CL follows the displacement of the light spot 3034*b*. The control executer 3036 executes the following control of the cutoff line CL, and thus, the field of view of the driver of the host vehicle can be widened. Accordingly, the visibility can be further improved.

On the other hand, when the vehicle determination device 3006 determines that there is the line of front vehicles, the control regulator 3038 regulates (prohibits) the following of the cutoff line CL as illustrated in FIG. 9B. When there is the line of front vehicles, a situation in which the cutoff line CL is rapidly displaced by the following control may occur. For example, when there is a line of oncoming vehicles OV, there is a possibility that the following target of the cutoff line CL is sequentially shifted from the head oncoming vehicle OV to the following oncoming vehicle OV depending on a road shape or the like on which the host vehicle travels. In this case, the cutoff line CL may rapidly reciprocate up and down. The rapid displacement of the cutoff line CL gives the uncomfortable feeling to the driver. By contrast, the following of the cutoff line CL is regulated when there is the line of front vehicles, and thus, it is possible to reduce the possibility that the driver feels uncomfortable due to the rapid displacement of the cutoff line CL.

In particular, in the vehicle lamp 3002 of the present embodiment, the cutoff line CL is formed by the shade member 3024. As described above, in the configuration in which the cutoff line CL is formed by physically blocking the emission of the light with one member, only a part of the cutoff line CL cannot be displaced. When the entire cutoff line CL is moved up and down, visual annoyance experienced by the driver becomes large as compared with a case where the cutoff line CL is partially moved up and down. Thus, the following regulation by the control regulator 3038 is more effective in improving the visibility of the driver.

In addition, in the vehicle lamp 3002 of the present embodiment, the optical axis O is mechanically displaced by the leveling actuator 3028. Thus, when the cutoff line CL is caused to follow the light spot 3034 derived from the line of front vehicles, a load applied to the leveling actuator 3028 increases. By contrast, the control regulator 3038 regulates the following of the cutoff line CL, and thus, the load applied to the leveling actuator 3028 can be reduced. Accordingly, a lifespan of the leveling actuator 3028 can be expanded. A driving speed and a movable range required for the leveling actuator 3028 can be reduced. Alternatively, it is possible to prevent glare from being given to the driver or the like of the front vehicle due to the driving of the leveling actuator 3028 cannot follow a high-speed displacement of the light spot 3034.

The regulation of the following of the cutoff line CL by the control regulator 3038 is any one of a regulation (i) of displacing the cutoff line CL to a predetermined reference position, a regulation (ii) of fixing the cutoff line CL to a current position, and a regulation (iii) of displacing the cutoff line CL to the reference position when the current position of the cutoff line CL is higher than the predetermined reference position and fixing the cutoff line CL to the current position when the current position is equal to or less than the reference position.

The predetermined reference position in the regulation (i) is, for example, an initial position taken by the optical axis O in an initial aiming at the time of vehicle shipment. According to the regulation (i) of displacing the cutoff line CL to the predetermined reference position, it is possible to achieve both ensuring the visibility of the driver of the host vehicle and preventing the glare given to the driver of the front vehicle. On the other hand, according to the regulation (ii) of fixing the cutoff line CL at the current position, the control can be simplified. FIG. 9B illustrates a case where the regulation (ii) is executed.

The regulation (iii) is a combined control of the regulation (i) and the regulation (ii). That is, when the current position of the cutoff line CL is higher than the predetermined reference position, the regulation (i) is executed. As a result, it is possible to reduce the possibility that the driver or the like of the front vehicle receives glare while the visibility of the driver of the host vehicle is ensured. On the other hand, when the current position of the cutoff line CL is equal to or less than the reference position, the regulation (ii) is executed. As a result, the control can be simplified, and the possibility that the driver or the like of the front vehicle receives glare can be reduced.

Figure 10:
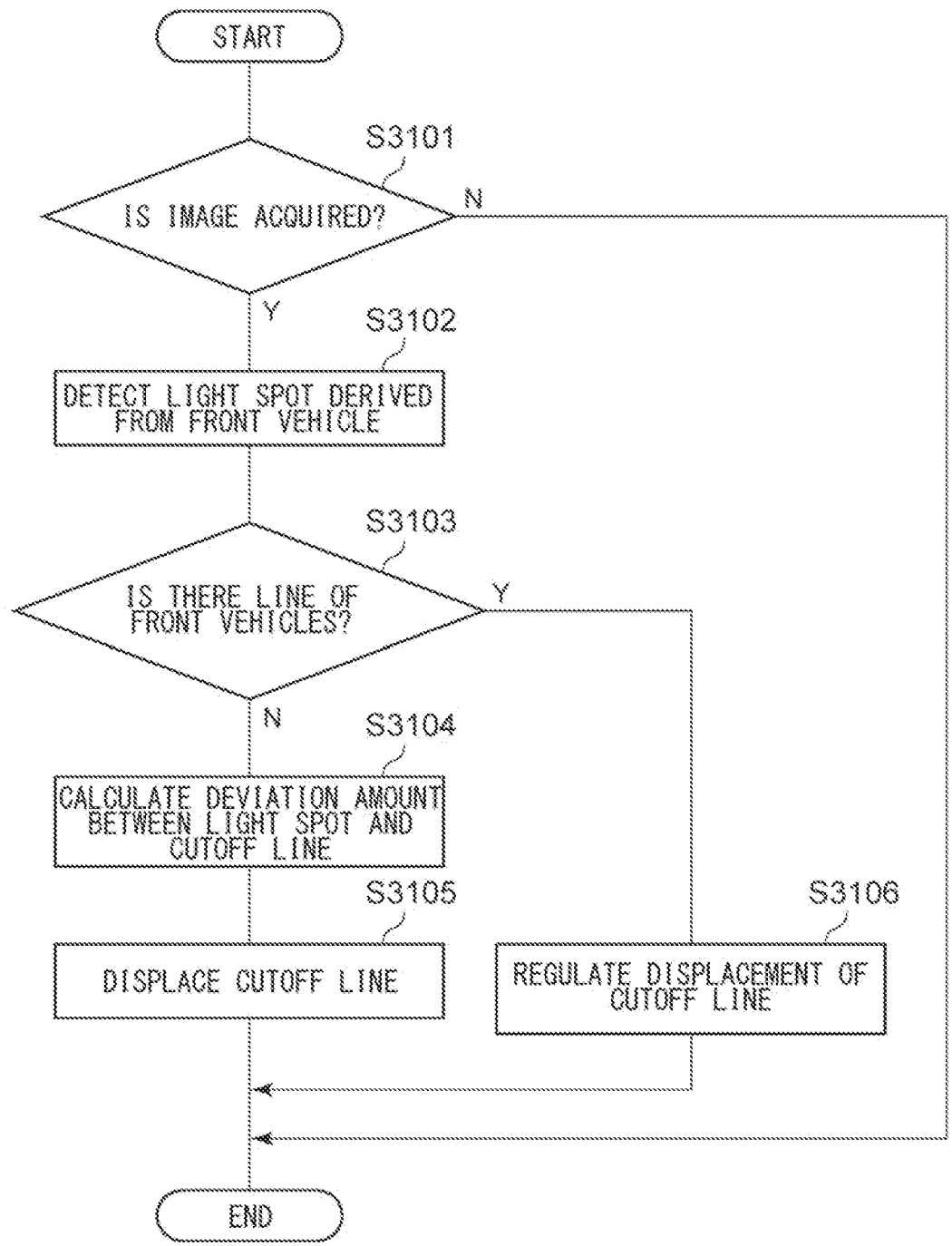
FIG. 10 is a flowchart illustrating an example of following control of a cutoff line CL executed by a light distribution control device according to the second embodiment.

FIG. 10 is a flowchart illustrating an example of the following control of the cutoff line CL executed by the light distribution control device 3008 according to the second embodiment. This flow is repeatedly executed at a predetermined timing when, for example, an instruction to execute the following control by a light switch (not illustrated) and an ignition is turned on.

The light distribution control device 3008 determines whether or not the image IMG3001 is acquired (S3101). When the image IMG3001 is not acquired (N in S3101), this routine is ended. When the image IMG3001 is acquired (Y in S3101), the light distribution control device 3008 performs image processing on the image IMG3001 to detect the light spot 3034 derived from the front vehicle (S3102). Subsequently, the light distribution control device 3008 determines whether or not there is the line of front vehicles based on the determination result of the vehicle determination device 3006 (S3103).

When there is no line of front vehicles (N in S3103), the light distribution control device 3008 calculates a deviation amount between the light spot 3034 at the lowermost end and the cutoff line CL (S3104). The light distribution control device 3008 displaces the cutoff line CL by the obtained deviation amount (S3105), and ends this routine. When there is the line of front vehicles (Y in S3103), the light distribution control device 3008 regulates the displacement of the cutoff line CL (S3106) and ends this routine.

As described above, when there are three or more light spots 3034 arranged in the vehicle width direction in the image IMG3001 captured by the first imaging device 3004 that is housed in the lamp room 3016 in which the vehicle lamp 3002 is housed and captures the front region of the vehicle, the vehicle determination device 3006 according to the present embodiment determines that there is the line of front vehicles. As a result, it is possible to provide a new technique for grasping the arrangement of the front vehicles. It is possible to easily determine the line of front vehicles.

When there are three or more light spots 3034 within the presence possibility region R3001 where there is a possibility that there is the front vehicle, the vehicle determination device 3006 of the present embodiment determines that there is the line of front vehicles. As a result, the determination accuracy of the line of front vehicles can be further improved.

The vehicle determination device 3006 of the present embodiment includes the area setter 3032 that sets the presence possibility region R3001 based on the image IMG3002 captured by the second imaging device 3302 that is disposed outside the lamp room 3016 and captures the front region of the vehicle. In this case, the presence possibility region R3001 can be set by using an existing imaging device outside the lamp room 3016, for example, an in-vehicle camera. Thus, the determination accuracy of the line can be improved while an increase in cost required for installing the vehicle lamp system 3001 is suppressed.

The determinator 3030 may decide, as a row of light spot groups, a plurality of light spots 3034 deviated in the vertical direction and at least partially overlapping in the vehicle width direction, and may determine that there is the line of front vehicles when three or more rows of light spot groups are arranged in the vehicle width direction. As a result, it is possible to more easily determine the line of front vehicles.

The vehicle lamp system 3001 of the present embodiment includes the vehicle lamp 3002 that includes the shade member 3024 that partially blocks the emission of the light to the front of the lamp to form the cutoff line CL and forms the light distribution pattern PTN including the cutoff line CL in the front region of the vehicle, the first imaging device 3004 that is housed in the lamp room 3016 in which the vehicle lamp 3002 is housed to capture the front region, the light distribution control device 3008 that executes following control for causing the position of the cutoff line CL to follow the displacement of the light spot 3034 at the lowermost end among the light spots 3034 derived from the lamp of the front vehicle included in the image IMG3001 captured by the first imaging device 3004, and the vehicle determination device 3006 of the present embodiment. The light distribution control device 3008 includes the control regulator 3038 that regulates the following of the cutoff line CL when the vehicle determination device 3006 determines that there is the line of front vehicles.

The light distribution control device 3008 executes the following control of the cutoff line CL, and thus, the field of view of the driver of the host vehicle can be widened. Accordingly, the visibility can be further improved. Since the control regulator 3038 regulates the following of the cutoff line CL when there is the line of front vehicles, it is possible to prevent the uncomfortable feeling and annoyance from be given to the driver due to the rapid displacement of the cutoff line CL. Therefore, even in this respect, the visibility of the driver can be further improved.

The following regulation in the present embodiment is any one of a regulation (i) of displacing the cutoff line CL to a predetermined reference position, a regulation (ii) of fixing the cutoff line CL to a current position, and a regulation (iii) of displacing the cutoff line CL to the reference position when the current position of the cutoff line CL is higher than the predetermined reference position and fixing the cutoff line CL to the current position when the current position is equal to or less than the reference position. According to the regulation (i), it is possible to achieve both ensuring the visibility of the driver of the host vehicle and preventing the glare given to the driver of the front vehicle. According to the regulation (ii), the control can be simplified. According to the regulation (iii), it is possible to achieve a balance between the ensuring of the visibility of the driver of the host vehicle, the reducing of the possibility that the driver or the like of the front vehicle receives glare, and the simplification of the control.

In the present embodiment, although the determination result of the vehicle determination device 3006 is used for the following control of the cutoff line CL, the present invention is not limited thereto. The determination result of the vehicle determination device 3006 may be used for ADB control, advanced driver-assistance systems (ADAS), automatic driving technique, and the like.

For example, in place of or in addition to the vehicle lamp 3002 forming the low beam light distribution pattern, the vehicle lamp system 3001 includes a light distribution variable lamp capable of independently adjusting light intensities of light rays irradiated to a plurality of individual regions arranged in front of the host vehicle. Examples of such a light distribution variable lamp include a lamp in which a plurality of semiconductor light sources are arrayed in a matrix, a lamp including a matrix-type pattern forming device such as a digital mirror device (DMD) or a liquid crystal device, and a lamp including a scanning optical pattern forming device that scans the front of the host vehicle with light source light.

The vehicle lamp system 3001 executes ADB control for dynamically and adaptively controlling the light distribution pattern PTN based on the image IMG3001 and the image IMG3002 by using the light distribution variable lamp. For example, the light distribution control device 3008 fixes the light distribution pattern PTN to the low beam light distribution pattern or the like when the vehicle determination device 3006 determines that there is the line of front vehicles. As a result, the uncomfortable feeling of the driver due to the rapid change in the light distribution pattern PTN and the load applied to the light distribution control device 3008 can be reduced. The leveling control of the low beam light distribution pattern and the ADB control described above can be executed in combination.

Since it is possible to assist the grasping of the surrounding environment of the host vehicle by using the determination result of the vehicle determination device 3006 for the ADAS and the automatic driving technique, it is possible to improve the safety of vehicle driving.

The second embodiment of the present invention has been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

The second embodiment may be specified by items to be described below.

[Item 1]

There is provided a vehicle determination method for determining that there is a line of front vehicles when there are three or more light spots (3034) arranged in a vehicle width direction in an image (IMG3001) captured by a first imaging device (3004) structured to be housed in a lamp room (3016) in which a vehicle lamp (3002) is housed and capture a front region of a vehicle.

Third Embodiment

Figure 11:
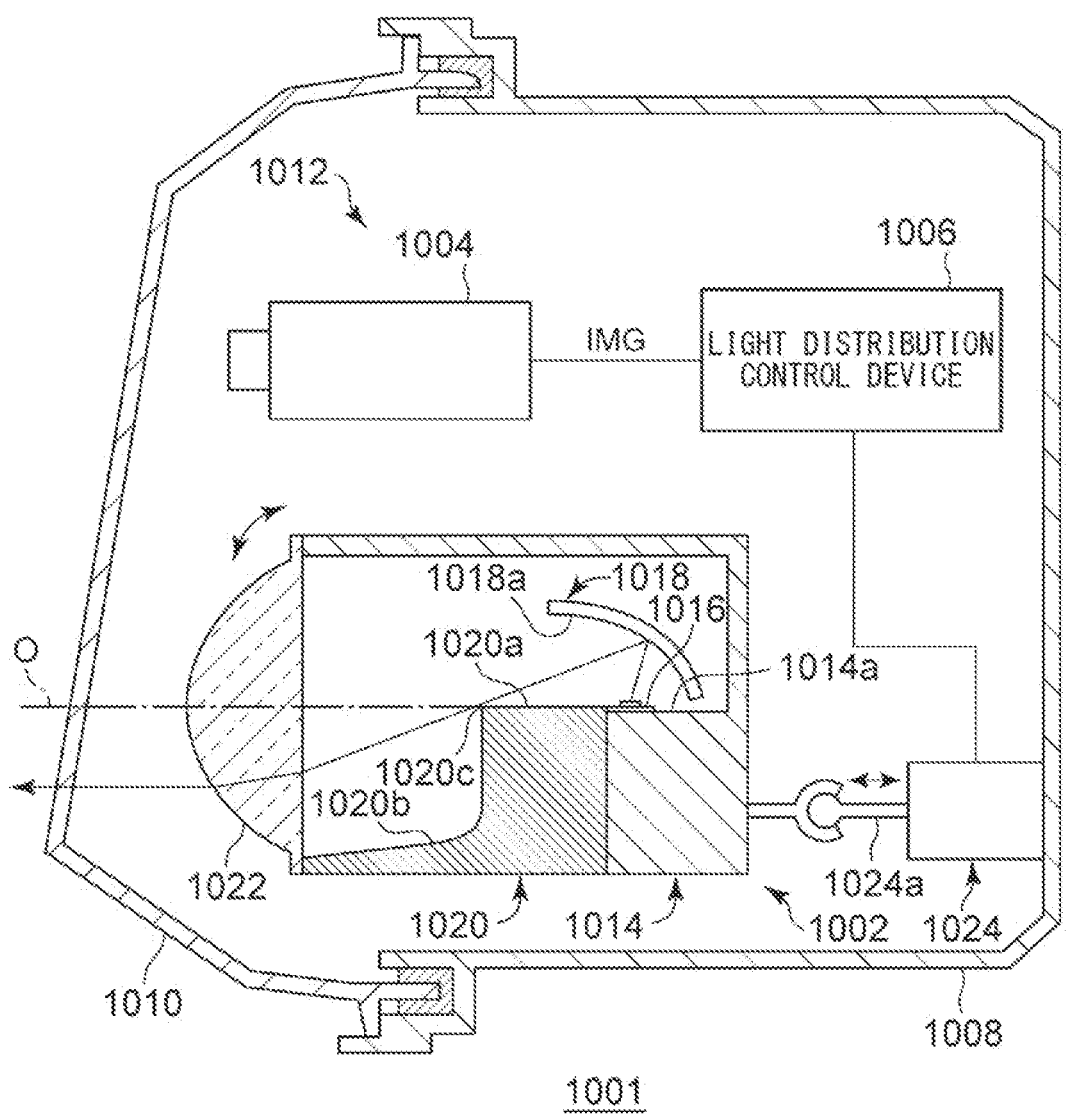
FIG. 11 is a diagram illustrating a schematic configuration of a vehicle lamp system according to a third embodiment.

FIG. 11 is a diagram illustrating a schematic configuration of a vehicle lamp system according to a third embodiment. In FIG. 11, some of components of a vehicle lamp system 1001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software.

The vehicle lamp system 1001 includes a vehicle lamp 1002, an imaging device 1004, and a light distribution control device 1006. These components may all be incorporated in the same housing, or some members may be provided outside the housing, in other words, on the vehicle side. The vehicle lamp system 1001 of the present embodiment includes a lamp body 1008 having an opening on a vehicle front side, and a translucent cover 1010 attached so as to cover the opening of the lamp body 1008. The vehicle lamp 1002, the imaging device 1004, and the light distribution control device 1006 are housed in a lamp room 1012 including the lamp body 1008 and the translucent cover 1010.

The vehicle lamp 1002 includes a light source mounting part 1014, a light source 1016, a reflector 1018, a shade member 1020, a projection lens 1022, and a leveling actuator 1024. The light source mounting part 1014 is made of, for example, a metal material such as aluminum, and is supported by the lamp body 1008 with a bracket (not illustrated) interposed therebetween. The light source mounting part 1014 has a light source mounting surface 1014*a*. The light source mounting surface 1014*a* of the present embodiment extends in a substantially horizontal direction. The light source 1016 is mounted on the light source mounting surface 1014*a*.

The light source 1016 is, for example, a light emitting diode (LED). The light source 1016 may be a semiconductor light source other than an LED such as a laser diode (LD) or an organic or inorganic electroluminescence (EL), an incandescent lamp, a halogen lamp, a discharge bulb, or the like. The light source 1016 emits light toward the reflector 1018.

The reflector 1018 has a substantially dome shape, is disposed so as to cover the light source 1016 from above in a vertical direction, and is fixed to the light source mounting part 1014. The reflector 1018 has a reflecting surface 1018*a* constituted by a part of a spheroidal surface. The reflecting surface 1018*a* has a first focal point and a second focal point positioned on a front side of the lamp from the first focal point. The reflector 1018 has a positional relationship with the light source 1016 decided such that the light source 1016 substantially coincides with the first focal point of the reflecting surface 1018*a*.

The shade member 1020 is fixed to the front side of the lamp of the light source mounting part 1014. The shade member 1020 includes a flat part 1020*a* disposed substantially horizontally, and a curved part 1020*b* positioned on the front side of the lamp of the flat part 1020*a*. The curved part 1020*b* is curved downward so as not to block the incidence of the light source light on the projection lens 1022. The reflector 1018 has a positional relationship with the shade member 1020 decided such that a ridge line 1020*c* formed by the flat part 1020*a* and the curved part 1020*b* is positioned in the vicinity of the second focal point of the reflecting surface 1018*a*.

The projection lens 1022 is fixed to a distal end of the curved part 1020*b*. For example, the projection lens 1022 consists of a plano-convex aspherical lens, and projects, as an inverted image, a light source image formed on a rear focal plane on a virtual vertical screen in front of the lamp. The projection lens 1022 is disposed on an optical axis O of the vehicle lamp 1002 such that the rear focal point substantially coincides with the second focal point of the reflecting surface 1018*a*.

The light emitted from the light source 1016 is reflected by the reflecting surface 1018*a*, and is incident on the projection lens 1022 through the vicinity of the ridge line 1020*c*. The light incident on the projection lens 1022 is emitted, as substantially parallel light, to the front of the lamp. At this time, the shade member 1020 partially blocks the emission of the light source 1016 to the front of the lamp. Specifically, a part of the light emitted from the light source 1016 is reflected on the flat part 1020*a*. That is, the light of the light source 1016 is selectively cut with the ridge line 1020*c* as a boundary line. As a result, a light distribution pattern including a cutoff line corresponding to a shape of the ridge line 1020*c*, that is, a low beam light distribution pattern is formed in a front region of the vehicle.

The leveling actuator 1024 is connected to the light source mounting part 1014. The leveling actuator 1024 includes, for example, a rod 1024*a*, a motor that expands and contracts the rod 1024*a* in a front-rear direction of the lamp, and the like. The vehicle lamp 1002 is in a backward tilting posture and a forward tilting posture by expanding and contracting of the rod 1024*a* in the front-rear direction of the lamp, and thus, the optical axis O can be displaced in an up-down direction. The driving of the leveling actuator 1024 is controlled by the light distribution control device 1006.

A structure of each part of the vehicle lamp 1002 is not limited to the above-described structure. For example, the shade member 1020 forming the cutoff line may be a shutter type in which a shade plate moves forward and backward with respect to the optical axis O. The vehicle lamp 1002 may not include the reflector 1018 or the projection lens 1022.

The imaging device 1004 has sensitivity in a visible light region and captures the front region of the vehicle. The imaging device 1004 may be able to measure at least a luminance distribution in the front region. For example, the imaging device 1004 includes a camera having a relatively small resolution of 300,000 pixels to less than 5 million pixels and a relatively high frame rate of 200 fps to 10,000 fps (0.1 ms to 5 ms per frame). Accordingly, an image IMG generated by the imaging device 1004 has a relatively low definition. The image IMG acquired by the imaging device 1004 is sent to the light distribution control device 1006. The imaging device 1004 sends the image IMG to the light distribution control device 1006 whenever the image IMG is acquired.

The light distribution control device 1006 controls the optical axis O of the vehicle lamp 1002 based on the image IMG captured by the imaging device 1004, and thus, a position of the cutoff line is adjusted. The light distribution control device 1006 can be a digital processor, and may be, for example, a combination of a microcomputer including a CPU and a software program, or may be configured by a field programmable gate array (FPGA), an application specified IC (ASIC), or the like. An integrated circuit constituting the light distribution control device 1006 itself executes a program retained in a memory, and thus, the light distribution control device operates.

Figure 12A:
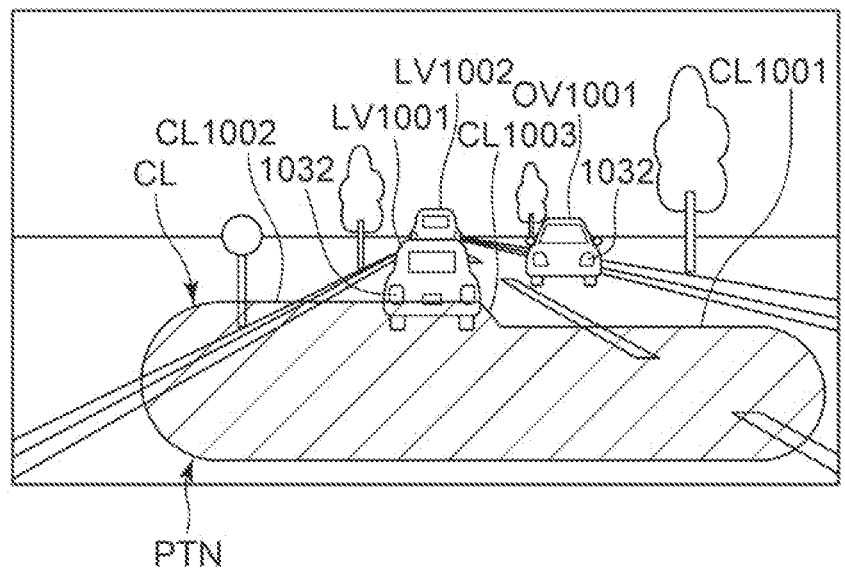
FIGS. 12A and 12B are schematic diagrams for explaining following control.
Figure 12B:
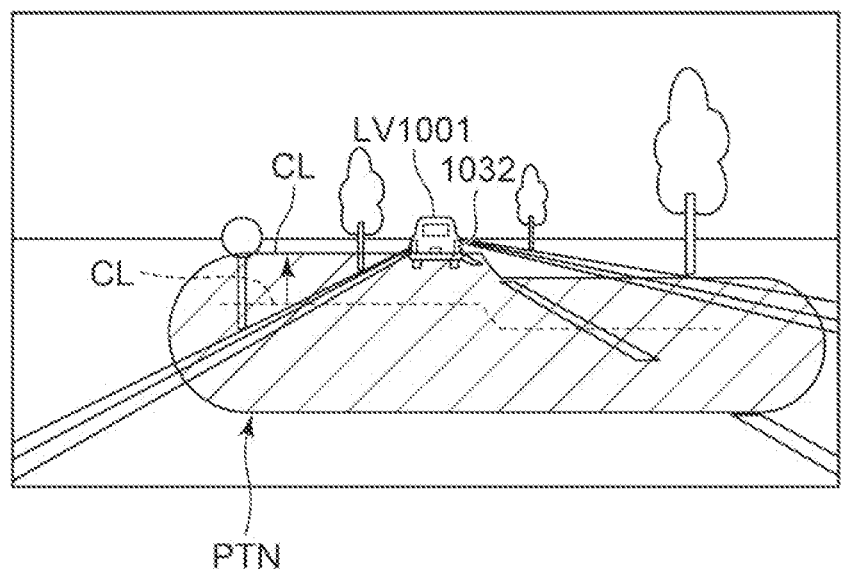

The light distribution control device 1006 executes the following control of the cutoff line. FIGS. 12A and 12B are schematic diagrams for explaining following control. FIGS. 12A and 12B illustrate a light distribution pattern formed on a virtual vertical screen at a predetermined position in front of the host vehicle. A light distribution pattern for left-hand traffic is illustrated.

A light distribution pattern PTN formed by the vehicle lamp 1002 has a cutoff line CL at an upper end thereof. The cutoff line CL includes a first partial cutoff line CL1001, a second partial cutoff line CL1002, and a third partial cutoff line CL1003. The first partial cutoff line CL1001 extends in the horizontal direction on a lane side of an oncoming vehicle. The second partial cutoff line CL1002 extends in the horizontal direction on a lane side of the host vehicle and at a position higher than the first partial cutoff line CL1001. The third partial cutoff line CL1003 extends obliquely between the first partial cutoff line CL1001 and the second partial cutoff line CL1002 to connect both the first and second partial cutoff lines.

In the following control, the light distribution control device 1006 causes a position of the cutoff line CL to follow a displacement of a light spot 1032 at a lowermost end among light spots 1032 derived from a lamp of a front vehicle included in the image IMG. The lamp of the front vehicle includes at least one of a headlamp of an oncoming vehicle, a tail lamp of the preceding vehicle, and a stop lamp of the preceding vehicle.

As an example, the light distribution control device 1006 retains a predetermined luminance threshold value in advance. The luminance threshold value can be appropriately set based on an experiment or simulation by a designer. The light distribution control device 1006 binarizes a luminance value of each pixel in the image IMG by using the luminance threshold value. Two light spots arranged at a predetermined interval in a vehicle width direction which is obtained by binarization processing of the image IMG are determined as the light spots 1032 derived from the lamp of the front vehicle. The light distribution control device 1006 may decide, as an estimated presence region of the front vehicle, a region excluding a predetermined range at both ends in the vehicle width direction, and may determine that only light spots within the estimated presence region are the light spots 1032 derived from the front vehicle.

When the light spot 1032 derived from the lamp of the front vehicle is detected, the light distribution control device 1006 calculates a deviation amount in a pitch direction between a lower end of the light spot 1032 positioned at the lowermost end among the light spots and the current cutoff line CL. The position of the cutoff line CL can be acquired from, for example, the image IMG. The leveling actuator 1024 is driven by the obtained deviation amount to displace the optical axis O of the vehicle lamp 1002 in the pitch direction. As a result, the cutoff line CL overlaps the lower end of the light spot 1032 at the lowermost end. For example, the light distribution control device 1006 can retain in advance a conversion table in which the deviation amount between the light spot 1032 and the cutoff line CL in the image IMG is associated with a driving amount of the leveling actuator 1024, and can decide the driving amount of the leveling actuator 1024 by using the conversion table.

Whenever the image IMG is acquired from the imaging device 1004, the light distribution control device 1006 of the present embodiment executes extraction of the light spot 1032 and following of the cutoff line CL based on the obtained image IMG. For example, as illustrated in FIG. 12A, it is assumed that a first preceding vehicle LV1001, a second preceding vehicle LV1002, and a first oncoming vehicle OV1001 are traveling in the front region of the host vehicle. The first preceding vehicle LV1001 follows the second preceding vehicle LV1002. The first preceding vehicle LV1001 is positioned in front of the first oncoming vehicle OV1001.

In the image IMG generated by the imaging device 1004 in this situation, the light spot 1032 derived from a tail lamp of the first preceding vehicle LV1001 becomes the light spot 1032 at the lowermost end. Thus, the light distribution control device 1006 adjusts the optical axis O of the vehicle lamp 1002 such that the cutoff line CL is positioned at a lower end of the tail lamp of the first preceding vehicle LV1001.

Thereafter, it is assumed that a situation of the front region changes as illustrated in FIG. 12B. Specifically, as a result of the second preceding vehicle LV1002 moving away from the host vehicle and the first oncoming vehicle OV1001 passing by the host vehicle, the second preceding vehicle and the first oncoming vehicle are out of an imaging range of the imaging device 1004. The first preceding vehicle LV1001 moves away from the host vehicle but remains within the imaging range of the imaging device 1004.

In the image IMG generated by the imaging device 1004 in this situation, as compared with the situation illustrated in FIG. 12A, there is no change in that the light spot 1032 derived from the first preceding vehicle LV1001 is the light spot 1032 at the lowermost end, but the position of the light spot 1032 is displaced upward. Thus, the light distribution control device 1006 displaces the optical axis O of the vehicle lamp 1002 upward such that the cutoff line CL is positioned at the lower end of the tail lamp of the first preceding vehicle LV1001. With this control, the cutoff line CL can follow the displacement of the light spot 1032 at the lowermost end derived from the front vehicle in the image IMG.

Figure 13:
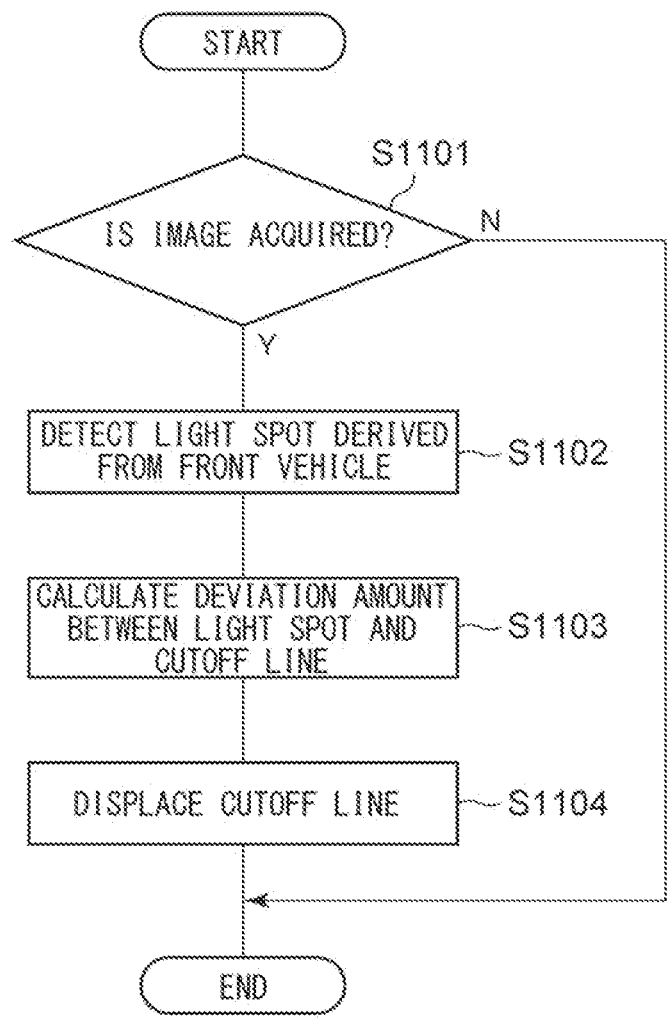
FIG. 13 is a flowchart illustrating an example of following control of a cutoff line executed by a light distribution control device according to the third embodiment.

FIG. 13 is a flowchart illustrating an example of the following control of the cutoff line CL executed by the light distribution control device 1006 according to the third embodiment. This flow is repeatedly executed at a predetermined timing when, for example, an instruction to execute the following control by a light switch (not illustrated) and an ignition is turned on.

The light distribution control device 1006 determines whether or not the image IMG is acquired (S1101). When the image IMG is not acquired (N in S1101), this routine is ended. When the image IMG is acquired (Y in S1101), the light distribution control device 1006 performs image processing on the image IMG to detect the light spot 1032 derived from the front vehicle (S1102). Subsequently, the light distribution control device 1006 calculates a deviation amount between the light spot 1032 at the lowermost end and the cutoff line CL (S1103). The light distribution control device 1006 displaces the cutoff line CL by the obtained deviation amount (S1104), and ends this routine.

As described above, the vehicle lamp system 1001 according to the present embodiment includes the vehicle lamp 1002 that includes the shade member 1020 that partially blocks the emission of the light to the front of the lamp to form the cutoff line CL and forms the light distribution pattern PTN including the cutoff line CL in the front region of the vehicle, the imaging device 1004 that captures the front region, and the light distribution control device 1006 that executes the following control for causing the position of the cutoff line CL to follow the displacement of the light spot 1032 at the lowermost end among the light spots 1032 derived from the lamp of the front vehicle included in the image IMG captured by the imaging device 1004. The following control is executed, and thus, the field of view of the driver of the host vehicle can be widened while glare is prevented to others. Therefore, the visibility of the driver of the host vehicle can be further improved.

Fourth Embodiment

Figure 14:
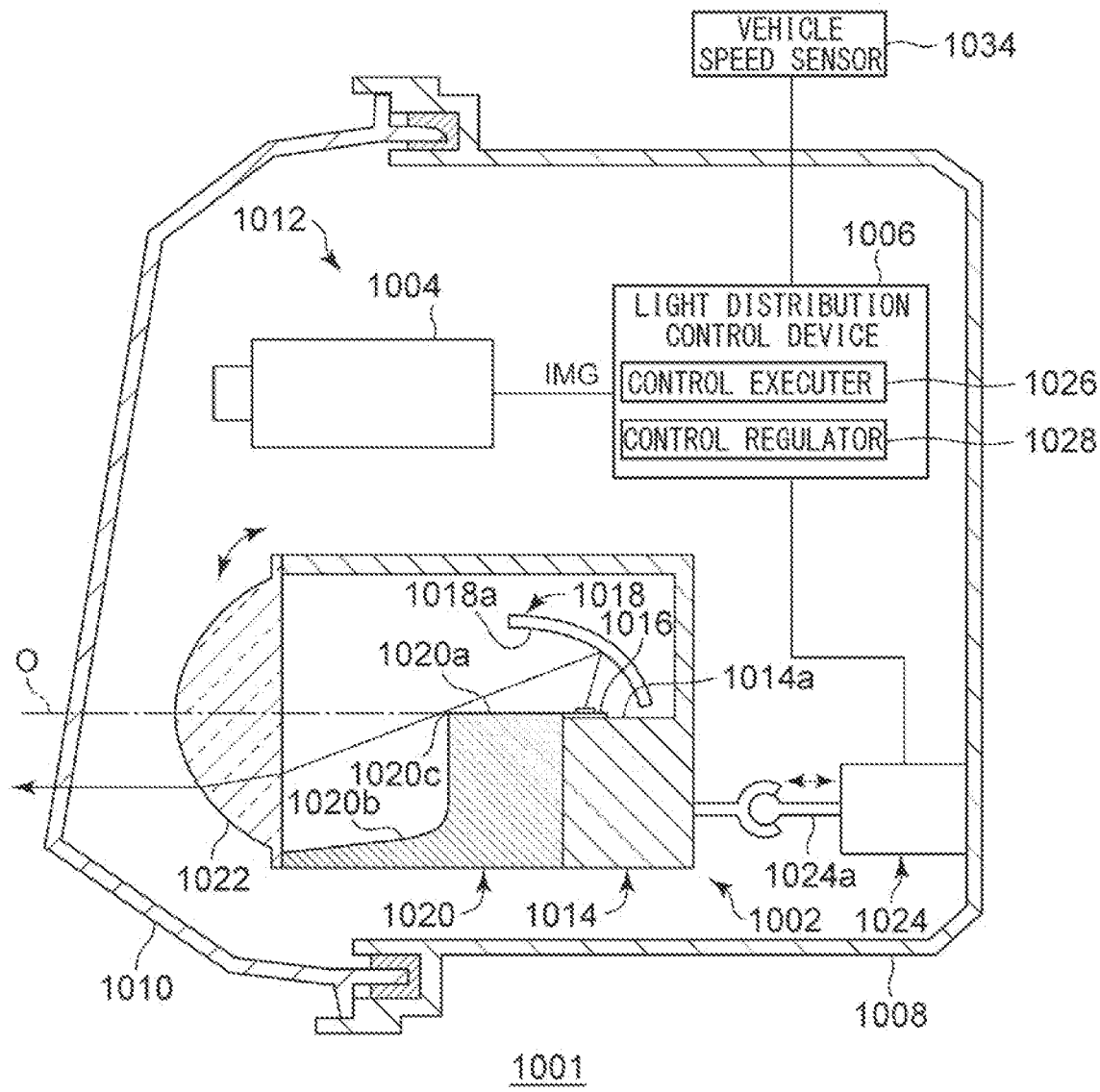
FIG. 14 is a diagram illustrating a schematic configuration of a vehicle lamp system according to a fourth embodiment.

A fourth embodiment has a configuration common to the second embodiment except for the control contents of the light distribution control device 1006. Hereinafter, the present embodiment will be described focusing on configurations different from the third embodiment, and common configurations will be briefly described or description thereof will be omitted. FIG. 14 is a diagram illustrating a schematic configuration of a vehicle lamp system according to the fourth embodiment. As in FIG. 11, in FIG. 14, some of components of the vehicle lamp system 1001 are depicted as functional blocks.

The light distribution control device 1006 of the present embodiment includes a control executer 1026 and a control regulator 1028. An integrated circuit constituting the part itself executes a program retained in a memory, and thus, each part operates. The control executer 1026 executes the following control of the cutoff line. This following control is the same as the following control described in the third embodiment.

Figure 15A:
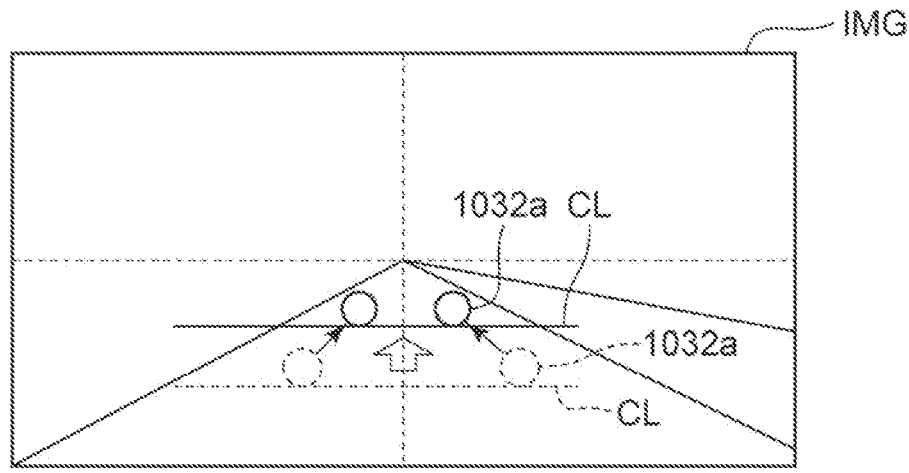
FIGS. 15A and 15B are schematic diagrams for explaining following regulation by a control regulator.
Figure 15B:
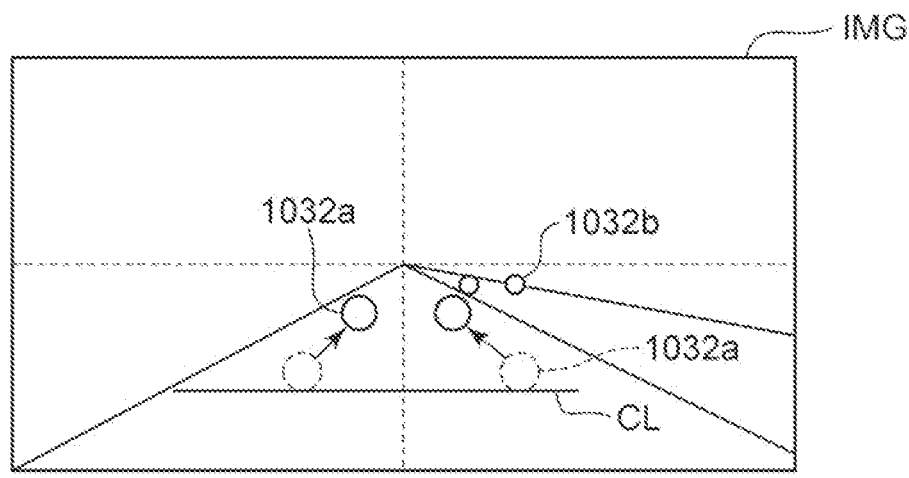

When a predetermined condition is satisfied in the following control, the control regulator 1028 regulates (prohibits) the following of the cutoff line CL. FIGS. 15A and 15B are schematic diagrams for explaining the following regulation by the control regulator 1028.

Specifically, the control regulator 1028 regulates the following of the cutoff line CL when at least one of the following conditions is satisfied (i) when a vehicle speed of the host vehicle is a predetermined value or more and (ii) when the oncoming vehicle is included in the image IMG. Regarding the condition (i), the control regulator 1028 can acquire vehicle speed information from a vehicle speed sensor 1034 provided in the vehicle. The control regulator 1028 retains a threshold value of the vehicle speed in advance, and determines that the condition (i) is satisfied when the vehicle speed obtained from the vehicle speed sensor 1034 is equal to or greater than the threshold value (hereinafter, this case is appropriately referred to as high-speed traveling). The "predetermined value" and the threshold value of the vehicle speed are appropriately set based on an experiment or simulation by a designer.

Regarding the condition (ii), the control regulator 1028 can determine that the oncoming vehicle is included in the image IMG by performing predetermined image processing on the image IMG. For example, the control regulator 1028 performs grayscale conversion processing on the image IMG, and then binarizes a luminance value of each pixel by using a predetermined luminance threshold value. As a result, it is possible to extract light spots derived from the head lamp of the oncoming vehicle.

The control regulator 1028 performs HSV conversion processing on the image IMG, and then binarizes a color value of each pixel by using a predetermined color threshold value. As a result, light spots derived from a stop lamp and a tail lamp of the preceding vehicle can be extracted. When the light spots derived from the headlamp of the oncoming vehicle are detected in the image IMG, the control regulator 1028 determines that the condition (ii) is satisfied. The control regulator 1028 may decide an estimated presence region of the oncoming vehicle in advance and may determine that only light spots within the estimated presence region are the light spot 1032 derived from the oncoming vehicle.

For example, as illustrated in FIG. 15A, it is assumed that light spots 1032a derived from the preceding vehicle detected in the image IMG acquired by the light distribution control device 1006 is displaced upward from a position (position indicated by a broken line in the drawing) in the image IMG acquired immediately before. It is assumed that a light spot 1032b derived from the oncoming vehicle is not detected in the image IMG and the vehicle speed is less than a predetermined value. In this case, the control regulator 1028 does not regulate the following control by the control executer 1026. Thus, the control executer 1026 calculates a deviation amount between the light spot 1032a and the cutoff line CL in the image IMG, and drives the leveling actuator 1024. As a result, the cutoff line CL follows the displacement of the light spot 1032a.

On the other hand, as illustrated in FIG. 15B, it is assumed that the light spot 1032a derived from the preceding vehicle detected in the image IMG is displaced upward from the position in the image IMG acquired immediately before, but the light spot 1032b derived from the oncoming vehicle is detected in the image IMG. In this case, the control regulator 1028 transmits a regulation signal to the control executer 1026. When the regulation signal is received, the control executer 1026 does not calculate the deviation amount between the light spot 1032a and the cutoff line CL or does not drive the leveling actuator 1024. As a result, the cutoff line CL does not follow the displacement of the light spot 1032*a*, and the position of the cutoff line CL is maintained. When the vehicle speed acquired from the vehicle speed sensor 1034 is a predetermined value or more even though the light spot 1032*b* derived from the oncoming vehicle is not detected, the control regulator 1028 transmits the regulation signal to the control executer 1026.

When the oncoming vehicle is present during the high-speed traveling of the host vehicle, a distance between the host vehicle and the oncoming vehicle changes at a high speed. In this situation, when the light spot 1032*b* of the oncoming vehicle becomes a following target of the cutoff line CL, the cutoff line CL is rapidly displaced. The rapid displacement of the cutoff line CL gives the uncomfortable feeling to the driver. It is estimated that there is a high possibility that the light spot 1032*a* of the preceding vehicle also changes rapidly during the high-speed traveling of the host vehicle. By contrast, the following of the cutoff line CL is regulated when the vehicle speed is a predetermined value or more, and thus, it is possible to reduce a possibility that the driver feels uncomfortable due to the rapid displacement of the cutoff line CL.

Even though the host vehicle is not traveling at a high speed, a change in the distance between the host vehicle and the oncoming vehicle is faster than a change in a distance between the host vehicle and the preceding vehicle. Thus, the following of the cutoff line CL is regulated when the oncoming vehicle is included in the image IMG, and thus, it is possible to reduce the possibility that the driver feels uncomfortable due to the rapid displacement of the cutoff line CL.

In particular, in the vehicle lamp 1002 of the present embodiment, the cutoff line CL is formed by the shade member 1020. As described above, in the configuration in which the cutoff line CL is formed by physically blocking the emission of the light with one member, only a part of the cutoff line CL cannot be displaced. When the entire cutoff line CL is moved up and down, visual annoyance experienced by the driver becomes large as compared with a case where the cutoff line CL is partially moved up and down. Thus, the following regulation by the control regulator 1028 is more effective in improving the visibility of the driver.

In addition, in the vehicle lamp 1002 of the present embodiment, the optical axis O is mechanically displaced by the leveling actuator 1024. Thus, when the cutoff line CL is caused to follow a high-speed displacement of the light spot 1032*b* derived from the oncoming vehicle, the load applied to the leveling actuator 1024 increases. By contrast, the control regulator 1028 regulates the following of the cutoff line CL, and thus, the load applied to the leveling actuator 1024 can be reduced. Accordingly, a lifespan of the leveling actuator 1024 can be expanded. A driving speed and a movable range required for the leveling actuator 1024 can be reduced. Alternatively, it is possible to prevent glare from being given to the driver or the like of the front vehicle due to the driving of the leveling actuator 1024 cannot follow a high-speed displacement of the light spot 1032.

The control regulator 1028 may regulate the following of the cutoff line CL only when both the condition (i) and the condition (ii) are satisfied. As a result, it is possible to increase a frequency of displacing the cutoff line CL to the light spot 1032*a* derived from the preceding vehicle, and it is possible to prioritize the expansion of the field of view of the driver of the host vehicle. The control regulator 1028 may determine the execution of the following regulation based only on the condition (i). Alternatively, the control regulator 1028 may determine the execution of the following regulation based only on the condition (ii). In these cases, the following control can be simplified. The control regulator 1028 may first determine any one of the condition (i) and the condition (ii), and may determine the other condition only when the condition is not satisfied. In this case, since the determination of the condition (i) is easier than the determination of the condition (ii), it is preferable to determine the condition (i) first.

The regulation of the following of the cutoff line CL by the control regulator 1028 is any one of a regulation (i) of displacing the cutoff line CL to a predetermined reference position, a regulation (ii) of fixing the cutoff line CL to a current position, and a regulation (iii) of displacing the cutoff line CL to the reference position when the current position of the cutoff line CL is higher than the predetermined reference position and fixing the cutoff line CL to the current position when the current position is equal to or less than the reference position.

The predetermined reference position in the regulation (i) is, for example, an initial position taken by the optical axis O in an initial aiming at the time of vehicle shipment. According to the regulation (i) of displacing the cutoff line CL to the predetermined reference position, it is possible to achieve both ensuring the visibility of the driver of the host vehicle and preventing the glare given to the driver of the front vehicle. On the other hand, according to the regulation (ii) of fixing the cutoff line CL at the current position, the control can be simplified. FIG. 15B illustrates a case where the regulation (ii) is executed.

The regulation (iii) is a combined control of the regulation (i) and the regulation (ii). That is, when the current position of the cutoff line CL is higher than the predetermined reference position, the regulation (i) is executed. As a result, it is possible to reduce the possibility that the driver or the like of the front vehicle receives glare while the visibility of the driver of the host vehicle is ensured. On the other hand, when the current position of the cutoff line CL is equal to or less than the reference position, the regulation (ii) is executed. As a result, the control can be simplified, and the possibility that the driver or the like of the front vehicle receives glare can be reduced.

Figure 16:
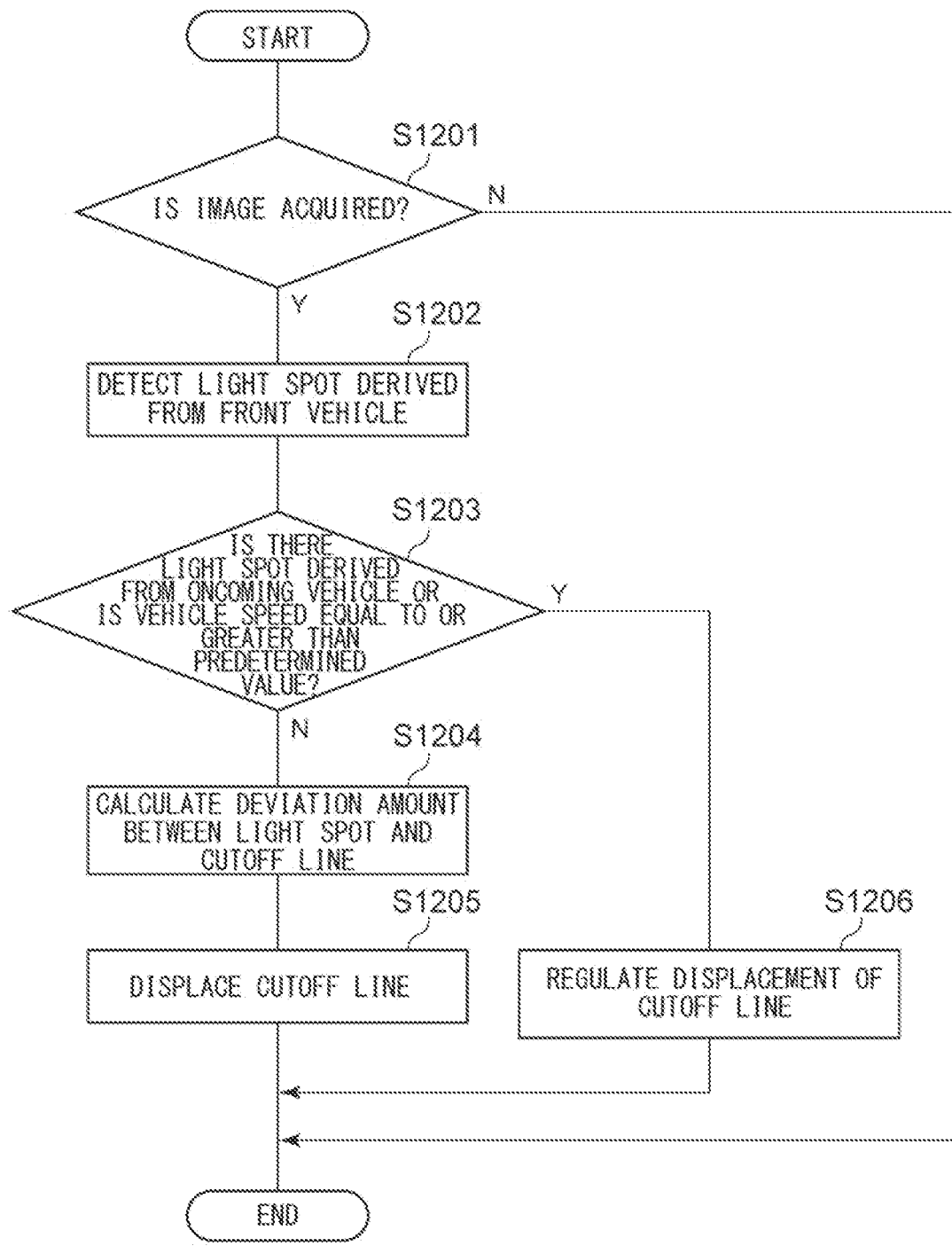
FIG. 16 is a flowchart illustrating an example of following control of a cutoff line executed by a light distribution control device according to the fourth embodiment.

FIG. 16 is a flowchart illustrating an example of the following control of the cutoff line CL executed by the light distribution control device 1006 according to the fourth embodiment. This flow is repeatedly executed at a predetermined timing when, for example, an instruction to execute the following control by a light switch (not illustrated) and an ignition is turned on.

The light distribution control device 1006 determines whether or not the image IMG is acquired (S1201). When the image IMG is not acquired (N in S1201), this routine is ended. When the image IMG is acquired (Y in S1201), the light distribution control device 1006 performs image processing on the image IMG to detect the light spots 1032 derived from the front vehicle (S1202). Subsequently, the light distribution control device 1006 determines whether or not there is the light spot 1032*b* derived from the oncoming vehicle or whether or not the vehicle speed of the host vehicle is a predetermined value or more (S1203).

When there is no light spot 1032*b* derived from the oncoming vehicle and the vehicle speed is less than the predetermined value (N in S1203), the light distribution control device 1006 calculates the deviation amount between the light spot 1032 at the lowermost end and the cutoff line CL (S1204). The light distribution control device 1006 displaces the cutoff line CL by the obtained deviation amount (S1205), and ends this routine. When there is the light spot 1032*b* derived from the oncoming vehicle or the vehicle speed is equal to or greater than the predetermined value (Y in S1203), the light distribution control device 1006 regulates the displacement of the cutoff line CL (S1206) and ends this routine.

As described above, the light distribution control device 1006 included in the vehicle lamp system 1001 according to the present embodiment includes the control regulator 1028 that regulates the following of the cutoff line CL when at least one of the following conditions of a condition (i) in which the vehicle speed of the host vehicle is equal to or greater than a predetermined value and a condition (ii) in which the oncoming vehicle is included in the image is satisfied. As a result, it is possible to achieve both the reduction in the annoyance experienced by the driver due to the displacement of the cutoff line CL and the expansion of the field of view of the driver due to the displacement of the cutoff line CL, and it is possible to further improve the driver's visibility.

The third and fourth embodiments of the present invention have been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

In the following control of each embodiment, the following control of the cutoff line CL is executed whenever the light distribution control device 1006 acquires the image IMG. However, the present invention is not particularly limited to this configuration, and the following control of the cutoff line CL may be executed whenever the light distribution control device 1006 acquires a plurality of images IMG.

In addition to the vehicle lamp 1002 forming the low beam light distribution pattern, the vehicle lamp system 1001 may include a light distribution variable lamp capable of independently adjusting light intensities of light rays applied to a plurality of individual regions arranged in front of the host vehicle. Examples of such a light distribution variable lamp include a lamp in which a plurality of semiconductor light sources are arrayed in a matrix, a lamp including a matrix-type pattern forming device such as a digital mirror device (DMD) or a liquid crystal device, and a lamp including a scanning optical pattern forming device that scans the front of the host vehicle with light source light. In this case, the above-described leveling control of the low beam light distribution pattern and ADB control for dynamically and adaptively controlling the light distribution pattern PTN based on the image IMG obtained from the imaging device 1004 can be executed in combination.

The third and fourth embodiments may be specified by items to be described below.

[Item 1]

There is provided a light distribution control device (1006) structured to control formation of a light distribution pattern (PTN) including a cutoff line (CL) by a vehicle lamp (1002) that includes a shade member (1020) structured to partially block emission of light to a front of a lamp to form the cutoff line (CL) based on an image (IMG) captured by an imaging device (1004).

A position of the cutoff line (CL) is caused to follow a displacement of a light spot (1032) at a lowermost end among light spots (1032) derived from a lamp of a front vehicle included in the image (IMG).

[Item 2]

There is provided a light distribution control method for controlling formation of a light distribution pattern (PTN) including a cutoff line (CL) by a vehicle lamp (1002) that includes a shade member (1020) structured to partially block emission of light to a front of a lamp to form the cutoff line (CL) based on an image (IMG) captured by an imaging device (1004).

The light distribution control method includes causing a position of the cutoff line (CL) to follow a displacement of a light spot (1032) at a lowermost end among light spots (1032) derived from a lamp of a front vehicle included in the image (IMG).

Fifth Embodiment

Figure 17:
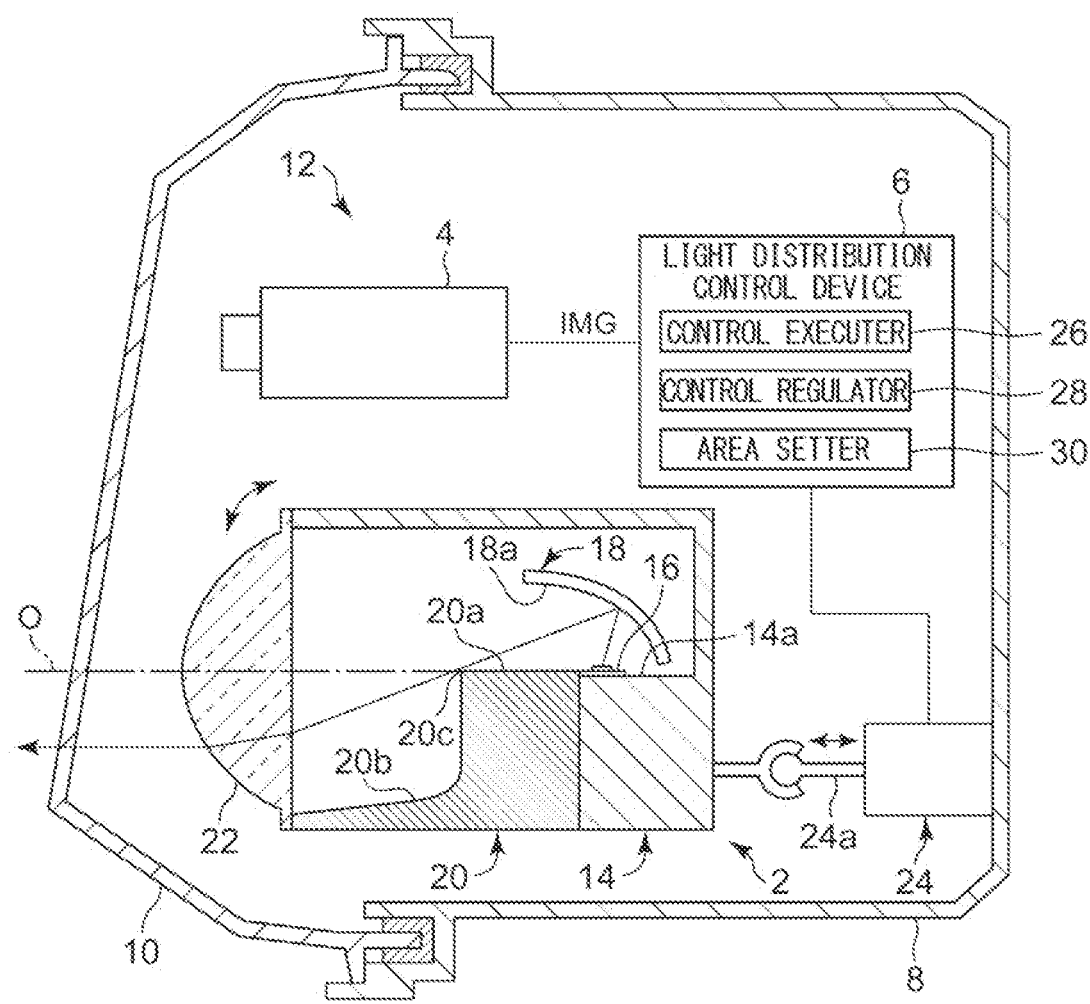
FIG. 17 is a diagram illustrating a schematic configuration of a vehicle lamp system according to a fifth embodiment.

FIG. 17 is a diagram illustrating a schematic configuration of a vehicle lamp system according to a fifth embodiment. In FIG. 17, some of components of the vehicle lamp system 1 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software.

The vehicle lamp system 1 includes a vehicle lamp 2, an imaging device 4, and a light distribution control device 6. These components may all be incorporated in the same housing, or some members may be provided outside the housing, in other words, on the vehicle side. The vehicle lamp system 1 of the present embodiment includes a lamp body 8 having an opening on a vehicle front side, and a translucent cover 10 attached to cover the opening of the lamp body 8. The vehicle lamp 2, the imaging device 4, and the light distribution control device 6 are housed in a lamp room 12 including the lamp body 8 and the translucent cover 10.

The vehicle lamp 2 includes a light source mounting part 14, a light source 16, a reflector 18, a shade member 20, a projection lens 22, and a leveling actuator 24. The light source mounting part 14 is made of, for example, a metal material such as aluminum, and is supported by the lamp body 8 with a bracket (not illustrated) interposed therebetween. The light source mounting part 14 has a light source mounting surface 14a. The light source mounting surface 14a of the present embodiment extends in a substantially horizontal direction. The light source 16 is mounted on the light source mounting surface 14a.

The light source 16 is, for example, a light emitting diode (LED). The light source 16 may be a semiconductor light source other than an LED such as a laser diode (LD) or an organic or inorganic electroluminescence (EL), an incandescent lamp, a halogen lamp, a discharge bulb, or the like. The light source 16 emits light toward the reflector 18.

The reflector 18 has a substantially dome shape, is disposed so as to cover the light source 16 from above in a vertical direction, and is fixed to the light source mounting part 14. The reflector 18 has a reflecting surface 18a constituted by a part of a spheroidal surface. The reflecting surface 18a has a first focal point and a second focal point positioned on a front side of the lamp from the first focal point. The reflector 18 has a positional relationship with the light source 16 decided such that the light source 16 substantially coincides with the first focal point of the reflecting surface 18a.

The shade member 20 is fixed to the front side of the lamp of the light source mounting part 14. The shade member 20 includes a flat part 20a disposed substantially horizontally, and a curved part 20b positioned on the front side of the lamp from the flat part 20a. The curved part 20b is curved downward so as not to block incidence of light source light on the projection lens 22. The reflector 18 has a positional relationship with the shade member 20 decided such that a ridge line 20c formed by the flat part 20a and the curved part 20b is positioned in the vicinity of the second focal point of the reflecting surface 18a.

The projection lens 22 is fixed to a distal end of the curved part 20b. For example, the projection lens 22 consists of a plano-convex aspherical lens, and projects, as an inverted image, a light source image formed on a rear focal plane on a virtual vertical screen in front of the lamp. The projection lens 22 is disposed on an optical axis O of the vehicle lamp 2 such that the rear focal point substantially coincides with the second focal point of the reflecting surface 18a.

The light emitted from the light source 16 is reflected by the reflecting surface 18a, and is incident on the projection lens 22 through the vicinity of the ridge line 20c. The light incident on the projection lens 22 is emitted, as substantially parallel light, to the front of the lamp. At this time, the shade member 20 partially blocks the emission of the light of the light source 16 to the front of the lamp. Specifically, a part of the light emitted from the light source 16 is reflected on the flat part 20a. That is, the light of the light source 16 is selectively cut with the ridge line 20c as a boundary line. As a result, a light distribution pattern including a cutoff line corresponding to a shape of the ridge line 20c, that is, a low beam light distribution pattern is formed in a front region of the vehicle.

The leveling actuator 24 is connected to the light source mounting part 14. The leveling actuator 24 includes, for example, a rod 24a, a motor that expands and contracts the rod 24a in a front-rear direction of the lamp, and the like. The vehicle lamp 2 is in a backward tilting posture and a forward tilting posture by expanding and contracting of the rod 24a in the front-rear direction of the lamp, and thus, the optical axis O can be displaced in an up-down direction. The driving of the leveling actuator 24 is controlled by the light distribution control device 6.

A structure of each part of the vehicle lamp 2 is not limited to the above-described structure. For example, the shade member 20 may be a shutter type in which a shade plate moves forward and backward with respect to the optical axis O. The vehicle lamp 2 may not include the reflector 18 and the projection lens 22.

The imaging device 4 has sensitivity in a visible light region and captures the front region of the vehicle. The imaging device 4 may be able to measure at least a luminance distribution in the front region. For example, the imaging device 4 includes a camera having a relatively small resolution of 300,000 pixels to less than 5 million pixels and a relatively high frame rate of 200 fps to 10,000 fps (0.1 ms to 5 ms per frame). Accordingly, an image IMG generated by the imaging device 4 has a relatively low definition. The image IMG acquired by the imaging device 4 is sent to the light distribution control device 6. The imaging device 4 sends the image IMG to the light distribution control device 6 whenever the image IMG is acquired.

The light distribution control device 6 controls the optical axis O of the vehicle lamp 2 based on the image IMG captured by the imaging device 4, and thus, a position of the cutoff line is adjusted. The light distribution control device 6 can be a digital processor, and may be, for example, a combination of a microcomputer including a CPU and a software program, or may be a field programmable gate array (FPGA), an application specified IC (ASIC), or the like.

The light distribution control device 6 includes a control executer 26, a control regulator 28, and an area setter 30. Hereinafter, an operation of each part of the light distribution control device 6 will be described. An integrated circuit constituting the part itself executes a program retained in a memory, and thus, each part operates.

Figure 18A:
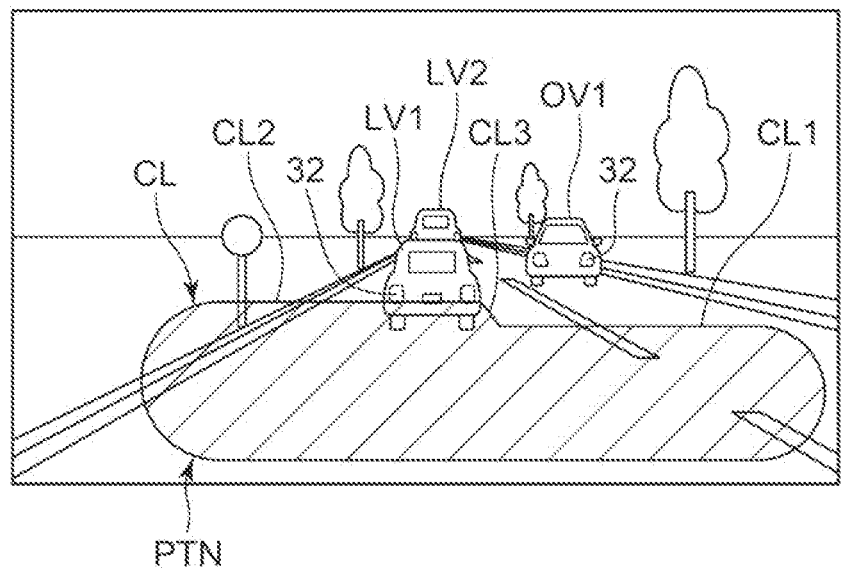
FIGS. 18A and 18B are schematic diagrams for explaining following control.
Figure 18B:
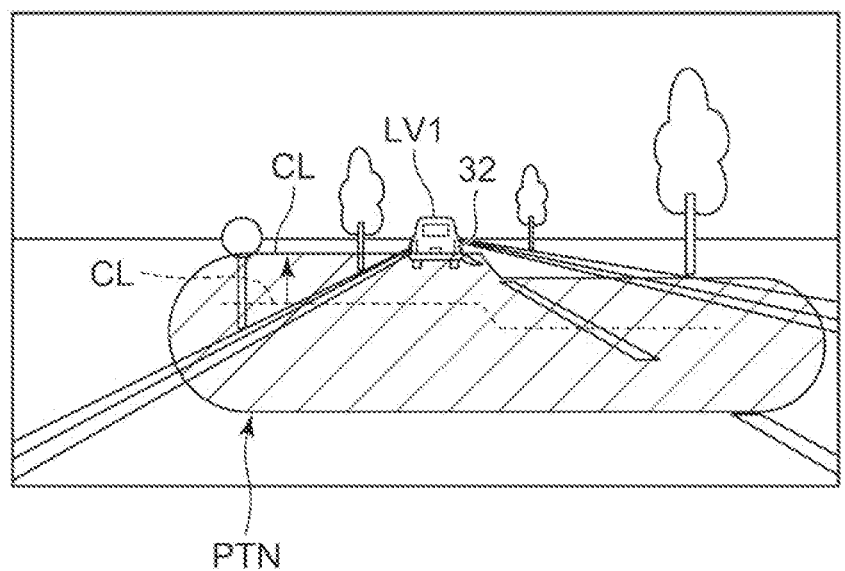

The control executer 26 executes the following control of the cutoff line. FIGS. 18A and 18B are schematic diagrams for explaining following control. FIGS. 18A and 18B illustrate a light distribution pattern formed on a virtual vertical screen at a predetermined position in front of the host vehicle. A light distribution pattern for left-hand traffic is illustrated.

A light distribution pattern PTN formed by the vehicle lamp 2 has a cutoff line CL at an upper end thereof. The cutoff line CL includes a first partial cutoff line CL1, a second partial cutoff line CL2, and a third partial cutoff line CL3. The first partial cutoff line CL1 extends in the horizontal direction on a lane side of an oncoming vehicle. The second partial cutoff line CL2 extends in the horizontal direction on a lane side of the host vehicle and at a position higher than the first partial cutoff line CL1. The third partial cutoff line CL3 extends obliquely between the first partial cutoff line CL1 and the second partial cutoff line CL2 to connect both the first and second partial cutoff lines.

In the following control, the control executer 26 causes a position of the cutoff line CL to follow a displacement of a light spot 32 at a lowermost end among light spots 32 derived from a lamp of a front vehicle included in the image IMG. The lamp of the front vehicle includes at least one of a headlamp of an oncoming vehicle, a tail lamp of the preceding vehicle, and a stop lamp of the preceding vehicle.

As an example, the control executer 26 retains a predetermined luminance threshold value in advance. The luminance threshold value can be appropriately set based on an experiment or simulation by a designer. The control executer 26 binarizes a luminance value of each pixel in the image IMG by using the luminance threshold value. Two light spots arranged at a predetermined interval in a vehicle width direction which is obtained by binarization processing of the image IMG are determined as the light spots 32 derived from the lamp of the front vehicle. The control executer 26 may decide, as an estimated presence region of the front vehicle, a region excluding a predetermined range at both ends in the vehicle width direction, and may determine that only light spots within the estimated presence region are the light spots 32 derived from the front vehicle.

When the light spot 32 derived from the lamp of the front vehicle is detected, the control executer 26 calculates a deviation amount in a pitch direction between a lower end of the light spot 32 positioned at the lowermost end among the light spots and the current cutoff line CL. The position of the cutoff line CL can be acquired from, for example, the image IMG. The leveling actuator 24 is driven by the obtained deviation amount to displace the optical axis O of the vehicle lamp 2 in the pitch direction. As a result, the cutoff line CL overlaps the lower end of the light spot 32 at the lowermost end. For example, the light distribution control device 6 can retain in advance a conversion table in which the deviation amount between the light spot 32 and the cutoff line CL in the image IMG is associated with a driving amount of the leveling actuator 24, and can decide the driving amount of the leveling actuator 24 by using the conversion table.

Whenever the light distribution control device 6 acquires the image IMG from the imaging device 4, the control executer 26 of the present embodiment executes extraction of the light spot 32 and following of the cutoff line CL based on the obtained image IMG. For example, as illustrated in FIG. 18A, it is assumed that a first preceding vehicle LV1, a second preceding vehicle LV2, and a first oncoming vehicle OV1 are traveling in the front region of the host vehicle. The first preceding vehicle LV1 follows the second preceding vehicle LV2. The first preceding vehicle LV1 is positioned in front of the first oncoming vehicle OV1.

In the image IMG generated by the imaging device 4 in this situation, the light spot 32 derived from a tail lamp of the first preceding vehicle LV1 becomes the light spot 32 at the lowermost end. Thus, the control executer 26 adjusts the optical axis O of the vehicle lamp 2 such that the cutoff line CL is positioned at a lower end of the tail lamp of the first preceding vehicle LV1.

Thereafter, it is assumed that a situation of the front region changes as illustrated in FIG. 18B. Specifically, as a result of the second preceding vehicle LV2 moving away from the host vehicle and the first oncoming vehicle OV1 passing by the host vehicle, the second preceding vehicle and the first oncoming vehicle are out of an imaging range of the imaging device 4. The first preceding vehicle LV1 moves away from the host vehicle but remains within the imaging range of the imaging device 4.

In the image IMG generated by the imaging device 4 in this situation, as compared with the situation illustrated in FIG. 18A, there is no change in that the light spot 32 derived from the first preceding vehicle LV1 is the light spot 32 at the lowermost end, but the position of the light spot 32 is displaced upward. Thus, the control executer 26 displaces the optical axis O of the vehicle lamp 2 upward such that the cutoff line CL is positioned at the lower end of the tail lamp of the first preceding vehicle LV1. With this control, the cutoff line CL can follow the displacement of the light spot 32 at the lowermost end derived from the front vehicle in the image IMG. The control executer 26 executes the following control of the cutoff line CL, and thus, a field of view of a driver of the host vehicle can be widened. Accordingly, visibility can be further improved.

Figure 19A:
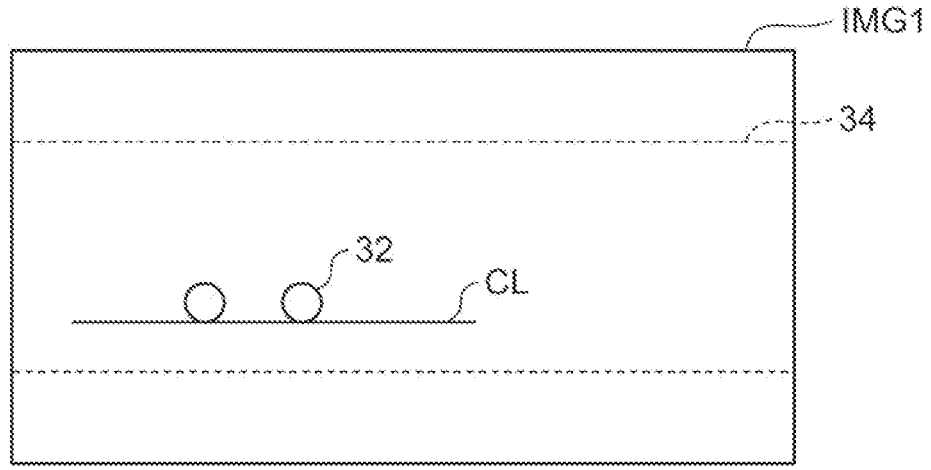
FIGS. 19A to 19C are schematic diagrams for explaining following regulation by a control regulator.
Figure 19B:
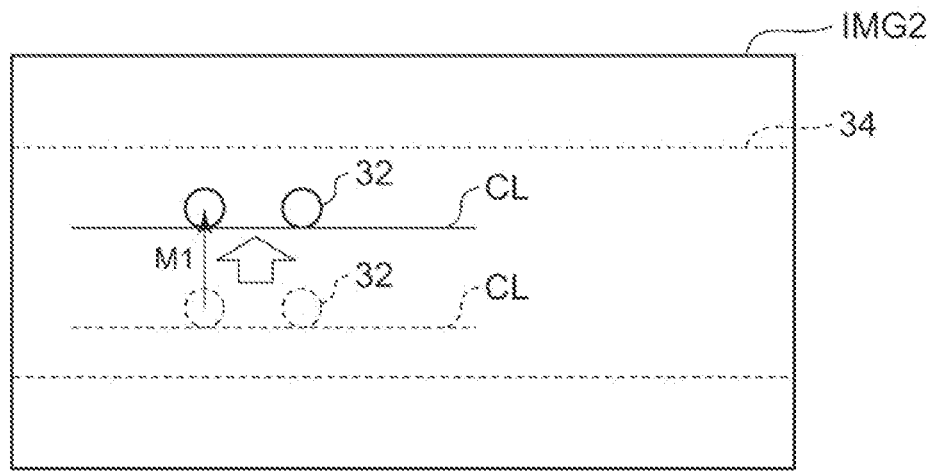
Figure 19C:
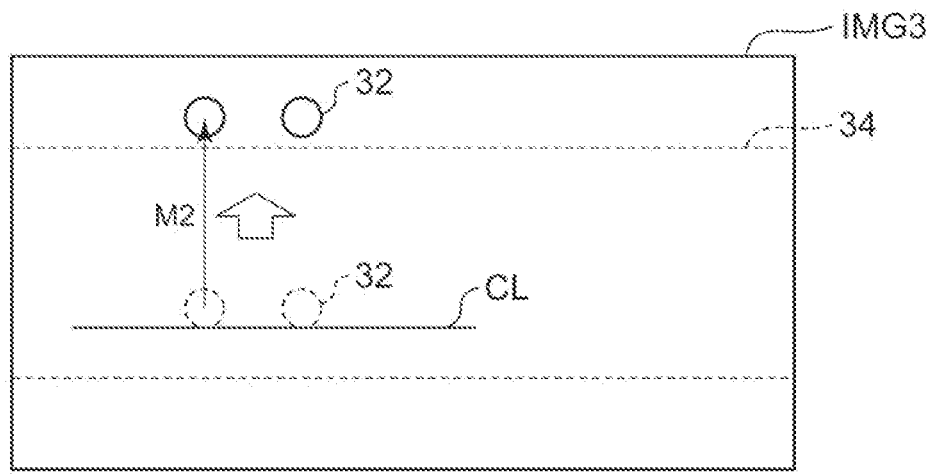

When the light spot 32 at the lowermost end derived from the front vehicle is displaced at a predetermined speed or more in the following control (hereinafter, this case is appropriately referred to as high-speed displacement), the control regulator 28 regulates (prohibits) the following of the cutoff line CL. For example, the control regulator 28 retains a threshold value of a displacement speed in advance, and regulates following when the displacement speed of the light spot 32 is equal to or greater than the threshold value. FIGS. 19A to 19C are schematic diagrams for explaining the following regulation by the control regulator 28.

The threshold value of the displacement speed of the light spot 32 is appropriately set based on an experiment or simulation by a designer. The threshold value of the displacement speed can be decided as the displacement amount of the light spot 32 in two consecutive images IMG. The light distribution control device 6 sequentially acquires the images IMG at regular time intervals. Thus, when the displacement amount of the light spot 32 in two consecutive images IMG is known, the displacement speed of the light spot 32 can be calculated.

The following of the cutoff line CL with respect to the high-speed displacement of the light spot 32 is regulated, and thus, it is possible to prevent the driver from feeling uncomfortable due to a rapid displacement of the cutoff line CL. In particular, in the vehicle lamp 2 of the present embodiment, since the cutoff line CL is formed by the shade member 20, only a part of the cutoff line CL cannot be displaced. When the entire cutoff line CL is moved up and down, visual annoyance experienced by the driver becomes large as compared with a case where the cutoff line CL is partially moved up and down. Thus, the following regulation by the control regulator 28 is more effective in improving the visibility of the driver.

In the present embodiment, the area setter 30 sets a predetermined following area 34 for the image IMG. When the light spot 32 is displaced to the outside of the following area 34 at a predetermined speed or more, the control regulator 28 regulates the following of the cutoff line CL. A range of the following area 34 is a range narrower than an angle of view of the imaging device 4. For example, the following area 34 is a movable range of the optical axis O by the leveling actuator 24. Specifically, for example, the angle is in a range of 2° upward and 3° downward from a horizontal line. Alternatively, the following area 34 is a range in which there is a possibility that the front vehicle is displaced, when the front vehicle and the host vehicle are in a normal traveling state in an actual road situation.

That is, the control regulator 28 regulates the displacement of the cutoff line CL only when the light spot 32 is displaced to the outside of the following area 34 at a high speed. Accordingly, even though the light spot 32 is displaced to the outside of the following area 34, when the displacement speed is less than the threshold value, or even though the light spot 32 is displaced at a high speed, when the displacement range is within the following area 34, the cutoff line CL is caused to follow the light spot 32.

For example, as illustrated in FIG. 19A, it is assumed that the cutoff line CL overlaps the lower end of the light spot 32 at the lowermost end in an image IMG1 acquired by the control executer 26 at a certain timing. Then, as illustrated in FIG. 19B, it is assumed that the light spot 32 is displaced upward by a displacement amount M1 in an image IMG2 acquired subsequently to the image IMG1 by the light distribution control device 6. The displacement amount M1 is a displacement amount less than the threshold value. That is, the displacement speed of the light spot 32 is less than the threshold value. The light spot 32 is displaced within the following area 34. In this case, the control regulator 28 does not regulate the following control by the control executer 26. Thus, the control executer 26 calculates a deviation amount between the light spot 32 and the cutoff line CL in the image IMG2, and drives the leveling actuator 24. As a result, the cutoff line CL follows the displacement of the light spot 32.

On the other hand, as illustrated in FIG. 19C, it is assumed that the light spot 32 is displaced upward by a displacement amount M2 in an image IMG3 image acquired subsequently to the image IMG1 by the light distribution control device 6. The displacement amount M2 is a displacement amount equal to or greater than a threshold value. That is, the displacement speed of the light spot 32 is greater than or equal to the threshold value. The light spot 32 is displaced to the outside of the following area 34. In this case, the control regulator 28 transmits a regulation signal to the control executer 26. When the regulation signal is received, the control executer 26 does not calculate the deviation amount between the light spot 32 and the cutoff line CL or does not drive the leveling actuator 24. As a result, the cutoff line CL does not follow the displacement of the light spot 32, and the position of the cutoff line CL is maintained.

When the displacement amount of the cutoff line CL is small, the annoyance experienced by the driver due to the displacement of the cutoff line CL tends to decrease. Accordingly, the displacement of the cutoff line CL is regulated only when the light spot 32 is displaced to the outside of the following area 34 at a high speed, and thus, it is possible to achieve both reduction in the annoyance to the driver due to the displacement of the cutoff line CL and expansion of the field of view of the driver due to the displacement of the cutoff line CL.

The displacement of the light spot 32 to the outside of the following area 34 can be regarded as a displacement that may not occur in the normal traveling state of the front vehicle or the host vehicle. For example, when the front vehicle or the host vehicle is pushed up by an obstacle rolling on a road, the light spot 32 in the image IMG may be displaced to the outside of the following area 34 at a high speed. In this case, the light spot 32 displaced to the outside of the following area 34 is considered to return to an original position or the inside of the following area 34 immediately after the displacement. Thus, it is possible to prevent the driver from feeling annoyance wastefully by refraining the displacement of the cutoff line CL with respect to the high-speed displacement of the light spot 32 to the outside of the following area 34. Unnecessary driving of the leveling actuator 24 can be prevented.

In particular, in the vehicle lamp 2 of the present embodiment, the optical axis O is mechanically displaced by the leveling actuator 24. Thus, when the cutoff line CL is caused to follow a large displacement of the light spot 32 at a high speed, a load applied to the leveling actuator 24 increases. By contrast, the following of the cutoff line CL with respect to the high-speed displacement of the light spot 32 to the outside of the following area 34 is regulated, and thus, the load applied to the leveling actuator 24 can be reduced. Accordingly, a lifespan of the leveling actuator 24 can be expanded. A driving speed and a movable range required for the leveling actuator 24 can be reduced. Alternatively, it is possible to prevent glare from being given to the driver of the front vehicle due to the driving of the leveling actuator 24 cannot follow the high-speed displacement of the light spot 32.

When the light spot 32 is displaced to the outside of the following area 34 at a low speed, the control executer 26 causes the cutoff line CL to follow. However, when the following area 34 is the movable range of the optical axis O by the leveling actuator 24, the cutoff line CL cannot reach the lower end of the light spot 32 outside the following area 34. However, the cutoff line CL is displaced up to the following area 34, and thus, it is possible to increase the visibility of the driver to a considerable extent.

In the above-described following control, whenever the light distribution control device 6 acquires the image IMG, the displacement speed of the light spot 32 is calculated, and the following or non-following of the cutoff line CL is determined. However, the present invention is not particularly limited to this configuration, and the displacement speed calculation and the following or non-following determination may be performed after the light distribution control device 6 acquires a plurality of images IMG. For example, when a following control logic operates at 5 ms, the displacement speed calculation and the following or non-following determination may be performed every 5 ms, or the displacement speed calculation and the following or non-following determination may be performed after a time of 5 ms×n number of times elapses.

Figure 20:
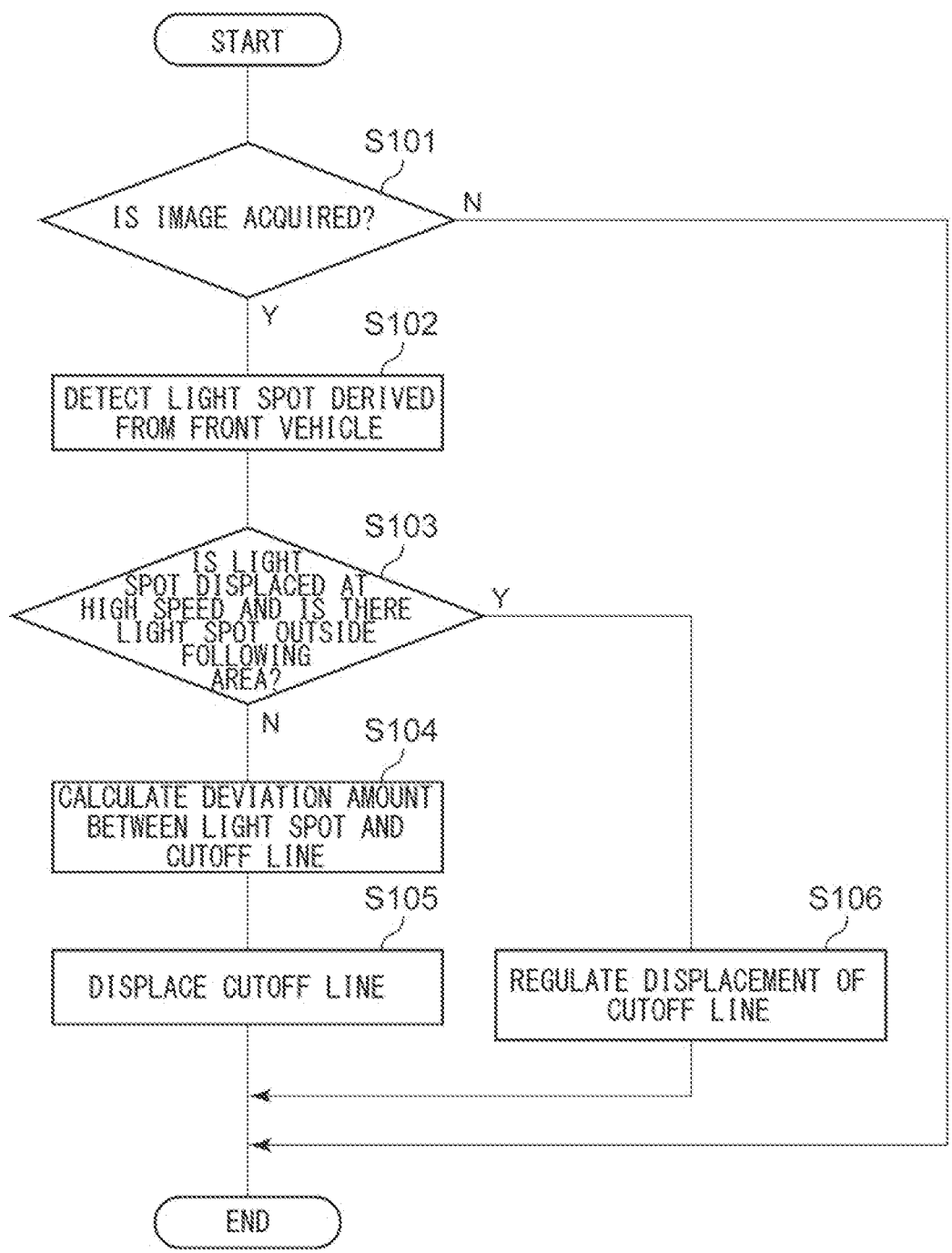
FIG. 20 is a flowchart illustrating an example of following control of a cutoff line executed by a light distribution control device according to the fifth embodiment.

FIG. 20 is a flowchart illustrating an example of the following control of the cutoff line CL executed by the light distribution control device 6 according to the fifth embodiment. This flow is repeatedly executed at a predetermined timing when, for example, an instruction to execute the following control by a light switch (not illustrated) and an ignition is turned on.

The light distribution control device 6 determines whether or not the image IMG is acquired (S101). When the image IMG is not acquired (N in S101), this routine is ended. When the image IMG is acquired (Y in S101), the light distribution control device 6 performs image processing on the image IMG to detect the light spots 32 derived from the front vehicle (S102). Subsequently, the light distribution control device 6 determines whether or not the light spot 32 positioned at the lowermost end among the detected light spots 32 is displaced at a high speed from a position detected in the previous routine (that is, the displacement amount and the displacement speed are equal to or greater than the threshold value) and is outside the following area 34 (S103).

When the light spot 32 is not displaced at a high speed or is within the following area 34 (N in S103), the light distribution control device 6 calculates the deviation amount between the light spot 32 at the lowermost end and the cutoff line CL (S104). The light distribution control device 6 displaces the cutoff line CL by the obtained deviation amount (S105), and ends this routine. When the light spot 32 is displaced at a high speed and is outside the following area 34 (Y in S103), the light distribution control device 6 regulates the displacement of the cutoff line CL (S106) and ends this routine. As a result, the cutoff line CL is maintained at a current position.

In a first routine, there is no positional information of the light spot 32 in the previous routine. Thus, in step S103 in the first routine, the light distribution control device 6 determines that the light spot 32 is not displaced at a high speed.

As described above, the vehicle lamp system 1 according to the present embodiment includes the vehicle lamp 2 that forms the light distribution pattern PTN including the cutoff line CL in the front region of the vehicle, the imaging device 4 that captures the front region, and the light distribution control device 6 that adjusts the position of the cutoff line CL based on the image IMG captured by the imaging device 4. The light distribution control device 6 includes the control executer 26 that executes following control for causing the position of the cutoff line CL to follow the displacement of the light spot 32 at the lowermost end among the light spots 32 derived from the lamp of the front vehicle included in the image IMG, and the control regulator 28 that regulates following when the light spot 32 is displaced at a predetermined speed or more in the following control.

The control executer 26 executes the following control of the cutoff line CL, and thus, the field of view of the driver of the host vehicle can be widened. Accordingly, the visibility can be further improved. The control regulator 28 regulates the following of the cutoff line CL with respect to the high-speed displacement of the light spot 32, and thus, it is possible to prevent the driver from feeling uncomfortable due to the rapid displacement of the cutoff line CL. Therefore, even in this respect, the visibility of the driver can be further improved.

The light distribution control device 6 of the present embodiment includes the area setter 30 that sets the predetermined following area 34 for the image IMG. When the light spot 32 is displaced to the outside of the following area 34 at a predetermined speed or more, the control regulator 28 regulates the following of the cutoff line CL. As a result, it is possible to achieve both the reduction in the annoyance experienced by the driver due to the displacement of the cutoff line CL and the expansion of the field of view of the driver due to the displacement of the cutoff line CL, and it is possible to further improve the driver's visibility.

The vehicle lamp 2 of the present embodiment includes the leveling actuator 24 that displaces the optical axis O in the up-down direction. As described above, in the configuration in which the optical axis O and the cutoff line CL are mechanically displaced by the leveling actuator 24, the following of the cutoff line CL with respect to the high-speed displacement of the light spot 32 is regulated, and thus, the load applied to the leveling actuator 24 can be reduced. Accordingly, the lifespan can be extended. Since the driving speed required for the leveling actuator 24 can be reduced, the cost of the vehicle lamp system 1 can be reduced.

The vehicle lamp 2 of the present embodiment includes the shade member 20 that partially blocks the emission of the light to the front of the lamp to form the cutoff line CL. As described above, in the configuration in which the cutoff line CL is formed by physically blocking the emission of the light with one member, the following of the cutoff line CL with respect to the high-speed displacement of the light spot 32 is regulated, and thus, it is possible to prevent the visual annoyance experienced by the driver. Accordingly, it is possible to further improve the visibility of the driver.

The fifth embodiment of the present invention has been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

In addition to the vehicle lamp 2 forming the low beam light distribution pattern, the vehicle lamp system 1 may include a light distribution variable lamp capable of independently adjusting light intensities of light rays applied to a plurality of individual regions arranged in front of the host vehicle. Examples of such a light distribution variable lamp include a lamp in which a plurality of semiconductor light sources are arrayed in a matrix, a lamp including a matrix-type pattern forming device such as a digital mirror device (DMD) or a liquid crystal device, and a lamp including a scanning optical pattern forming device that scans the front of the host vehicle with light source light. In this case, the above-described leveling control of the low beam light distribution pattern and ADB control for dynamically and adaptively controlling the light distribution pattern PTN based on the image IMG obtained from the imaging device 4 can be executed in combination.

The fifth embodiment may be specified by items to be described below.

[Item 1]

There is provided a light distribution control device (6) structured to adjust a position of a cutoff line (CL) of a light distribution pattern (PTN) including cutoff lines (CL) formed in a front region of a vehicle based on an image (IMG) captured by an imaging device (4) structured to capture the front region. The light distribution control device (6) includes a control executer (26) structured to execute following control for causing the position of the cutoff line (CL) to follow a displacement of a light spot (32) at a lowermost end among light spots (32) derived from a lamp of a front vehicle included in the image (IMG), and a control regulator (28) structured to regulate the following when the light spot (32) is displaced at a predetermined speed or more in the following control.

[Item 2]

There is provided a light distribution control method for adjusting a position of a cutoff line (CL) of a light distribution pattern (PTN) including cutoff lines (CL) formed in a front region of a vehicle based on an image (IMG) captured by an imaging device (4) structured to capture the front region. The light distribution control method includes executing following control for causing the position of the cutoff line (CL) to follow a displacement of a light spot (32) at a lowermost end among light spots (32) derived from a lamp of a front vehicle included in the image (IMG), and regulating the following when the light spot (32) is displaced at a predetermined speed or more in the following control.

Sixth Embodiment

Figure 21:
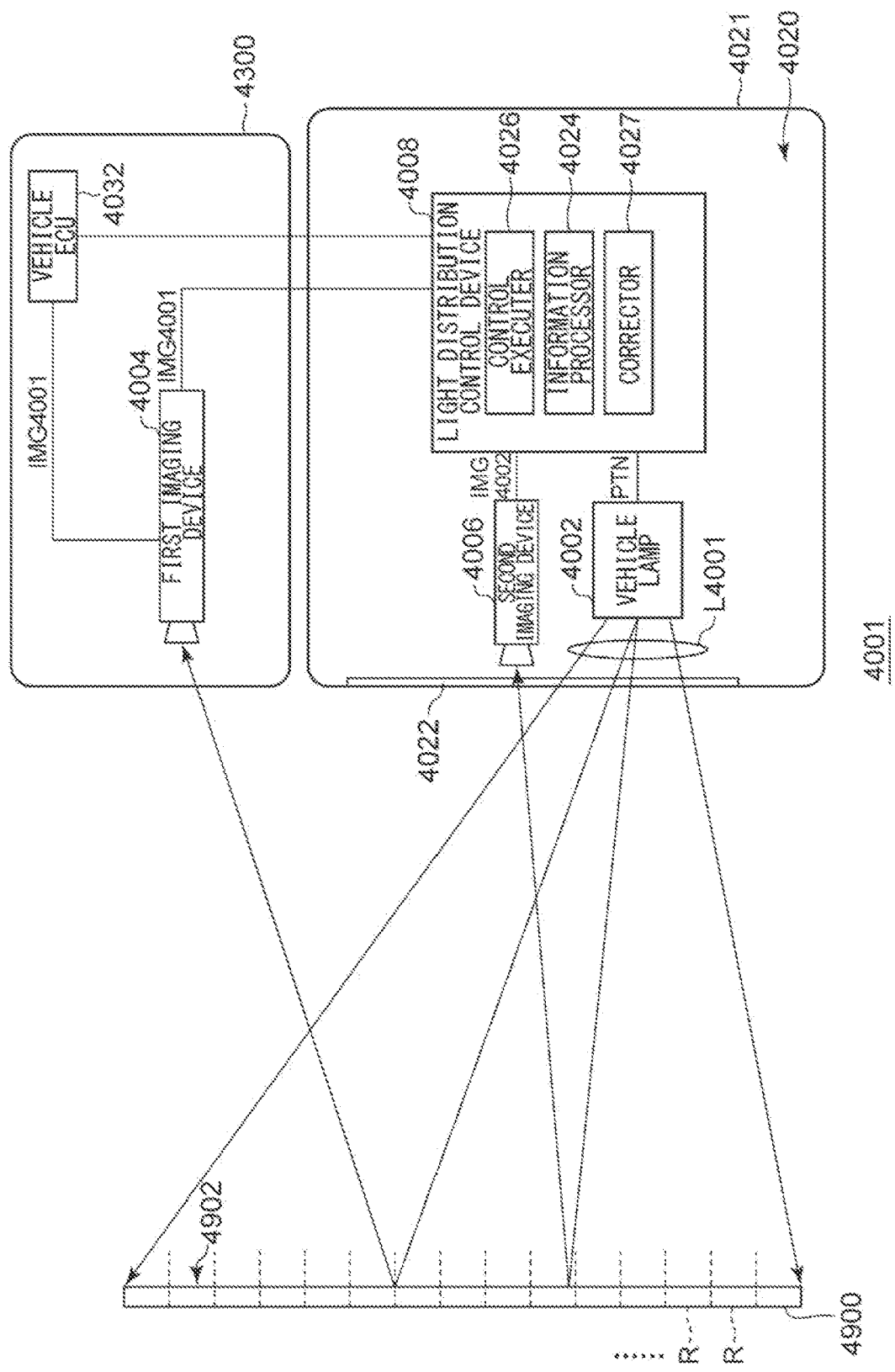
FIG. 21 is a block diagram of a vehicle lamp system according to a sixth embodiment.

FIG. 21 is a block diagram of a vehicle lamp system according to a sixth embodiment. In FIG. 21, some of components of a vehicle lamp system 4001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software. The vehicle lamp system 4001 includes a vehicle lamp 4002, a first imaging device 4004, a second imaging device 4006, and a light distribution control device 4008.

The vehicle lamp 4002 is a light distribution variable lamp capable of independently adjusting light intensities of light rays applied to a plurality of individual regions R arranged in front of the host vehicle. That is, the vehicle lamp 4002 can irradiate a front region of the vehicle with a visible light beam L4001 having a variable intensity distribution. The plurality of individual regions R are arrayed in a matrix, for example. The vehicle lamp 4002 receives data related to the light distribution pattern PTN from the light distribution control device 4008, and emits the visible light beam L4001 having the intensity distribution corresponding to the light distribution pattern PTN. As a result, the light distribution pattern PTN is formed in front of the vehicle. The light distribution pattern PTN is grasped as a two-dimensional illuminance distribution of an irradiation pattern 4902 formed on a virtual vertical screen 4900 in front of the host vehicle by the vehicle lamp 4002.

A configuration of the vehicle lamp 4002 is not particularly limited, and includes, for example, a plurality of light sources arrayed in a matrix and a lighting circuit that independently drives and turns on the light sources. Preferable examples of the light source include semiconductor light sources such as a light emitting diode (LED), a laser diode (LD), and an organic or inorganic electroluminescence (EL). Each individual region R is associated with each light source, and each individual region R is individually irradiated with light from each light source. In order to form the illuminance distribution according to the light distribution pattern PTN, the vehicle lamp 4002 may include, for example, a matrix-type pattern forming device such as a digital mirror device (DMD) or a liquid crystal device, or a scanning optical type pattern forming device that scans the front of the host vehicle with the light source light.

The first imaging device 4004 has sensitivity in a visible light region, and generates a first image IMG4001 by capturing the front region of the vehicle. The second imaging device 4006 has sensitivity in a visible light region, and generates a second image IMG4002 by capturing the front region of the vehicle. The first imaging device 4004 of the present embodiment has a frame rate lower than a frame rate of the second imaging device 4006, for example, 30 fps to 120 fps (about 8 ms to 33 ms per frame). The first imaging device 4004 has a resolution higher than a resolution of the second imaging device 4006, and is, for example, 5 million pixels or more. On the other hand, the second imaging device 4006 has a higher frame rate than a frame rate of the first imaging device 4004, for example, 200 fps to 10,000 fps (0.1 ms to 5 ms per frame). The second imaging device 4006 has a resolution lower than a resolution of the first imaging device 4004, for example, 300,000 pixels to less than 5 million pixels.

Accordingly, the first image IMG4001 generated by the first imaging device 4004 has a relatively high definition, and the second image IMG4002 generated by the second imaging device 4006 has a relatively low definition. The second imaging device 4006 may be able to measure at least a luminance distribution in the front region. The frame rates and resolutions of the first imaging device 4004 and the second imaging device 4006 are not limited to the above numerical values, and can be set to any values within a range technically consistent with each other. Preferably, the first imaging device 4004 and the second imaging device 4006 are provided such that angles of view thereof coincide with each other. The first image IMG4001 generated by the first imaging device 4004 is sent to a vehicle ECU 4032. The second image IMG4002 generated by the second imaging device 4006 is sent to the light distribution control device 4008. The first image IMG4001 may also be sent to the light distribution control device 4008.

The vehicle lamp 4002 and the second imaging device 4006 are housed in a lamp room 4020. The lamp room 4020 has a light emission surface 4022 that emits light of the vehicle lamp 4002 toward the front region. For example, the lamp room 4020 is defined by a housing 4021 including a lamp body having an opening on a vehicle front side and a translucent cover attached to cover the opening of the lamp body. The housing 4021 is fixed to a vehicle body. The translucent cover constitutes the light emission surface 4022. The second imaging device 4006 housed in the lamp room 4020 captures the front region through the light emission surface 4022. In the present embodiment, the light distribution control device 4008 is also housed in the lamp room 4020. The light distribution control device 4008 may be disposed outside the lamp room 4020, in other words, on a vehicle 4300 side. The first imaging device 4004 is disposed outside the lamp room 4020. For example, the first imaging device 4004 is a so-called in-vehicle camera provided in a vehicle interior.

The light distribution control device 4008 controls the formation of the light distribution pattern PTN by the vehicle lamp 4002 based on the first image IMG4001 and the second image IMG4002. The light distribution control device 4008 of the present embodiment executes ADB control for dynamically and adaptively controlling the light distribution pattern PTN to be supplied to the vehicle lamp 4002. The light distribution control device 4008 can be a digital processor, and may be, for example, a combination of a microcomputer including a CPU and a software program, or may be configured by a field programmable gate array (FPGA), an application specified IC (ASIC), or the like. The light distribution control device 4008 includes an information processor 4024, a control executer 4026, and a corrector 4027. An integrated circuit constituting the part itself executes a program retained in a memory, and thus, each part operates.

Figure 22A:
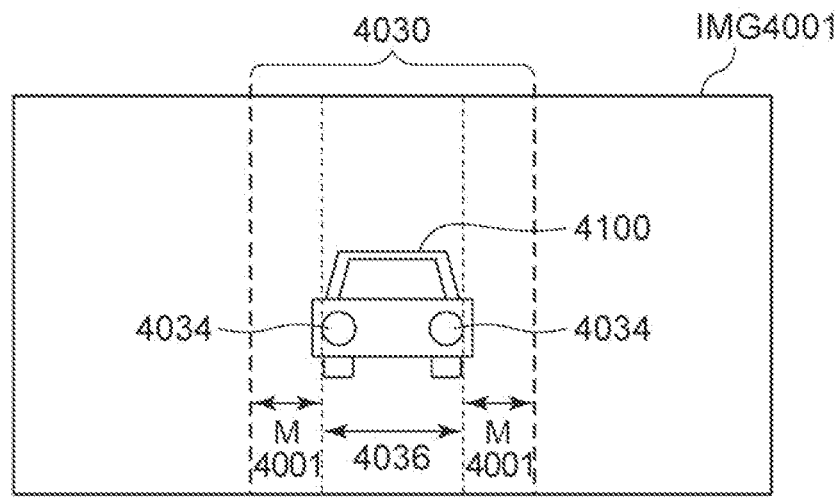
FIGS. 22A to 22C are schematic diagrams for explaining light distribution control.
Figure 22B:
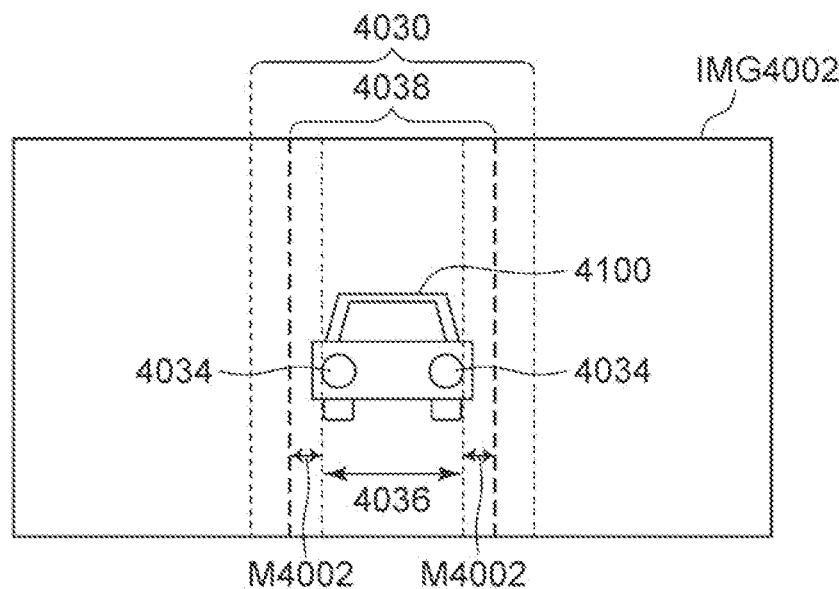
Figure 22C:
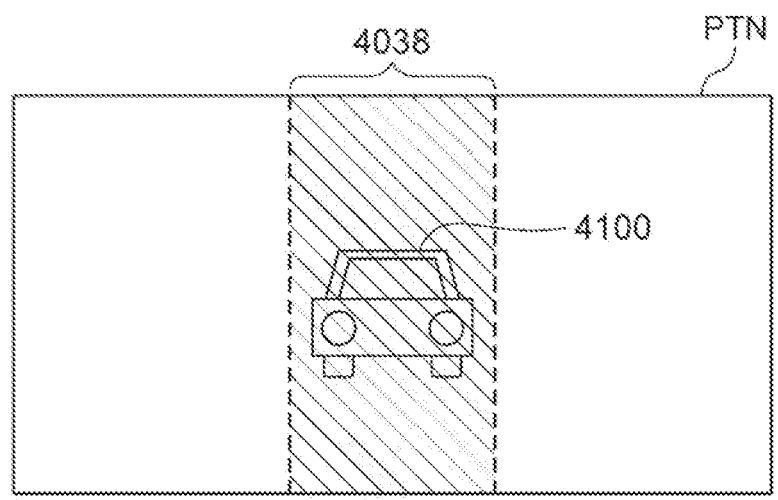

FIGS. 22A to 22C are schematic diagrams for explaining light distribution control. The information processor 4024 acquires information of the first light shielding part 4030 from the outside. The information processor 4024 of the present embodiment acquires information of the first light shielding part 4030 from the vehicle ECU 4032 mounted on the vehicle 4300. The vehicle ECU 4032 generates the information of the first light shielding part 4030 as part of control in advanced driver-assistance systems (ADAS), for example. The "light shielding part" is a part where luminance provided in a predetermined region of the light distribution pattern PTN is zero, or a portion where the luminance (illuminance) is lower than a luminance before light shielding. As illustrated in FIG. 22A, the first light shielding part 4030 is provided in a region obtained by adding a first margin M4001 to a presence range 4036 of the front vehicle 4100 in the first image IMG4001. The front vehicle 4100 includes a preceding vehicle and an oncoming vehicle.

The vehicle ECU 4032 executes highly accurate image analysis on the first image IMG4001 by using a known method including algorithm recognition, deep learning, and the like, and detects the presence range 4036 of the front vehicle 4100. The high-definition first image IMG4001 is used for detecting the presence range 4036, and thus, the first light shielding part 4030 can be decided with higher accuracy.

For example, the front vehicle 4100 has a pair of light spots 4034 corresponding to the lamp. The pair of light spots 4034 correspond to a headlamp when the front vehicle 4100 is the oncoming vehicle, and correspond to a rear lamp when the front vehicle 4100 is the preceding vehicle. The rear lamp includes a stop lamp and a tail lamp. Thus, the vehicle ECU 4032 decides the presence range 4036 of the front vehicle 4100 based on the pair of light spots 4034 in the first image IMG4001. The presence range 4036 as an example is a range in the vehicle width direction from the left end of the left light spot 4034 to the right end of the right light spot 4034. The vehicle ECU 4032 may decide the presence range 4036 from an outline of the front vehicle 4100.

The vehicle ECU 4032 adds the first margin M4001 to both sides in a vehicle width direction in the specified presence range 4036 to generate the information of the first light shielding part 4030. The vehicle ECU 4032 retains information of the first margin M4001 in advance. A size of the first margin M4001 can be appropriately set based on an experiment or simulation by a designer. The vehicle ECU 4032 generates, as information of the first light shielding part 4030, angle information of the first light shielding part 4030 with respect to the host vehicle. The vehicle ECU 4032 transmits the information of the first light shielding part 4030 to the information processor 4024. The information of the first light shielding part 4030 may be generated by the information processor 4024.

As illustrated in FIG. 22B, the information processor 4024 decides the second light shielding part 4038 on the second image IMG4002 by using the information of the first light shielding part 4030. First, the information processor 4024 overlaps the first light shielding part 4030 on the second image IMG4002. The light spot 4034 derived from the front vehicle 4100 is detected in the overlapping region overlapping the first light shielding part 4030 in the second image IMG4002. As an example, the information processor 4024 retains a predetermined luminance threshold value in advance. The luminance threshold value can be appropriately set based on an experiment or simulation by a designer. The information processor 4024 binarizes a luminance value of each pixel in the overlapping region of the second image IMG4002 by using the luminance threshold value. Two light spots 4034 arranged at predetermined intervals in a vehicle width direction obtained by the binarization processing are determined as the light spot 4034 derived from the front vehicle 4100.

The information processor 4024 decides the presence range 4036 of the front vehicle 4100 based on the light spot 4034 detected in the overlapping region of the second image IMG4002. For example, the information processor 4024 decides, as the presence range 4036, a range in the vehicle width direction from the left end of the left light spot 4034 to the right end of the right light spot 4034. A second margin M4001 narrower than the first margin M4002 is added to the presence range 4036 to decide the second light shielding part 4038. The information processor 4024 retains information of the second margin M4002 in advance. A size of the second margin M4002 can be appropriately set based on an experiment or simulation by a designer. The information processor 4024 may use the presence range 4036 itself as the second light shielding part 4038 without adding the second margin M4002 to the presence range 4036 of the front vehicle 4100. The information processor 4024 generates, as information of the second light shielding part 4038, angle information of the second light shielding part 4038 with respect to the host vehicle.

The control executer 4026 executes light distribution control for forming the light distribution pattern PTN based on the information of the second light shielding part 4038. In the light distribution control, the control executer 4026 decides the light distribution pattern PTN including the second light shielding part 4038 as illustrated in FIG. 22C. The control executer 4026 sends information of the light distribution pattern PTN to the vehicle lamp 4002. For example, when the vehicle lamp 4002 includes the DMD, the vehicle lamp 4002 performs control such that the light source is turned on or off and each mirror element constituting the DMD is switched between an on state and an off state based on the received information of the light distribution pattern PTN. As a result, the light distribution pattern PTN including the second light shielding part 4038 is formed in the front region of the host vehicle. The light distribution pattern PTN including the second light shielding part 4038 is formed, and thus, it is possible to improve the visibility of the host vehicle (the visibility of the driver of the host vehicle or the first imaging device 4004) while the glare given to the front vehicle 4100 is reduced.

The first light shielding part 4030 is decided based on the first image IMG4001 generated by the first imaging device 4004 disposed outside the lamp room 4020. On the other hand, the second light shielding part 4038 is decided based on the second image IMG4002 generated by the second imaging device 4006 housed in the lamp room 4020. The first imaging device 4004 is farther from the vehicle lamp 4002 than the second imaging device 4006. Accordingly, a deviation between an optical axis of the first imaging device 4004 and an optical axis of the vehicle lamp 4002 is larger than a deviation between an optical axis of the second imaging device 4006 and an optical axis of the vehicle lamp 4002. That is, parallax of the vehicle lamp 4002 and the first imaging device 4004 with respect to the front vehicle 4100 is larger than parallax of the vehicle lamp 4002 and the second imaging device 4006.

Thus, the light shielding part decided based on the first image IMG4001 is likely to be deviated from the front vehicle 4100 as compared with the light shielding part decided based on the second image IMG4002. Thus, the first margin M4001 added to the presence range 4036 of the front vehicle 4100 when the first light shielding part 4030 is decided is set to be larger than the second margin M4002 added to the presence range 4036 when the second light shielding part 4038 is decided. Conversely, since the second margin M4002 is decided based on the second image IMG4002, the second margin M4002 can be set to be smaller than the first margin M4001.

On the other hand, the first image IMG4001 is a high-definition image as compared with the second image IMG4002, and the vehicle ECU 4032 detects the front vehicle 4100 by performing high-definition image processing. Thus, the front vehicle 4100 can be detected with high accuracy. Accordingly, the light spot 4034 is detected in the overlapping region overlapping the first light shielding part 4030 in the second image IMG4002, and thus, it is possible to suppress detection omission and erroneous determination of the front vehicle 4100. By executing the detection processing of the light spot 4034 only in the overlapping region in the second image IMG4002, a processing time can be shortened, and a load applied to the information processor 4024 can be reduced, as compared with a case where the detection processing is executed on the entire second image IMG4002.

The vehicle ECU 4032 generates the information of the first light shielding part 4030 by highly accurate image analysis for the first image IMG4001. Thus, the information of the first light shielding part 4030 is updated at a low speed. For example, the vehicle ECU 4032 updates the information of the first light shielding part 4030 every 30 ms. On the other hand, the information processor 4024 generates the information of the second light shielding part 4038 by binarization processing of luminance for the second image IMG4002. Thus, the information of the second light shielding part 4038 is updated at a high speed. For example, the information processor 4024 updates the information of the second light shielding part 4038 every 0.1 ms to 5 ms.

Accordingly, the light distribution pattern PTN including the second light shielding part 4038 is formed, and thus, the light distribution pattern PTN can be updated at a higher speed as compared with a case where the light distribution pattern PTN including the first light shielding part 4030 is formed. Thus, the light distribution pattern PTN more suitable for a situation of the front region can be formed. Until the information of the first light shielding part 4030 is updated, the second light shielding part 4038 is decided based on the information of the same first light shielding part 4030. The movement of the front vehicle 4100 while the first light shielding part 4030 is updated generally falls within the first light shielding part 4030. Thus, until the information of the first light shielding part 4030 is updated, even though the second light shielding part 4038 is decided based on the same first light shielding part 4030, the second light shielding part 4038 can be caused to accurately follow the front vehicle 4100.

Figure 23:
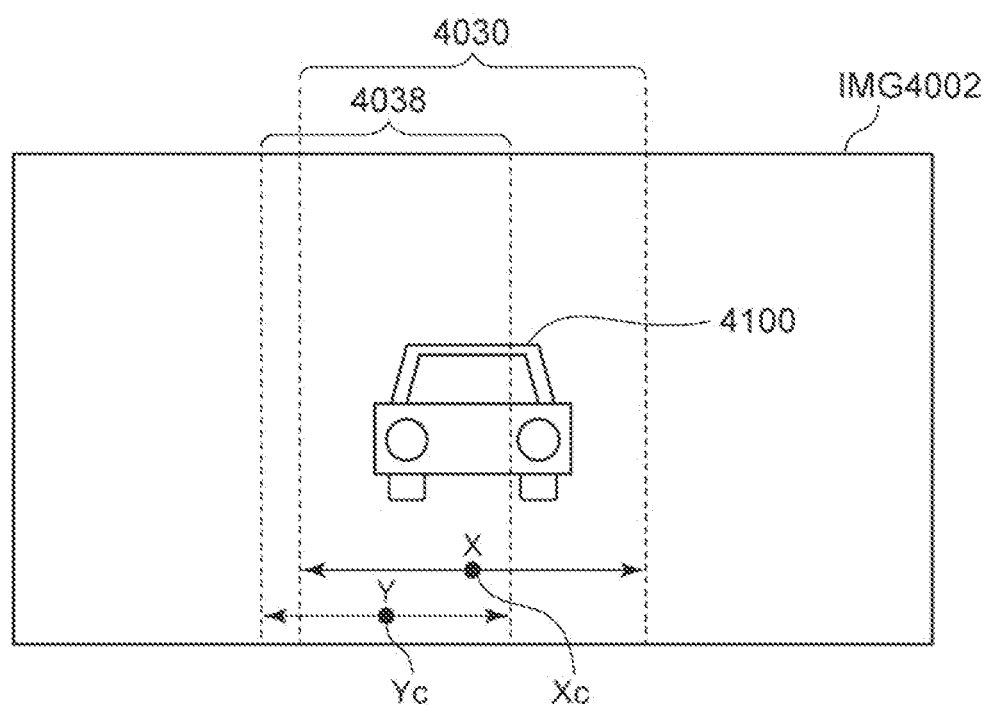
FIG. 23 is a schematic diagram for explaining correction processing.

FIG. 23 is a schematic diagram for explaining correction processing. As described above, the first light shielding part 4030 is a range obtained by adding the first margin M4001 to the presence range 4036 of the front vehicle 4100. The second light shielding part 4038 is a range obtained by adding the second margin M4002 to the presence range 4036 of the front vehicle 4100. Thus, normally, the center Xc of the width X and the center Yc of the width Y are to substantially coincide with each other.

However, for example, when the second imaging device 4006 is not fixed in a correct posture when the second imaging device 4006 is assembled to the housing 4021, the optical axis of the second imaging device 4006 is deviated. When the optical axis of the second imaging device 4006 is deviated, the position of the second light shielding part 4038 is greatly deviated with respect to the actual presence range 4036 of the front vehicle 4100, and the center Xc of the width X and the center Yc of the width Y may be greatly shifted in the width direction. In this case, there is a concern that the control executer 4026 cannot perform correct light distribution control.

By contrast, the corrector 4027 corrects the position of the second light shielding part 4038 based on correction information decided based on the deviation amount between the center Xc of the width X of the first light shielding part 4030 and the center Yc of the width Y of the second light shielding part 4038 with respect to a reference light spot. A correction amount of the second light shielding part 4038 by the corrector 4027 can be appropriately set based on an experiment or simulation by a designer.

For example, the corrector 4027 retains correction information of the second light shielding part 4038 in advance. The correction information includes angle information added to an angle of the second light shielding part 4038. The information processor 4024 transmits the generated information of the second light shielding part 4038 to the corrector 4027. When the information of the second light shielding part 4038 is received, the corrector 4027 corrects the information of the second light shielding part 4038 based on the retained correction information. The corrected information of the second light shielding part 4038 is sent to the control executer 4026. The control executer 4026 decides the light distribution pattern PTN based on this information.

The correction information of the second light shielding part 4038 is generated, for example, in inspection performed before shipping of the vehicle 4300 and is retained in the corrector 4027. Specifically, a light spot 4034 of a virtual front vehicle is projected on the virtual vertical screen 4900 in the inspection before the shipping of the vehicle 4300. The light spot 4034 is used as the reference light spot. The first imaging device 4004 captures the reference light spot and sends the generated first image IMG4001 to the vehicle ECU 4032. The vehicle ECU 4032 generates the information of the first light shielding part 4030 with respect to the reference light spot based on the first image IMG4001. The vehicle ECU 4032 sends the generated information of the first light shielding part 4030 to the information processor 4024 and the corrector 4027. The information processor 4024 may generate the information of the first light shielding part 4030 based on the reference light spot.

When the information of the first light shielding part 4030 is acquired, the information processor 4024 detects the reference light spot in the overlapping region in the second image IMG4002. The second light shielding part 4038 with respect to the reference light spot is decided, and the information of the second light shielding part 4038 is sent to the corrector 4027. When the information processor 4024 generates the information of the first light shielding part 4030, the information of the first light shielding part 4030 is also sent to the corrector 4027.

The corrector 4027 derives the center Xc of the width X of the first light shielding part 4030 and the center Yc of the width Y of the second light shielding part 4038 from the acquired information of the first light shielding part 4030 and the acquired information of the second light shielding part 4038. The deviation amount between the center Xc and the center Yc is calculated, and the correction amount with respect to the deviation amount is decided. For example, the corrector 4027 retains in advance a conversion table in which the deviation amount and the correction amount are associated with each other, and decides the correction amount based on the conversion table. The conversion table is created in advance based on experiments, simulations, or the like by a designer. The corrector 4027 retains the decided correction amount as the correction information.

The information of the first light shielding part 4030 and the information of the second light shielding part 4038 generated in the inspection before the shipping are generated based on the reference light spot at the same position. Accordingly, the deviation amount between the center Xc and the center Yc corresponds to a deviation amount from a design position of the optical axis of the second imaging device 4006. Thus, the position of the second light shielding part 4038 is corrected based on the correction information by the corrector 4027, and thus, it is possible to cancel the optical axis deviation of the second imaging device 4006 and overlap the second light shielding part 4038 on the front vehicle 4100 with higher accuracy. As a result, it is possible to prevent glare from being given to the front vehicle 4100.

Figure 24:
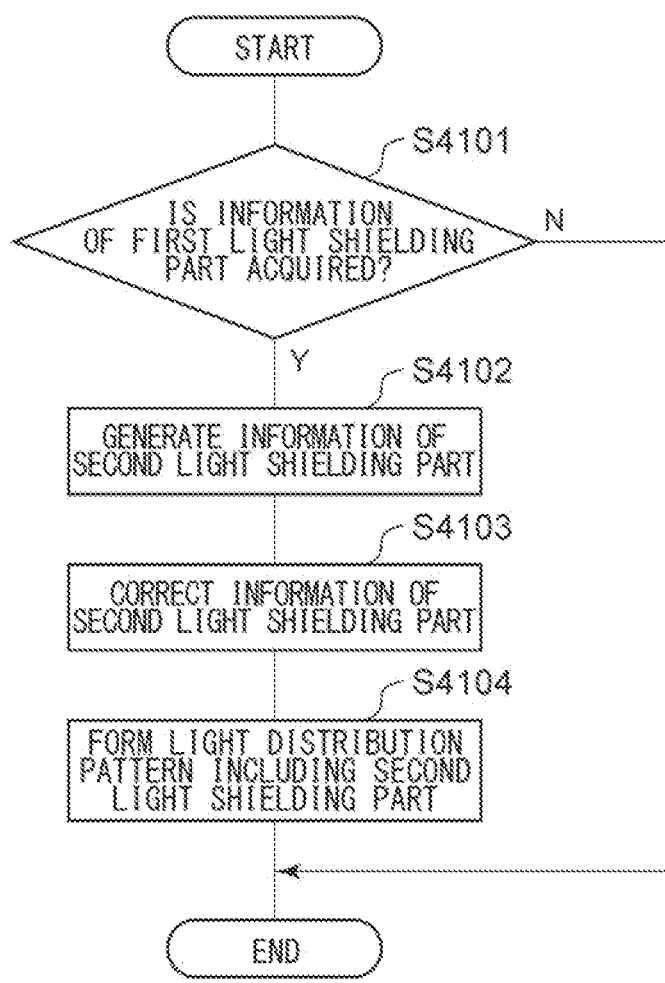
FIG. 24 is a flowchart illustrating an example of control executed by a light distribution control device according to the sixth embodiment.

FIG. 24 is a flowchart illustrating an example of control executed by the light distribution control device 4008 according to the sixth embodiment. This flow is repeatedly executed at a predetermined timing when, for example, an instruction to execute the control by a light switch (not illustrated) and an ignition is turned on.

The light distribution control device 4008 determines whether or not the information of the first light shielding part 4030 is acquired (S4101). When the information of the first light shielding part 4030 is not acquired (N in S4101), this routine is ended. When the information of the first light shielding part 4030 is acquired (Y in S4101), the light distribution control device 4008 generates the information of the second light shielding part 4038 (S4102). Subsequently, the light distribution control device 4008 corrects the information of the second light shielding part 4038 by using the retained correction information (S4103). The light distribution control device 4008 controls the vehicle lamp 4002 to form the light distribution pattern PTN including the second light shielding part 4038 (S4104), and ends this routine.

As described above, the vehicle lamp system 4001 according to the present embodiment includes the vehicle lamp 4002 capable of forming the light distribution pattern PTN including the light shielding part in the front region of the vehicle 4300, the first imaging device 4004 that is disposed outside the lamp room 4020 in which the vehicle lamp 4002 is housed and captures the front region to generate the first image IMG4001, the second imaging device 4006 that is housed in the lamp room 4020 and captures the front region to generate the second image IMG4002, and the light distribution control device 4008 that controls the formation of the light distribution pattern PTN by the vehicle lamp 4002.

The light distribution control device 4008 includes the information processor 4024, the corrector 4027, and the control executer 4026. The information processor 4024 acquires from the outside or generates the information of the first light shielding part 4030 obtained by adding the first margin M4001 to the presence range 4036 of the front vehicle 4100 in the first image IMG4001, and decides the second light shielding part 4038 obtained by adding the second margin M4002 narrower than the first margin M4001 to the presence range 4036 of the front vehicle 4100 decided based on the light spot 4034 in the overlapping region overlapping the first light shielding part 4030 in the second image IMG4002 or the second light shielding part 4038 obtained by not adding the second margin M4002 to the presence range 4036. The corrector 4027 corrects the position of the second light shielding part 4038 based on the correction information decided based on the deviation amount between the center Xc of the width X of the first light shielding part 4030 and the center Yc of the width Y of the second light shielding part 4038 with respect to the reference light spot. The control executer 4026 executes the light distribution control for forming the light distribution pattern PTN including the second light shielding part 4038 corrected by the corrector 4027.

As a result, the visibility of the host vehicle can be improved by ADB control, and it is possible to more reliably suppress erroneous light irradiation to the front vehicle 4100. Thus, the safety of vehicle driving can be further improved.

The information processor 4024 of the present embodiment acquires or generates the information of the first light shielding part 4030 with respect to the reference light spot in the inspection performed before the shipping of the vehicle 4300, and decides the second light shielding part 4038 with respect to the reference light spot. The corrector 4027 calculates the deviation amount between the center Xc of the width X of the first light shielding part 4030 and the center Yc of the width Y of the second light shielding part 4038, and acquires and retains the correction information of the second light shielding part 4038. That is, electronic aiming at the time of vehicle shipment is performed. As described above, the correction information of the second light shielding part 4038 is retained in advance, and thus, the light distribution control can be simplified. As a result, a switching speed of the light distribution pattern PTN can be increased.

The sixth embodiment of the present invention has been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

The sixth embodiment may be specified by items to be described below.

[Item 1]

There is provided a light distribution control device (4008) structured to control formation of a light distribution pattern (PTN) by a vehicle lamp (4002) structured to be able to form a light distribution pattern (PTN) including a light shielding part in a front region of a vehicle (4300).

The light distribution control device (4008) includes an information processor (4024) structured to acquire from an outside or generate information of a first light shielding part (4030) obtained by adding a first margin (M4001) to a presence range (4036) of a front vehicle (4100) in a first image (IMG4001) captured by a first imaging device (4004) disposed outside a lamp room (4020) in which the vehicle lamp (4002) is housed, acquire a second image (IMG4002) captured by a second imaging device (4006) housed in the lamp room (4020), and decide a second light shielding part (4038) obtained by adding a second margin (M4002) narrower than the first margin (M4001) to the presence range (4036) of the front vehicle (4100) decided based on a light spot (4034) of an overlapping region overlapping the first light shielding part (4030) in the second image (IMG4002) or a second light shielding part (4038) obtained by not adding the second margin (M4002) to the presence range (4036), a corrector (4027) structured to correct a position of the second light shielding part (4038) based on correction information decided based on a deviation amount between a center (Xc) of a width (X) of the first light shielding part (4030) and a center (Yc) of a width (Y) of the second light shielding part (4038) with respect to a reference light spot, and a control executer (4026) structured to execute light distribution control for forming a light distribution pattern (PTN) including the second light shielding part (4038).

[Item 2]

There is provided a light distribution control method for controlling formation of a light distribution pattern (PTN) by a vehicle lamp (4002) structured to be able to form a light distribution pattern (PTN) including a light shielding part in a front region of a vehicle (4300).

The light distribution control method includes acquiring from an outside or generating information of a first light shielding part (4030) obtained by adding a first margin (M4001) to a presence range (4036) of a front vehicle (4100) in a first image (IMG4001) captured by a first imaging device (4004) disposed outside a lamp room (4020) in which the vehicle lamp (4002) is housed, acquiring a second image (IMG4002) captured by a second imaging device (4006) housed in the lamp room (4020), and deciding a second light shielding part (4038) obtained by adding a second margin (M4002) narrower than the first margin (M4001) to the presence range (4036) of the front vehicle (4100) decided based on a light spot (4034) of an overlapping region overlapping the first light shielding part (4030) in the second image (IMG4002) or a second light shielding part (4038) obtained by not adding the second margin (M4002) to the presence range (4036), correcting a position of the second light shielding part (4038) based on correction information decided based on a deviation amount between a center (Xc) of a width (X) of the first light shielding part (4030) and a center (Yc) of a width (Y) of the second light shielding part (4038) with respect to a reference light spot, and executing light distribution control for forming a light distribution pattern (PTN) including the second light shielding part (4038).

Seventh Embodiment

Figure 25:
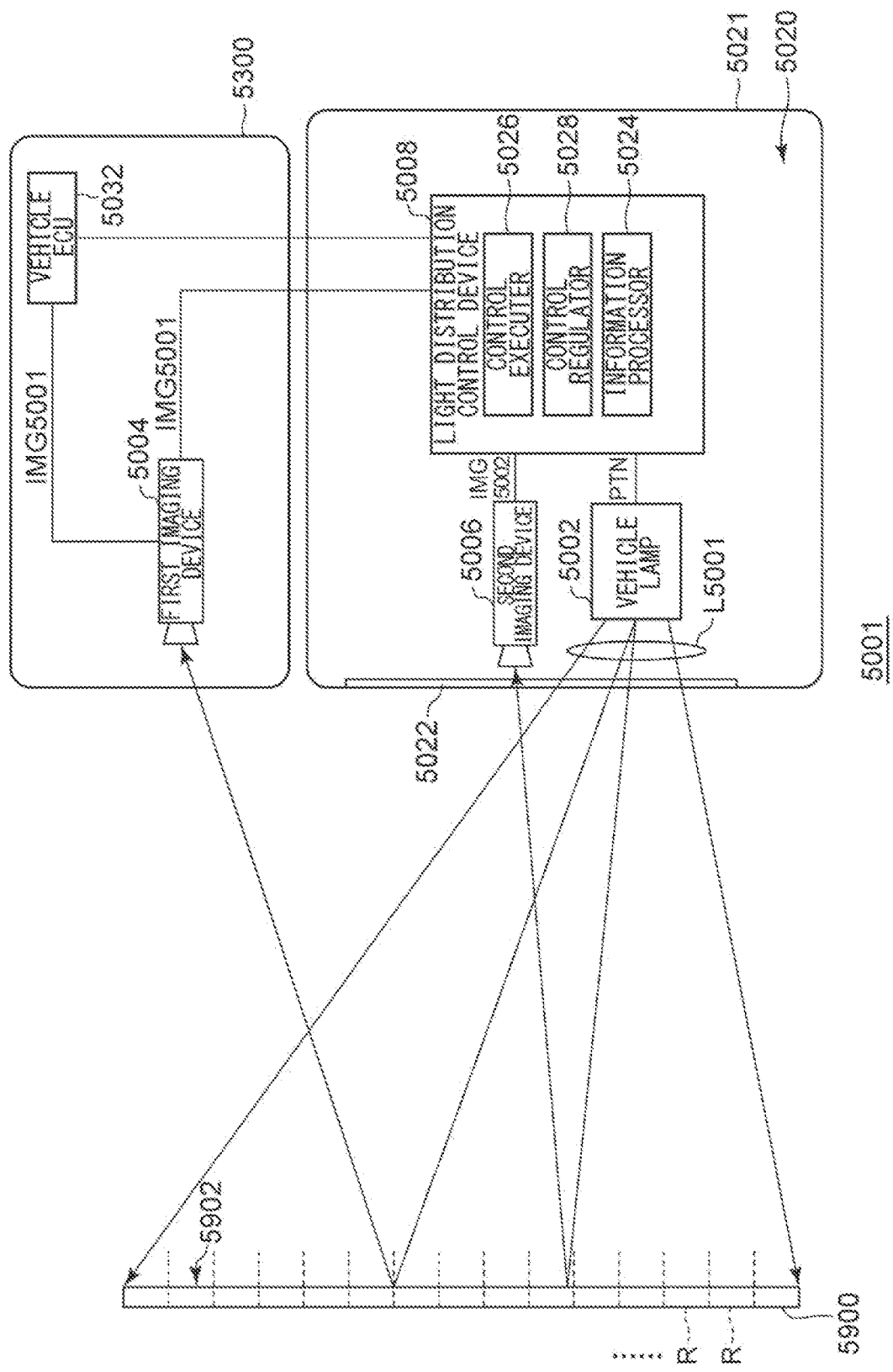
FIG. 25 is a block diagram of a vehicle lamp system according to a seventh embodiment.

FIG. 25 is a block diagram of a vehicle lamp system according to a seventh embodiment. In FIG. 25, some of components of a vehicle lamp system 5001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software. The vehicle lamp system 5001 includes a vehicle lamp 5002, a first imaging device 5004, a second imaging device 5006, and a light distribution control device 5008.

The vehicle lamp 5002 is a light distribution variable lamp capable of independently adjusting the light intensity of light irradiated to each of the plurality of individual regions R arranged in front of the host vehicle. That is, the vehicle lamp 5002 can irradiate the front region of the vehicle with a visible light beam L5001 having a variable intensity distribution. The plurality of individual regions R are arrayed in a matrix, for example. The vehicle lamp 5002 receives data related to the light distribution pattern PTN from the light distribution control device 5008, and emits the visible light beam L5001 having the intensity distribution corresponding to the light distribution pattern PTN. As a result, the light distribution pattern PTN is formed in front of the vehicle. The light distribution pattern PTN is grasped as a two-dimensional illuminance distribution of an irradiation pattern 5902 formed on a virtual vertical screen 5900 in front of the host vehicle by the vehicle lamp 5002.

A configuration of the vehicle lamp 5002 is not particularly limited, and includes, for example, a plurality of light sources arrayed in a matrix and a lighting circuit that independently drives and turns on the light sources. Preferable examples of the light source include semiconductor light sources such as a light emitting diode (LED), a laser diode (LD), and an organic or inorganic electroluminescence (EL). Each individual region R is associated with each light source, and each individual region R is individually irradiated with light from each light source. In order to form the illuminance distribution according to the light distribution pattern PTN, the vehicle lamp 5002 may include, for example, a matrix-type pattern forming device such as a digital mirror device (DMD) or a liquid crystal device, or a scanning optical type pattern forming device that scans the front of the host vehicle with the light source light.

The first imaging device 5004 has sensitivity in a visible light region, and generates a first image IMG5001 by capturing the front region of the vehicle. The second imaging device 5006 has sensitivity in a visible light region, and generates a second image IMG5002 by capturing the front region of the vehicle. The first imaging device 5004 of the present embodiment has a frame rate lower than a frame rate of the second imaging device 5006, for example, 30 fps to 120 fps (about 8 ms to 33 ms per frame). The first imaging device 5004 has a resolution higher than a resolution of the second imaging device 5006, and is, for example, 5 million pixels or more. On the other hand, the second imaging device 5006 has a higher frame rate than a frame rate of the first imaging device 5004, for example, 200 fps to 10,000 fps (0.1 ms to 5 ms per frame). The second imaging device 5006 has a resolution lower than a resolution of the first imaging device 5004, for example, 300,000 pixels to less than 5 million pixels.

Accordingly, the first image IMG5001 generated by the first imaging device 5004 has a relatively high definition, and the second image IMG5002 generated by the second imaging device 5006 has a relatively low definition. The second imaging device 5006 may be able to measure at least a luminance distribution in the front region. The frame rates and resolutions of the first imaging device 5004 and the second imaging device 5006 are not limited to the above numerical values, and can be set to any values within a range technically consistent with each other. Preferably, the first imaging device 5004 and the second imaging device 5006 are provided such that angles of view thereof coincide with each other. The first image IMG5001 generated by the first imaging device 5004 is sent to a vehicle ECU 5032. The second image IMG5002 generated by the second imaging device 5006 is sent to the light distribution control device 5008. The first image IMG5001 may also be sent to the light distribution control device 5008.

The vehicle lamp 5002 and the second imaging device 5006 are housed in a lamp room 5020. The lamp room 5020 has a light emission surface 5022 that emits light of the vehicle lamp 5002 toward the front region. For example, the lamp room 5020 is defined by a housing 5021 including a lamp body having an opening on a vehicle front side and a translucent cover attached to cover the opening of the lamp body. The housing 5021 is fixed to a vehicle body. The translucent cover constitutes the light emission surface 5022. The second imaging device 5006 housed in the lamp room 5020 captures the front region through the light emission surface 5022. In the present embodiment, the light distribution control device 5008 is also housed in the lamp room 5020. The light distribution control device 5008 may be disposed outside the lamp room 5020, in other words, on a vehicle 5300 side. The first imaging device 5004 is disposed outside the lamp room 5020. For example, the first imaging device 5004 is a so-called in-vehicle camera provided in a vehicle interior.

The light distribution control device 5008 controls the formation of the light distribution pattern PTN by the vehicle lamp 5002 based on the first image IMG5001 and the second image IMG5002. The light distribution control device 5008 of the present embodiment executes ADB control for dynamically and adaptively controlling the light distribution pattern PTN to be supplied to the vehicle lamp 5002. The light distribution control device 5008 can be a digital processor, and may be, for example, a combination of a microcomputer including a CPU and a software program, or may be configured by a field programmable gate array (FPGA), an application specified IC (ASIC), or the like. The light distribution control device 5008 includes an information processor 5024, a control executer 5026, and a control regulator 5028. An integrated circuit constituting the part itself executes a program retained in a memory, and thus, each part operates.

Figure 26A:
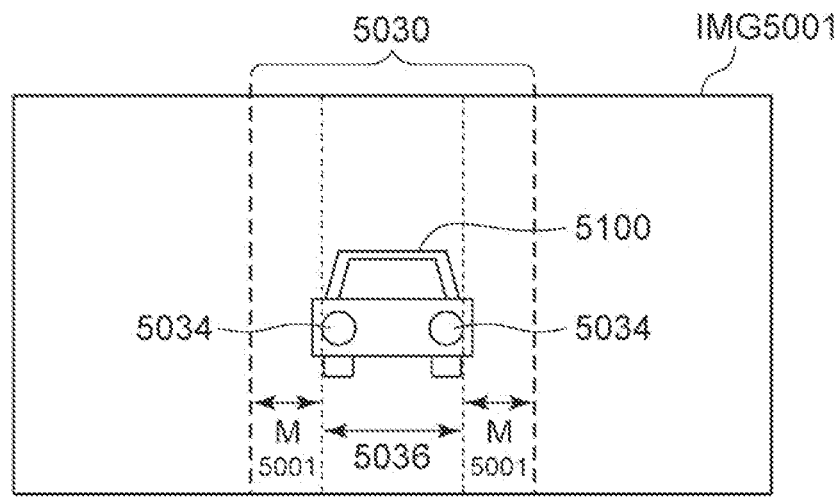
FIGS. 26A to 26C are schematic diagrams for explaining light distribution control.
Figure 26B:
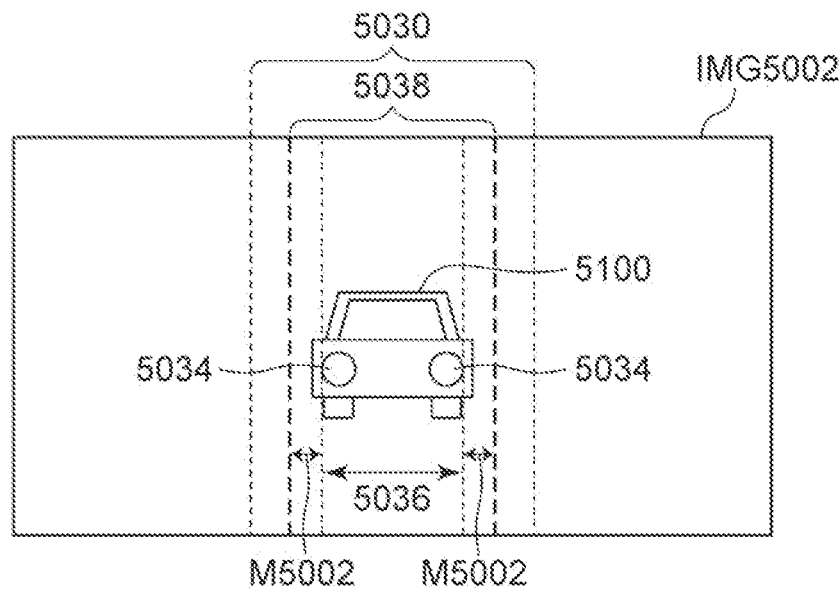
Figure 26C:
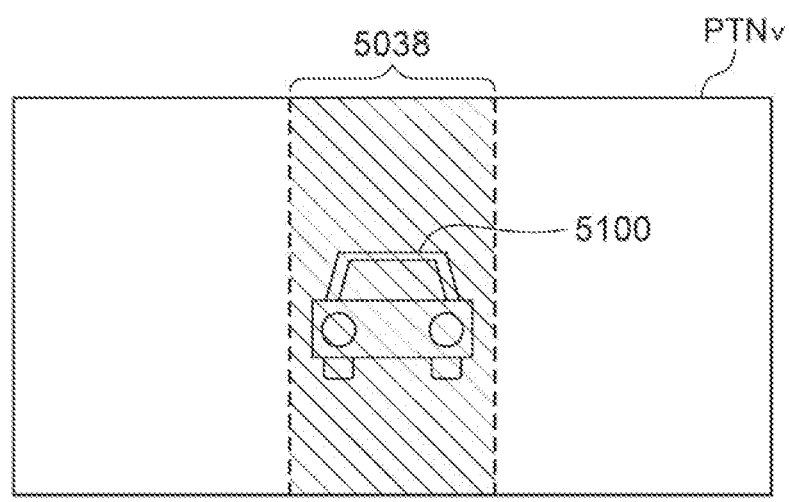

FIGS. 26A to 26C are schematic diagrams for explaining light distribution control. The information processor 5024 acquires information of the first light shielding part 5030 from the outside. The information of the first light shielding part 5030 corresponds to information on a presence range 5036 of a front vehicle 5100. The information processor 5024 of the present embodiment acquires the information of the first light shielding part 5030 from the vehicle ECU 5032 mounted on the vehicle 5300. The vehicle ECU 5032 generates the information of the first light shielding part 5030 as part of control in advanced driver-assistance systems (ADAS), for example. The "light shielding part" is a part where luminance (illuminance) provided in a predetermined region of the light distribution pattern PTN is zero, or a portion where the luminance (illuminance) is lower than a luminance before light shielding.

As illustrated in FIG. 26A, the first light shielding part 5030 is provided in a region obtained by adding a first margin M5001 to a presence range 5036 of the front vehicle 5100 in the first image IMG5001. The front vehicle 5100 includes a preceding vehicle and an oncoming vehicle. The vehicle ECU 5032 executes highly accurate image analysis on the first image IMG5001 captured by the first imaging device 5004 by using a known method including algorithm recognition, deep learning, or the like, and detects the presence range 5036 of the front vehicle 5100. The high-definition first image IMG5001 is used for detecting the presence range 5036, and thus, the first light shielding part 5030 can be decided with higher accuracy.

For example, the front vehicle 5100 has a pair of light spots 5034 corresponding to the lamp. The pair of light spots 5034 correspond to a headlamp when the front vehicle 5100 is the oncoming vehicle, and corresponds to a rear lamp when the front vehicle 5100 is the preceding vehicle. The rear lamp includes a stop lamp and a tail lamp. Thus, the vehicle ECU 5032 determines the presence range 5036 of the front vehicle 5100 based on the pair of light spots 5034 in the first image IMG5001. The presence range 5036 as an example is a range in the vehicle width direction from the left end of the left light spot 5034 to the right end of the right light spot 5034. The vehicle ECU 5032 may decide the presence range 5036 from an outline of the front vehicle 5100.

The vehicle ECU 5032 adds the first margin M5001 to both sides in the vehicle width direction in the specified presence range 5036 to generate the information of the first light shielding part 5030. The vehicle ECU 5032 retains information of the first margin M5001 in advance. A size of the first margin M5001 can be appropriately set based on an experiment or simulation by a designer. The vehicle ECU 5032 generates, as information of the first light shielding part 5030, angle information of the first light shielding part 5030 with respect to the host vehicle. The vehicle ECU 5032 sends the information of the first light shielding part 5030 to the information processor 5024. The information of the first light shielding part 5030 may be generated by the information processor 5024.

As illustrated in FIG. 26B, the information processor 5024 decides the second light shielding part 5038 on the second image IMG5002 by using the information of the first light shielding part 5030. The information processor 5024 overlaps the first light shielding part 5030 on the second image IMG5002 captured by the second imaging device 5006. As a result, in the second image IMG5002, the overlapping region overlapping the first light shielding part 5030 (that is, the region including the presence range 5036) is confirmed. The light spot 5034 derived from the front vehicle 5100 is detected in the overlapping region in the second image IMG5002. As an example, the information processor 5024 retains a predetermined luminance threshold value in advance. The luminance threshold value can be appropriately set based on an experiment or simulation by a designer. The information processor 5024 binarizes a luminance value of each pixel in the overlapping region of the second image IMG5002 by using the luminance threshold value. Two light spots 5034 arranged at predetermined intervals in a vehicle width direction obtained by the binarization processing are determined as the light spot 5034 derived from the front vehicle 5100.

The information processor 5024 decides the second light shielding part 5038 by using the light spot 5034 included in the overlapping region of the second image IMG5002. The information processor 5024 of the present embodiment first decides the presence range 5036 of the front vehicle 5100 based on the light spot 5034 detected in the overlapping region of the second image IMG5002. For example, the information processor 5024 decides, as the presence range 5036, a range in the vehicle width direction from the left end of the left light spot 5034 to the right end of the right light spot 5034. A second margin M5001 narrower than the first margin M5002 is added to the presence range 5036 to decide the second light shielding part 5038. The information processor 5024 retains information of the second margin M5002 in advance. A size of the second margin M5002 can be appropriately set based on an experiment or simulation by a designer. The information processor 5024 may use the presence range 5036 itself as the second light shielding part 5038 without adding the second margin M5002 to the presence range 5036 of the front vehicle 5100. The information processor 5024 generates, as information of the second light shielding part 5038, angle information of the second light shielding part 5038 with respect to the host vehicle. The information processor 5024 sends the information of the second light shielding part 5038 to the control executer 5026.

As illustrated in FIG. 26C, the control executer 5026 executes first light distribution control for forming a variable light distribution pattern PTNv including the second light shielding part 5038 based on the information of the second light shielding part 5038. In the first light distribution control, the control executer 5026 decides the variable light distribution pattern PTNv including the second light shielding part 5038, and sends information of the variable light distribution pattern PTNv to the vehicle lamp 5002. For example, when the vehicle lamp 5002 includes the DMD, the vehicle lamp 5002 performs control such that the light source is turned on or off and each mirror element constituting the DMD is switched between an on state or an off state based on the received information of the variable light distribution pattern PTNv. As a result, the variable light distribution pattern PTNv including the second light shielding part 5038 is formed in the front region of the host vehicle. The variable light distribution pattern PTNv including the second light shielding part 5038 is formed, and thus, it is possible to improve the visibility of the host vehicle (the visibility of the driver of the host vehicle or the first imaging device 5004) while the glare given to the front vehicle 5100 is reduced.

In addition to the variable light distribution pattern PTNv including the light shielding part corresponding to the presence range 5036 of the front vehicle 5100, the vehicle lamp 5002 can form a fixed-shape low beam light distribution pattern PTN1 and a fixed-shape high beam light distribution pattern PTNh in the front region of the vehicle 5300. The low beam light distribution pattern PTN1 is a light distribution pattern PTN having a cutoff line at an upper end. The cutoff line includes a first portion extending in the horizontal direction on a lane side of an oncoming vehicle, a second portion extending in the horizontal direction at a position higher than the first portion on a lane side of the host vehicle, and a third portion extending obliquely between the first portion and the second portion to connect the first and second portions. The high beam light distribution pattern PTNh is a light distribution pattern PTN that does not have a cutoff line and illuminates a wide range and a far range in front. Since the low beam light distribution pattern PTN1 and the high beam light distribution pattern PTNh have known shapes, illustration thereof is omitted.

The first light shielding part 5030 is decided based on the first image IMG5001 generated by the first imaging device 5004 disposed outside the lamp room 5020. On the other hand, the second light shielding part 5038 is decided based on the second image IMG5002 generated by the second imaging device 5006 housed in the lamp room 5020. The first imaging device 5004 is farther from the vehicle lamp 5002 than the second imaging device 5006. Accordingly, a deviation between an optical axis of the first imaging device 5004 and an optical axis of the vehicle lamp 5002 is larger than a deviation between an optical axis of the second imaging device 5006 and an optical axis of the vehicle lamp 5002. That is, parallax of the vehicle lamp 5002 and the first imaging device 5004 with respect to the front vehicle 5100 is larger than parallax of the vehicle lamp 5002 and the second imaging device 5006.

Thus, the light shielding part decided based on the first image IMG5001 is likely to be deviated from the front vehicle 5100 as compared with the light shielding part decided based on the second image IMG5002. Thus, the first margin M5001 added to the presence range 5036 of the front vehicle 5100 when the first light shielding part 5030 is decided is set to be larger than the second margin M5002 added to the presence range 5036 when the second light shielding part 5038 is decided. Conversely, since the second margin M5002 is decided based on the second image IMG5002, the second margin M5002 can be set to be smaller than the first margin M5001.

On the other hand, the first image IMG5001 is a high-definition image as compared with the second image IMG5002, and the vehicle ECU 5032 detects the front vehicle 5100 by performing high-definition image processing. Thus, the front vehicle 5100 can be detected with high accuracy. Accordingly, the light spot 5034 is detected in the overlapping region overlapping the first light shielding part 5030 in the second image IMG5002, and thus, it is possible to suppress detection omission and erroneous determination of the front vehicle 5100. By executing the detection processing of the light spot 5034 only in the overlapping region in the second image IMG5002, a processing time can be shortened, and a load applied to the information processor 5024 can be reduced, as compared with a case where the detection processing is executed on the entire second image IMG5002.

The vehicle ECU 5032 generates the information of the first light shielding part 5030 by highly accurate image analysis for the first image IMG5001. Thus, the information of the first light shielding part 5030 is updated at a low speed. For example, the vehicle ECU 5032 updates the information of the first light shielding part 5030 every 30 ms. On the other hand, the information processor 5024 generates the information of the second light shielding part 5038 by binarization processing of luminance for the second image IMG5002. Thus, the information of the second light shielding part 5038 is updated at a high speed. For example, the information processor 5024 updates the information of the second light shielding part 5038 every 0.1 ms to 5 ms.

Accordingly, the variable light distribution pattern PTNv including the second light shielding part 5038 is formed, and thus, the variable light distribution pattern PTNv can be updated at a higher speed as compared with a case where the variable light distribution pattern PTNv including the first light shielding part 5030 is formed. Thus, the variable light distribution pattern PTNv more suitable for the situation of the front region can be formed. Until the information of the first light shielding part 5030 is updated, the second light shielding part 5038 is decided based on the information of the same first light shielding part 5030. The movement of the front vehicle 5100 while the first light shielding part 5030 is updated generally falls within the first light shielding part 5030. Thus, until the information of the first light shielding part 5030 is updated, even though the second light shielding part 5038 is decided based on the same first light shielding part 5030, the second light shielding part 5038 can be caused to accurately follow the front vehicle 5100.

When the information of the first light shielding part 5030 cannot be generated due to a failure or the like of the first imaging device 5004 or the ADAS, the vehicle ECU 5032 transmits an error signal. For example, when the vehicle ECU 5032 cannot acquire the first image IMG5001 from the first imaging device 5004 within a predetermined time, the vehicle ECU transmits an error signal. The predetermined time is decided based on a frame rate of the first imaging device 5004, for example. When the information processor 5024 generates the information of the first light shielding part 5030 and when the information of the first light shielding part 5030 cannot be generated, the information processor 5024 transmits an error signal.

The control regulator 5028 receives an error signal transmitted from the vehicle ECU 5032 or the control executer 5026. The error signal is a signal indicating that the information of the first light shielding part 5030 which is the information on the presence range 5036 of the front vehicle 5100 cannot be acquired. Thus, when the error signal is received, the control regulator 5028 regulates (stops) the first light distribution control and executes second light distribution control. In the second light distribution control, the control regulator 5028 controls the vehicle lamp 5002 to form the low beam light distribution pattern PTN1 when the light spot 5034 is included in the second image IMG5002. The control regulator 5028 controls the vehicle lamp 5002 to form the high beam light distribution pattern PTNh when the light spot 5034 is not included in the second image IMG5002. That is, the second light distribution control is so-called auto-high beam control.

As an example, the control regulator 5028 retains information of the low beam light distribution pattern PTN1 and the high beam light distribution pattern PTNh in advance. When the error signal is received, the control regulator 5028 binarizes a luminance value of each pixel in the second image IMG5002 by using the luminance threshold value. When there are two light spots 5034 arranged at a predetermined interval in a vehicle width direction in the second image IMG5002, the information of the low beam light distribution pattern PTN1 is transmitted to the vehicle lamp 5002. On the other hand, when there are no two light spots 5034 in the second image IMG5002, the information of the high beam light distribution pattern PTNh is transmitted to the vehicle lamp 5002.

According to the second light distribution control, in a situation where it is estimated that there is the front vehicle 5100, it is possible to form the low beam light distribution pattern PTN1 that prioritizes glare suppression on the front vehicle 5100. On the other hand, in a situation where it is estimated that there is no front vehicle 5100, it is possible to form the high beam light distribution pattern PTNh that prioritizes improvement of visibility of the host vehicle.

The control regulator 5028 may determine which light distribution pattern PTN is formed depending on whether or not there is one or more light spots 5034. The control regulator 5028 may decide, as a presence possibility region of the front vehicle 5100, a region excluding a predetermined range at both ends in the vehicle width direction and/or a predetermined range at both ends in the vertical direction in the second image IMG5002, and may determine that only light spots within the presence possibility region are the light spots 5034 derived from the front vehicle 5100. The ranges of both the ends in the vehicle width direction and both the ends in the vertical direction excluded from the presence possibility region can be appropriately set based on experiments or simulations by a designer.

Figure 27:
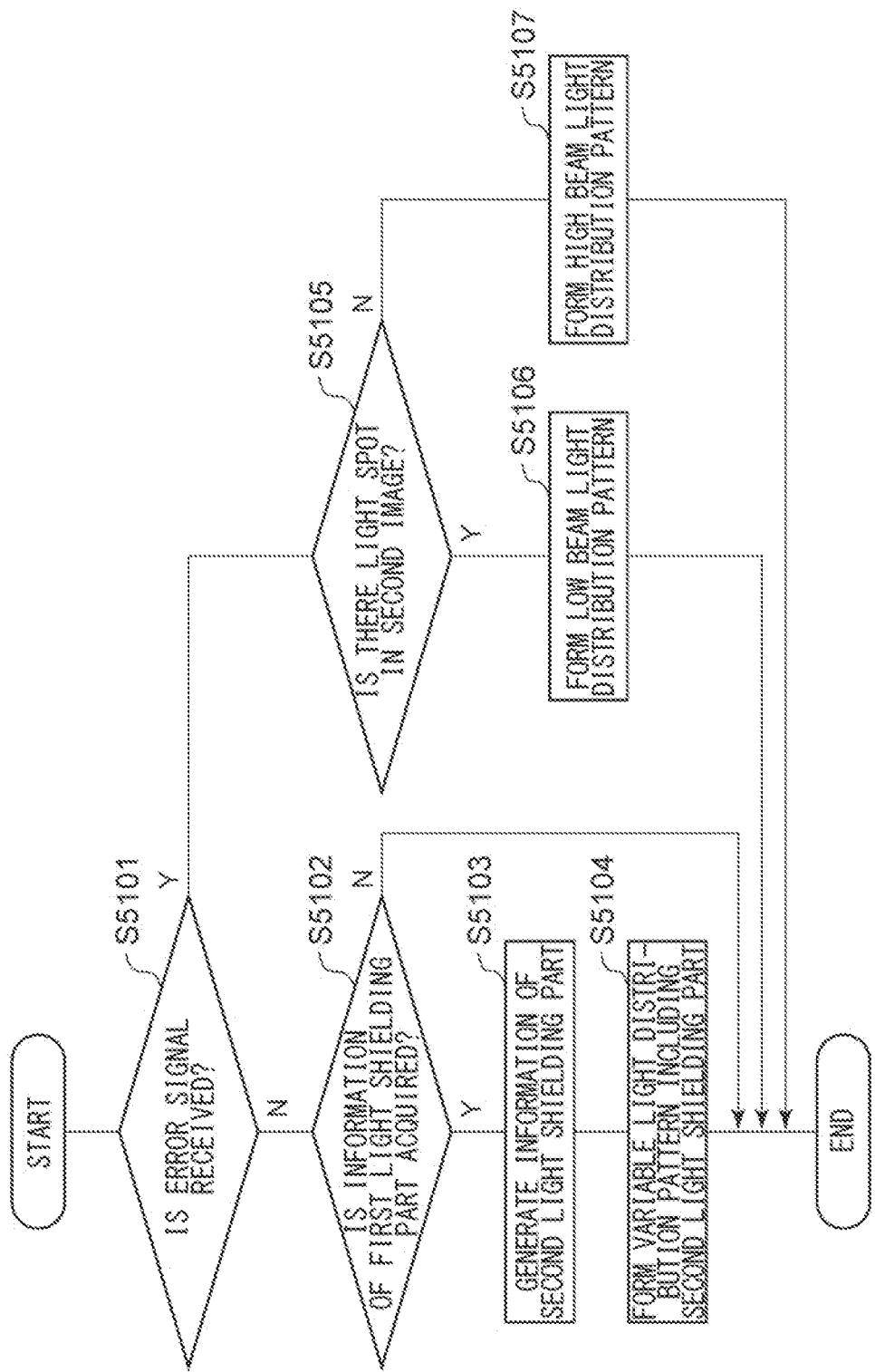
FIG. 27 is a flowchart illustrating an example of control executed by a light distribution control device according to the seventh embodiment.

FIG. 27 is a flowchart illustrating an example of control executed by the light distribution control device 5008 according to the seventh embodiment. This flow is repeatedly executed at a predetermined timing when, for example, an instruction to execute the control by a light switch (not illustrated) and an ignition is turned on.

The light distribution control device 5008 determines whether or not an error signal is received (S5101). When the error signal is not received (N in S5101), the light distribution control device 5008 determines whether or not the information of the first light shielding part 5030 is acquired (S5102). When the information of the first light shielding part 5030 is not acquired (N in S5102), this routine is ended. When the information of the first light shielding part 5030 is acquired (Y in S5102), the light distribution control device 5008 generates the information of the second light shielding part 5038 (S5103). Subsequently, the light distribution control device 5008 controls the vehicle lamp 5002 to form the variable light distribution pattern PTNv including the second light shielding part 5038 (S5104), and ends this routine.

When the error signal is received (Y in S5101), the light distribution control device 5008 determines whether or not there is the light spot 5034 in the second image IMG5002 (S5105). When there is the light spot 5034 in the second image IMG5002 (Y in S5105), the light distribution control device 5008 controls the vehicle lamp 5002 to form the low beam light distribution pattern PTN1 (S5106), and ends this routine. When there is no light spot 5034 in the second image IMG5002 (N in S5105), the light distribution control device 5008 controls the vehicle lamp 5002 to form the high beam light distribution pattern PTNh (S5107), and ends this routine.

As described above, the vehicle lamp system 5001 according to the present embodiment includes the vehicle lamp 5002 capable of forming the variable light distribution pattern PTNv including the light shielding part corresponding to the presence range 5036 of the front vehicle 5100, and the fixed-shape low beam light distribution pattern PTN1 and the high beam light distribution pattern PTNh in the front region of the vehicle 5300, the first imaging device 5004 and the second imaging device 5006 that capture the front region, and the light distribution control device 5008 that controls the formation of the light distribution pattern PTN by the vehicle lamp 5002.

The light distribution control device 5008 includes an information processor 5024, a control executer 5026, and a control regulator 5028. The information processor 5024 acquires from the outside or generates the information on the presence range 5036 of the front vehicle 5100 detected by image analysis of the first image IMG5001 captured by the first imaging device 5004, that is, the information of the first light shielding part 5030. The information processor 5024 decides the second light shielding part 5038 by using the light spot 5034 included in the overlapping region overlapping the first light shielding part 5030 in the second image IMG5002 captured by the second imaging device 5006.

The control executer 5026 executes the first light distribution control for forming the variable light distribution pattern PTNv including the second light shielding part 5038. The control regulator 5028 receives an error signal indicating that the information on the presence range 5036 of the front vehicle 5100 cannot be acquired, and regulates the first light distribution control. The second light distribution control for forming the low beam light distribution pattern PTN1 when the light spot 5034 is included in the second image IMG5002 and forming the high beam light distribution pattern PTNh when the light spot 5034 is not included in the second image IMG5002 is executed.

According to the present embodiment, it is possible to improve the visibility of the host vehicle while glare to the front vehicle 5100 is avoided by ADB control. When the ADB control fails, so-called auto-high beam control for switching between the low beam light distribution pattern PTN1 and the high beam light distribution pattern PTNh based on whether or not there is the light spot 5034 in the second image IMG5002 is executed. As a result, it is possible to reduce deterioration in the safety of vehicle driving when the ADB control fails.

Eighth Embodiment

An eighth embodiment has a configuration common to the seventh embodiment except for the control content of the light distribution control device 5008. Hereinafter, the present embodiment will be described focusing on configurations different from the seventh embodiment, and common configurations will be briefly described or description thereof will be omitted.

Figure 28:
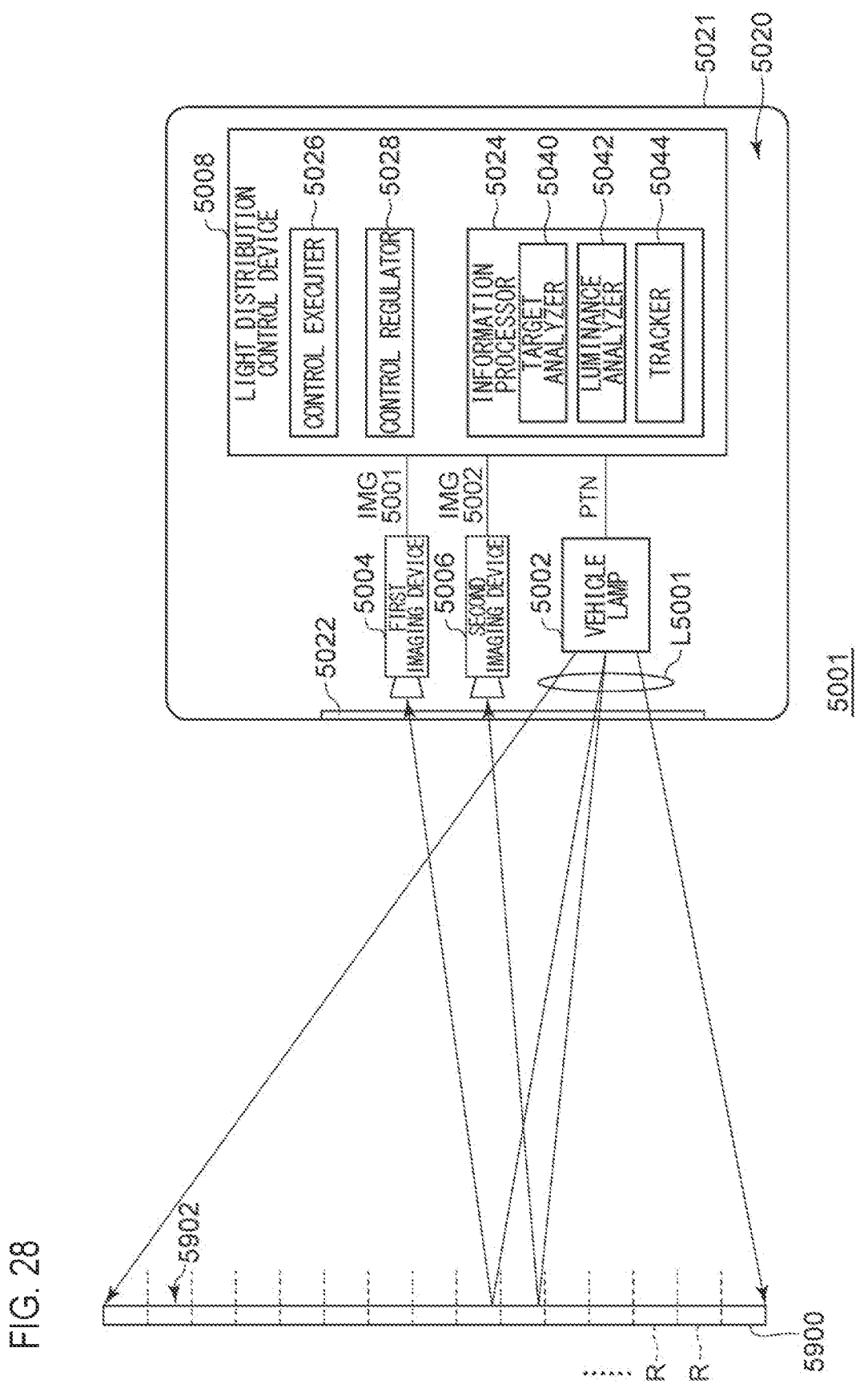
FIG. 28 is a block diagram of a vehicle lamp system according to an eighth embodiment.

FIG. 28 is a block diagram of a vehicle lamp system according to the eighth embodiment. In FIG. 28, some of components of a vehicle lamp system 5001 are depicted as functional blocks. These functional blocks are realized by elements and circuits such as a CPU and a memory of a computer as a hardware configuration, and are realized by a computer program or the like as a software configuration. Those skilled in the art will understand that these functional blocks can be realized in various forms by combining the hardware and the software. The vehicle lamp system 5001 includes a vehicle lamp 5002, a first imaging device 5004, a second imaging device 5006, and a light distribution control device 5008.

The vehicle lamp 5002 is a light distribution variable lamp capable of independently adjusting the light intensity of light irradiated to each of the plurality of individual regions R arranged in front of the host vehicle. The vehicle lamp 5002 has the same structure as the vehicle lamp 5002 of the seventh embodiment. Accordingly, the vehicle lamp 5002 can form the variable light distribution pattern PTNv including the light shielding part corresponding to the presence range 5036 of the front vehicle 5100, the fixed-shape low beam light distribution pattern PTN1, and the fixed-shape high beam light distribution pattern PTNh in the front region of the vehicle 5300. The resolution of the vehicle lamp 5002 is, for example, 1000 to 300,000 pixels. The vehicle lamp 5002 can change the light distribution pattern, for example, every 0.1 ms to 5 ms.

The first imaging device 5004 generates a first image IMG5001, and the second imaging device 5006 generates a second image IMG5002. The first imaging device 5004 has a frame rate lower than a frame rate of the second imaging device 5006 and a resolution higher than a resolution of the second imaging device 5006. On the other hand, the second imaging device 5006 has a frame rate higher than a frame rate of the first imaging device 5004 and a resolution lower than a resolution of the first imaging device 5004. One pixel or a plurality of pixels of the second imaging device 5006 corresponds to each individual region R.

In the present embodiment, although the vehicle lamp 5002, the first imaging device 5004, the second imaging device 5006, and the light distribution control device 5008 are housed in the lamp room 5020, the present invention is not limited thereto, and some members may be provided outside the lamp room 5020. For example, the first imaging device 5004 may be an in-vehicle camera provided on a vehicle 5300 side as in the seventh embodiment.

The light distribution control device 5008 controls the formation of the light distribution pattern PTN by the vehicle lamp 5002 based on the first image IMG5001 and the second image IMG5002. The light distribution control device 5008 includes an information processor 5024, a control executer 5026, and a control regulator 5028.

The information processor 5024 decides a light shielding part on the second image IMG5002 based on the presence range 5036 of the front vehicle 5100. In the present embodiment, an overlapping region overlapping the presence range 5036 in the second image IMG5002 is decided as a light shielding part. That is, the presence range 5036 itself is a light shielding part. As in the seventh embodiment, a region obtained by adding a predetermined margin to the presence range 5036 may be used as a light shielding part. The information processor 5024 includes a target analyzer 5040, a luminance analyzer 5042, and a tracker 5044. The first image IMG5001 generated by the first imaging device 5004 is sent to the target analyzer 5040. The second image IMG5002 generated by the second imaging device 5006 is sent to the luminance analyzer 5042.

The target analyzer 5040 detects the presence range 5036 of the front vehicle 5100 present in front of the host vehicle by image analysis of the first image IMG5001 captured by the first imaging device 5004. The target analyzer 5040 executes highly accurate image analysis on the first image IMG5001 as compared with the luminance analyzer 5042 by using a known method including algorithm recognition, deep learning, and the like, and outputs an analysis result at a low speed. The target analyzer 5040 can detect the presence range 5036 of the front vehicle 5100 from a pair of light spots 5034 corresponding to the lamp of the front vehicle 5100, the outline of the front vehicle 5100, and the like. The target analyzer 5040 detects the presence range 5036 of the front vehicle 5100 every 30 ms, for example, and sends the detection result to the tracker 5044. The detection result of the target analyzer 5040 corresponds to the information on the presence range 5036 of the front vehicle 5100.

The luminance analyzer 5042 analyzes the luminance of each individual region R based on the second image IMG5002 captured by the second imaging device 5006. The luminance analyzer 5042 executes simple image processing as compared with the image analysis performed by the target analyzer 5040, and outputs the analysis result at a high speed. For example, the luminance analyzer 5042 binarizes a luminance value of each pixel of the second image IMG5002 by using the luminance threshold value. As a result, the plurality of individual regions R are divided into two regions of an individual region R having a relatively high luminance and an individual region R having a relatively low luminance. The luminance analyzer 5042 analyzes the luminance of each individual region R whenever the second image IMG5002 is acquired. The luminance analyzer 5042 can analyze the luminance every 0.1 ms to 5 ms, for example. The luminance analyzer 5042 sends the analysis result to the tracker 5044. The luminance analyzer 5042 may send, as the analysis result, the luminance value itself of each individual region R to the tracker 5044 without performing the luminance binarization processing on the second image IMG5002.

The tracker 5044 detects displacement of the presence range 5036 of the front vehicle 5100 detected by the target analyzer 5040 based on the analysis result of the luminance analyzer 5042. Specifically, the tracker 5044 integrates the analysis result of the target analyzer 5040 and the analysis result of the luminance analyzer 5042. As a result, in the second image IMG5002, the overlapping region overlapping the presence range 5036 of the front vehicle 5100 is confirmed.

The tracker 5044 associates the luminance of the individual region R where the light spot 5034 included in the overlapping region is positioned in the second image IMG5002 with the front vehicle 5100. The tracker 5044 can detect the presence range 5036 of the front vehicle 5100, in other words, the displacement of the light shielding part, by recognizing the position of the luminance associated with the front vehicle 5100 in the analysis result of the luminance analyzer 5042 acquired thereafter. That is, the tracker 5044 decides the light shielding part by using the light spot 5034 included in the overlapping region. The tracker 5044 executes the tracking of the presence range 5036, in other words, the update of the light shielding part based on the light spot 5034, for example, every 0.1 ms to 5 ms. The tracker 5044 sends the detection result to the control executer 5026.

The control executer 5026 executes the first light distribution control for forming the variable light distribution pattern PTNv including the light shielding part based on the detection result of the tracker 5044. In the first light distribution control, the control executer 5026 decides the illuminance value of the light with which each individual region R is irradiated based on the detection result of the tracker 5044, and decides the variable light distribution pattern PTNv.

Specifically, the control executer 5026 sets a first illuminance value corresponding to the light shielding part for the presence range 5036 of the front vehicle 5100. A predetermined second illuminance value higher than the first illuminance value is set for the other individual regions R. For example, when the illuminance value is 256 gradations of 0 to 255, a first illuminance value is "0", and a second illuminance value is "255". The control executer 5026 sends the information of the variable light distribution pattern PTNv to the vehicle lamp 5002. The control executer 5026 can update the variable light distribution pattern PTNv every 0.1 ms to 5 ms, for example.

In the individual region R that does not overlap the presence range 5036, the control executer 5026 may decide a relatively low illuminance value in the individual region R having a relatively high luminance, and may decide a relatively high illuminance value in the individual region R having a relatively low luminance. When luminance data on which binarization processing is not performed is acquired from the luminance analyzer 5042, the control executer 5026 may decide the illuminance value of the individual region R that does not overlap the presence range 5036 in three or more stages based on each luminance value.

When the information on the presence range 5036 of the front vehicle 5100 cannot be acquired due to a failure or the like of the first imaging device 5004, the target analyzer 5040 transmits an error signal. For example, when the first image IMG5001 cannot be acquired from the first imaging device 5004 within a predetermined time, the target analyzer 5040 transmits an error signal. When the error signal is received, the control regulator 5028 regulates (stops) the first light distribution control and executes the second light distribution control. In the second light distribution control, the control regulator 5028 controls the vehicle lamp 5002 to form the low beam light distribution pattern PTN1 when the light spot 5034 is included in the second image IMG5002. The control regulator 5028 controls the vehicle lamp 5002 to form the high beam light distribution pattern PTNh when the light spot 5034 is not included in the second image IMG5002.

Figure 29:
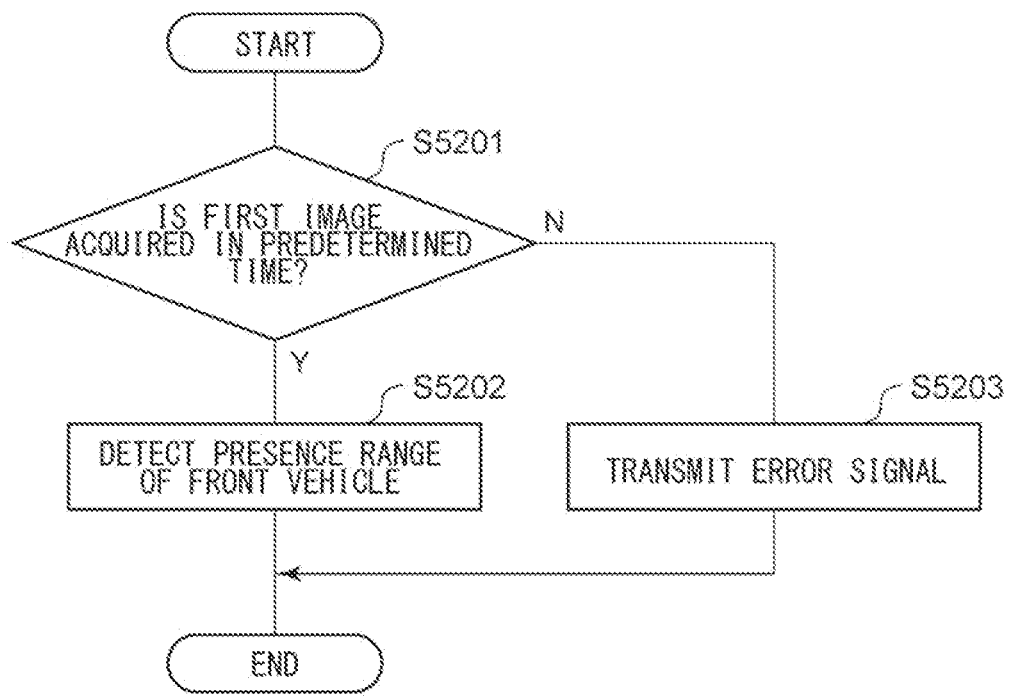
FIG. 29 is a flowchart illustrating an example of control executed by a light distribution control device according to the eighth embodiment.
Figure 30:
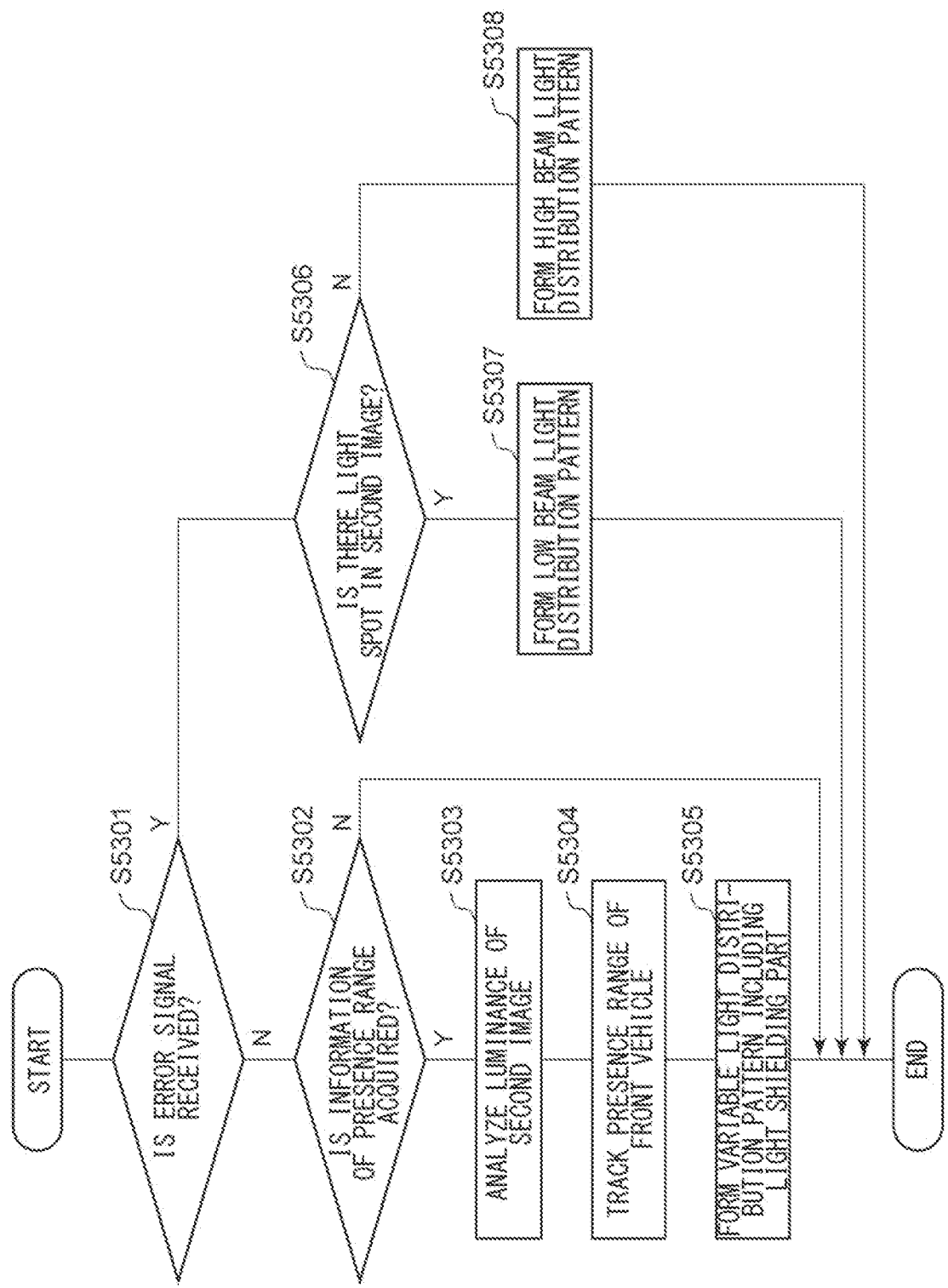
FIG. 30 is a flowchart illustrating an example of control executed by the light distribution control device according to the eighth embodiment.

FIGS. 29 and 30 are flowcharts illustrating an example of control executed by the light distribution control device 5008 according to the eighth embodiment. This flow is repeatedly executed at a predetermined timing when, for example, an instruction to execute the control by a light switch (not illustrated) and an ignition is turned on. A first flow illustrated in FIG. 29 and a second flow illustrated in FIG. 30 are executed in parallel.

In the first flow illustrated in FIG. 29, the light distribution control device 5008 determines whether or not the first image IMG5001 is acquired from the first imaging device 5004 within a predetermined time (S5201). When the first image IMG5001 is acquired (Y in S5201), the light distribution control device 5008 detects the presence range 5036 of the front vehicle 5100 (S5202), and ends this routine. When the first image IMG5001 is not acquired (N in S5201), the light distribution control device 5008 transmits an error signal (S5203), and ends this routine.

In the second flow illustrated in FIG. 30, the light distribution control device 5008 determines whether or not the error signal is received (S5301). When the error signal is not received (N in S5301), the light distribution control device 5008 determines whether or not the information of the presence range 5036 of the front vehicle 5100 is acquired (S5302). When the information of the presence range 5036 is not acquired (N in S5302), this routine is ended. When the information of the presence range 5036 is acquired (Y in S5302), the light distribution control device 5008 analyzes the luminance of the second image IMG5002 (S5303). Subsequently, the light distribution control device 5008 tracks the presence range 5036 of the front vehicle 5100 by associating the luminance with the front vehicle 5100 based on the result of the luminance analysis (S5304). The vehicle lamp 5002 is controlled to form the variable light distribution pattern PTNv including the light shielding part (S5305), and this routine is ended.

When the error signal is received (Y in S5301), the light distribution control device 5008 determines whether or not there is the light spot 5034 in the second image IMG5002 (S5306). When there is the light spot 5034 in the second image IMG5002 (Y in S5306), the light distribution control device 5008 controls the vehicle lamp 5002 to form the low beam light distribution pattern PTN1 (S5307), and ends this routine. When there is no light spot 5034 in the second image IMG5002 (N in S5306), the light distribution control device 5008 controls the vehicle lamp 5002 to form the high beam light distribution pattern PTNh (S5308), and ends this routine.

According to the vehicle lamp system 5001 according to the present embodiment, it is also possible to improve the visibility of the host vehicle while glare to the front vehicle 5100 is avoided by ADB control. It is possible to reduce the deterioration in the safety of vehicle driving when the ADB control fails.

The seventh and eighth embodiments of the present invention have been described in detail above. The above-described embodiment is merely a specific example for carrying out the present invention. The contents of the embodiment do not limit the technical scope of the present invention, and many design changes such as changes, additions, and deletions of components can be made without departing from the spirit of the invention defined in the claims. A new embodiment to which the design change is made has an effect of each of the combined embodiment and modifications. In the above-described embodiment, the contents that can be changed in design are emphasized with notations such as "of the present embodiment" and "in the present embodiment", but the design change is allowed even in the contents without such notations. Any combination of the above components is also effective as an aspect of the present invention. The hatching applied to a cross section of the drawing does not limit a material of a hatched target.

The seventh and eighth embodiments may be specified by items to be described below.

[Item 1]

There is provided a light distribution control device (5008) structured to control formation of a light distribution pattern (PTN) by a vehicle lamp (5002). The vehicle lamp (5002) is structured to be able to form a variable light distribution pattern (PTNv) including a light shielding part corresponding to a presence range (5036) of a front vehicle (5100) and a fixed-shaped low beam light distribution pattern (PTN1) and high beam light distribution pattern (PTNh) in a front region of a vehicle (5300), and the light distribution control device (5008) includes an information processor (5024) structured to acquire from an outside or generate information on a presence range (5036) of a front vehicle (5100) detected by image analysis of a first image (IMG5001) captured by a first imaging device (5004) structured to capture the front region, and decide the light shielding part based on a light spot (5034) included in an overlapping region overlapping a region including the presence range (5036) in a second image (IMG5002) captured by a second imaging device (5006) structured to capture the front region, a control executer (5026) structured to execute first light distribution control for forming a variable light distribution pattern (PTNv) including the light shielding part, and a control regulator (5028) structured to receive an error signal indicating that the information on the presence range (5036) is not able to be acquired, regulate the first light distribution control, and execute second light distribution control for forming the low beam light distribution pattern (PTN1) when the light spot (5034) is included in the second image (IMG5002) and forming the high beam light distribution pattern (PTNh) when the light spot (5034) is not included in the second image (IMG5002).

[Item 2]

There is provided a light distribution control method for controlling formation of a light distribution pattern (PTN) by a vehicle lamp (5002).

The vehicle lamp (5002) is structured to be able to form a variable light distribution pattern (PTNv) including a light shielding part corresponding to a presence range (5036) of a front vehicle (5100) and a fixed-shaped low beam light distribution pattern (PTN1) and high beam light distribution pattern (PTNh) in a front region of a vehicle (5300), and the light distribution control method includes acquiring from an outside or generating information on a presence range (5036) of a front vehicle (5100) detected by image analysis of a first image (IMG5001) captured by a first imaging device (5004) structured to capture the front region, deciding the light shielding part based on a light spot (5034) included in an overlapping region overlapping a region including the presence range (5036) in a second image (IMG5002) captured by a second imaging device (5006) structured to capture the front region, executing first light distribution control for forming a variable light distribution pattern (PTNv) including the light shielding part, and receiving an error signal indicating that the information on the presence range (5036) is not able to be acquired, regulating the first light distribution control, and executing second light distribution control for forming the low beam light distribution pattern (PTNl) when the light spot (5034) is included in the second image (IMG5002) and forming the high beam light distribution pattern (PTNh) when the light spot (5034) is not included in the second image (IMG5002).

What is claimed is:

1. A vehicle lamp system comprising:
   a vehicle lamp structured to be able to form a light distribution pattern including a light shielding part in a front region of a vehicle;
   a first imaging device structured to be disposed outside a lamp room in which the vehicle lamp is housed, and capture the front region to generate a first image;
   a second imaging device structured to be housed in the lamp room, and capture the front region to generate a second image; and
   a light distribution control device structured to control formation of the light distribution pattern by the vehicle lamp,
   wherein the light distribution control device includes
   an information processor structured to acquire from an outside or generate information of a first light shielding part obtained by adding a first margin to a presence range of a front vehicle in the first image, and decide a second light shielding part obtained by adding a second margin narrower than the first margin to the presence range of the front vehicle decided based on a light spot in an overlapping region overlapping the first light shielding part in the second image or a second light shielding part obtained by not adding the second margin to the presence range,
   a control executer structured to execute light distribution control for forming a light distribution pattern including the second light shielding part, and
   a control regulator structured to control the vehicle lamp to form a light distribution pattern including the first light shielding part by regulating the light distribution control when at least one condition of
   a condition (i) in which a width X of the first light shielding part is less than a width Y of the second light shielding part,
   a condition (ii) in which a difference between the width X and the width Y is equal to or greater than a predetermined value,
   a condition (iii) in which a center of the width X and a center of the width Y are deviated in a width direction by a predetermined amount or more, and
   a condition (iv) in which a light spot is not detected in the overlapping region is satisfied in the light distribution control.

2. The vehicle lamp system according to claim 1, further comprising:
   a cleaning device structured to clean a light emission surface from which light of the vehicle lamp is emitted; and
   a cleaning control device structured to drive the cleaning device when at least one of the conditions is satisfied.

3. The vehicle lamp system according to claim 1, further comprising:
   a heater structured to heat a light emission surface from which light of the vehicle lamp is emitted; and
   a heater control device structured to drive the heater when at least one of the conditions is satisfied.

4. The vehicle lamp system according to claim 1, further comprising: a notification device structured to notify an occupant of a vehicle that the condition is satisfied when at least one of the conditions is satisfied.

5. A vehicle determination device structured to determine that there is a line of front vehicles when there are three or more light spots arranged in a vehicle width direction in an image captured by a first imaging device structured to be housed in a lamp room in which a vehicle lamp is housed and capture a front region of a vehicle.

6. The vehicle determination device according to claim 5, wherein it is determined that there is the line when there are the three or more light spots in a presence possibility region in which there is a possibility that there is a front vehicle.

7. The vehicle determination device according to claim 6, further comprising: an area setter structured to set the presence possibility region based on an image captured by a second imaging device structured to be disposed outside the lamp room and capture the front region.

8. The vehicle determination device according to claim 5, wherein a plurality of light spots deviated in a vertical direction and at least partially overlapping in the vehicle width direction is decided as a row of light spot groups, and it is determined that there is the line when three or more rows of light spot groups are arranged in the vehicle width direction.

9. A vehicle lamp system comprising:
   a vehicle lamp that includes a shade member structured to partially block emission of light to a front of a lamp to form a cutoff line, and that is structured to form a light distribution pattern including the cutoff line in a front region of a vehicle;
   an imaging device structured to capture the front region; and
   a light distribution control device structured to execute following control for causing a position of the cutoff line to follow a displacement of a light spot at a lowermost end among light spots derived from a lamp of a front vehicle included in an image captured by the imaging device.

10. The vehicle lamp system according to claim 9, wherein the light distribution control device includes a control regulator structured to regulate the following when at least one condition of
    a condition (i) when a vehicle speed of a host vehicle is equal to or greater than a predetermined value and
    a condition (ii) when an oncoming vehicle is included in the image is satisfied.

11. The vehicle lamp system according to claim 9, wherein the regulation of the following is any one of
    a regulation (i) of displacing the cutoff line to a predetermined reference position,
    a regulation (ii) of fixing the cutoff line to a current position, and
    a regulation (iii) of displacing the cutoff line to the reference position when the current position of the cutoff line is higher than the predetermined reference position, and fixing the cutoff line to the current position when the current position is equal to or less than the reference position.

* * * * *